(12) United States Patent
Kimura et al.

(10) Patent No.: US 10,437,115 B2
(45) Date of Patent: Oct. 8, 2019

(54) LIQUID CRYSTAL DISPLAY DEVICE

(71) Applicant: TOPPAN PRINTING CO., LTD., Taito-ku (JP)

(72) Inventors: Yukihiro Kimura, Taito-ku (JP); Kenzo Fukuyoshi, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 135 days.

(21) Appl. No.: 15/810,658

(22) Filed: Nov. 13, 2017

(65) Prior Publication Data

US 2018/0067366 A1 Mar. 8, 2018

Related U.S. Application Data

(63) Continuation of application No. PCT/JP2015/063784, filed on May 13, 2015.

(51) Int. Cl.
*G02F 1/1343* (2006.01)
*G02F 1/1368* (2006.01)
(Continued)

(52) U.S. Cl.
CPC ...... *G02F 1/134309* (2013.01); *G02F 1/1368* (2013.01); *G02F 1/13338* (2013.01);
(Continued)

(58) Field of Classification Search
CPC ......... G02F 1/134309; G02F 1/133345; G02F 1/133512; G02F 1/133514; G02F 1/13439;
(Continued)

(56) References Cited

U.S. PATENT DOCUMENTS 5,905,556 A * 5/1999 Suzuki .............. G02F 1/134363
349/141
6,057,905 A * 5/2000 Nakajima ......... G02F 1/134309
349/146

(Continued)

FOREIGN PATENT DOCUMENTS

JP 2002-23178 A 1/2002
JP 5472373 B 4/2014

(Continued)

OTHER PUBLICATIONS

International Search Report dated Aug. 4, 2015 in PCT/JP2015/063784, filed May 13, 2015.

*Primary Examiner* — Ariel A Balaoing
(74) *Attorney, Agent, or Firm* — Oblon, McClelland, Maier & Neustadt, L.L.P.

(57) ABSTRACT

A liquid crystal display device includes a display-device substrate having a transparent electrode; an array substrate having a pixel electrode, a source line, a gate line, and a conductive line; a liquid crystal layer sandwiched between the display-device substrate and initially aligned vertically; and a controller that drives the liquid crystal layer by supplying an image signal to the source line and applying a liquid crystal driving voltage across the transparent electrode and the pixel electrode in synchronization with the image signal, the controller applying a voltage to the conductive line after the liquid crystal driving voltage is applied to the pixel electrode and while the liquid crystal driving voltage is not applied to the pixel electrode, thereby generating an electric field oriented in a direction intersecting the source line in a plan view between the conductive lines.

20 Claims, 29 Drawing Sheets

(51) Int. Cl.
*G02F 1/1333* (2006.01)
*G02F 1/1335* (2006.01)
*G02F 1/1362* (2006.01)
*G06F 3/041* (2006.01)
*G06F 3/044* (2006.01)
*G02F 1/137* (2006.01)

(52) U.S. Cl.
CPC .... *G02F 1/13439* (2013.01); *G02F 1/133345* (2013.01); *G02F 1/133512* (2013.01); *G02F 1/133514* (2013.01); *G02F 1/136209* (2013.01); *G02F 1/136286* (2013.01); *G06F 3/044* (2013.01); *G06F 3/0412* (2013.01); *G06F 3/0416* (2013.01); *G02F 2001/13712* (2013.01); *G02F 2001/134381* (2013.01); *G02F 2201/121* (2013.01); *G02F 2201/122* (2013.01); *G02F 2201/123* (2013.01); *G02F 2202/10* (2013.01); *G06F 2203/04103* (2013.01)

(58) Field of Classification Search
CPC ......... G02F 1/136209; G02F 1/136286; G02F 1/1368; G06F 3/0412; G06F 3/0416; G06F 3/044
See application file for complete search history.

(56) References Cited

U.S. PATENT DOCUMENTS

| | | | |
|---|---|---|---|
| 6,128,061 A * | 10/2000 | Lee | G02F 1/134363 349/141 |
| 6,507,382 B1 * | 1/2003 | Sakamoto | G02F 1/134363 349/141 |
| 8,243,027 B2 | 8/2012 | Hotelling et al. | |
| 8,259,078 B2 | 9/2012 | Hotelling et al. | |
| 8,432,371 B2 | 4/2013 | Hotelling et al. | |
| 8,451,244 B2 | 5/2013 | Hotelling et al. | |
| 8,552,989 B2 | 10/2013 | Hotelling et al. | |
| 8,654,083 B2 | 2/2014 | Hotelling et al. | |
| 9,244,561 B2 | 1/2016 | Hotelling et al. | |
| 9,268,429 B2 | 2/2016 | Hotelling et al. | |
| 9,575,610 B2 | 2/2017 | Hotelling et al. | |
| 2008/0013027 A1 * | 1/2008 | Kawamura | G02F 1/133707 349/143 |
| 2008/0167526 A1 | 7/2008 | Crank et al. | |
| 2016/0062203 A1 * | 3/2016 | Ono | G02F 1/134363 349/43 |
| 2017/0147119 A1 | 5/2017 | Hotelling et al. | |

FOREIGN PATENT DOCUMENTS

| | | |
|---|---|---|
| JP | 5517611 B | 6/2014 |
| JP | 5517612 B | 6/2014 |

* cited by examiner

LIQUID CRYSTAL DISPLAY DEVICE

CROSS-REFERENCE TO RELATED APPLICATIONS

The present application is a continuation of International Application No. PCT/JP2015/063784, filed May 13, 2015. The entire contents of this application are incorporated herein by reference.

BACKGROUND OF THE INVENTION

Field of the Invention

The present invention relates to a highly transmissive and highly responsive liquid crystal display device. The present invention further relates to a display-device substrate and a liquid crystal display device with a touch sensing function.

Discussion of the Background

Liquid crystal display devices are used in TV sets or other large display devices, tablets, and smart phones. Roughly speaking, a liquid crystal display device has a configuration in which a liquid crystal layer is sandwiched between two sheets of glass or other transparent substrates. Major liquid crystal driving methods in such liquid crystal display devices are roughly classified into a vertical alignment (VA) mode, which is known as a vertical electric field mode, an in-plane switching (IPS) mode, which is known as a horizontal electric field mode, and a fringe field switching (FFS) mode.

In the VA mode, liquid crystal molecules are vertically aligned relative to a substrate surface of a liquid crystal display device to apply an electric field to the liquid crystal molecules longitudinally along the thickness direction of a liquid crystal layer and to thereby drive the liquid crystal. In the IPS or FFS mode, liquid crystal molecules are horizontally aligned relative to a substrate surface of a liquid crystal display device to apply an electric field to the liquid crystal molecules substantially parallel with the substrate and to thereby drive the liquid crystal.

A FFS mode liquid crystal display device has a great advantage of being able to drive liquid crystals at high speed by use of a fringe electric field. This type of liquid crystal display device is characteristic in having a wide viewing angle because liquid crystal molecules rotate in parallel with a substrate surface at a time when an electric field is applied to the liquid crystal molecules. The FFS mode, however, poses problems such as the following: higher definition of 300 ppi (pixel per inch) or more is apt to cause leakage of light; and the front transmittance is lower than that of the VA mode.

To solve such problems, a technique by use of a vertical electric field and a horizontal electric field in combination is considered, as disclosed in PTL 1.

A new liquid crystal driving method, which incorporates a fringe electric field as disclosed in PTL 2, is also under consideration for the purpose of driving a liquid crystal at a higher speed in a VA liquid crystal display device using a vertical electric field method.

In the technique disclosed in PTL 1, gradation display is basically performed by application of a horizontal electric field (second means of applying a voltage), and a longitudinal electric field (first means of applying a voltage) is applied supplementarily to liquid crystal molecules to reduce a tilt angle thereof. An electrode for generating the horizontal electric field is formed in a linear shape, and a flat plate-like transparent electrode is formed on a first substrate. The technique disclosed in PTL 1 leaves a problem in terms of power consumption because the technique involves continuously applying a vertical electric field to liquid crystal molecules during a display period, as well as applying a horizontal electric field to liquid crystal molecules to drive the liquid crystal and display an image.

The technique disclosed in PTL 2 is more likely to achieve low power consumption and high-speed driving because the technique uses a vertical electric field in combination with a fringe electric field generated between a pixel electrode and a common electrode in an array substrate. Additionally, the technique disclosed in PTL 2 makes it possible to eliminate the occurrence of a dark portion observed in a vertical electric field on an occasion when the VA method is used, as shown in FIG. 21.

In the technique disclosed in PTL 3, as shown in claim 1 thereof, a second plurality of touch sensing elements are provided between a first polarizer and a second polarizer, and the second plurality of touch sensing elements are provided at a location other than between a first substrate and a second substrate. The PTL 2 also discloses that a touch-driven electrode serves as a counter electrode for a storage capacitor in a display operation mode.

The technique disclosed in PTL 4, as disclosed in claim 1 thereof, uses one of the touch sensing elements as a counter electrode for a display operation mode of a liquid crystal display. PTL 4 further discloses a technique to form a touch-driven electrode disposed on the second substrate with a transparent material.

A response time of a liquid crystal is a total time of a rise time (hereinafter referred to as "$\tau$on") at a time when a liquid crystal driving voltage is applied to liquid crystal molecules (liquid crystal layer) and a fall time at a time when no liquid crystal driving voltage is applied to liquid crystal molecules (while a liquid crystal driving voltage is turned OFF) (hereinafter referred to as "$\tau$off"). There are various ways of driving a liquid crystal and various structures of a liquid crystal device for shortening $\tau$on, such as raising a liquid crystal driving voltage, using an overdrive approach, making a liquid crystal layer thinner, and using an electrode structure for driving liquid crystal molecules faster. $\tau$off depends on physical properties of liquid crystal molecules, such as electric properties and viscosity, because $\tau$off is normally a period of time before the liquid crystal molecules restore their initial alignment in a non-electric field state. Reducing $\tau$off is therefore a main subject for reducing a response time of a liquid crystal. PTLs 3 and 4 do not disclose a technique for achieving $\tau$off reduction.

PTL 1: JP 2002-23178 A
PTL 2: JP 5472373 B
PTL 3: JP 5517611 B
PTL 4: JP 5517612 B

SUMMARY OF THE INVENTION

According to an aspect of the present invention, a liquid crystal display device, includes a display-device substrate including a transparent substrate, a transparent resin layer formed on the transparent substrate, and a transparent electrode formed on the transparent resin layer, an array substrate including a source line, a gate line, a pixel electrode positioned in each of pixel openings defined by the source and gate lines, a first insulation layer formed between the source line and the pixel electrode in a cross-sectional view, and a conductive line parallel to the source line and formed in a portion on the first insulation layer where pixel electrodes are divided in a plan view, a liquid crystal layer sandwiched between the display-device substrate and the array substrate and including liquid crystal molecules having negative dielectric anisotropy and initially aligned vertically, and a controller structured to drive the liquid crystal layer by supplying an image signal to the source line and applying a liquid crystal driving voltage across the transparent electrode and the pixel electrode in synchronization with the image signal. The controller is structured to apply a voltage to the conductive line after the liquid crystal driving voltage is applied to the pixel electrode and while the liquid crystal driving voltage is not applied to the pixel electrode, such that an electric field oriented in a direction traversing the source line in the plan view is generated between conductive lines.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
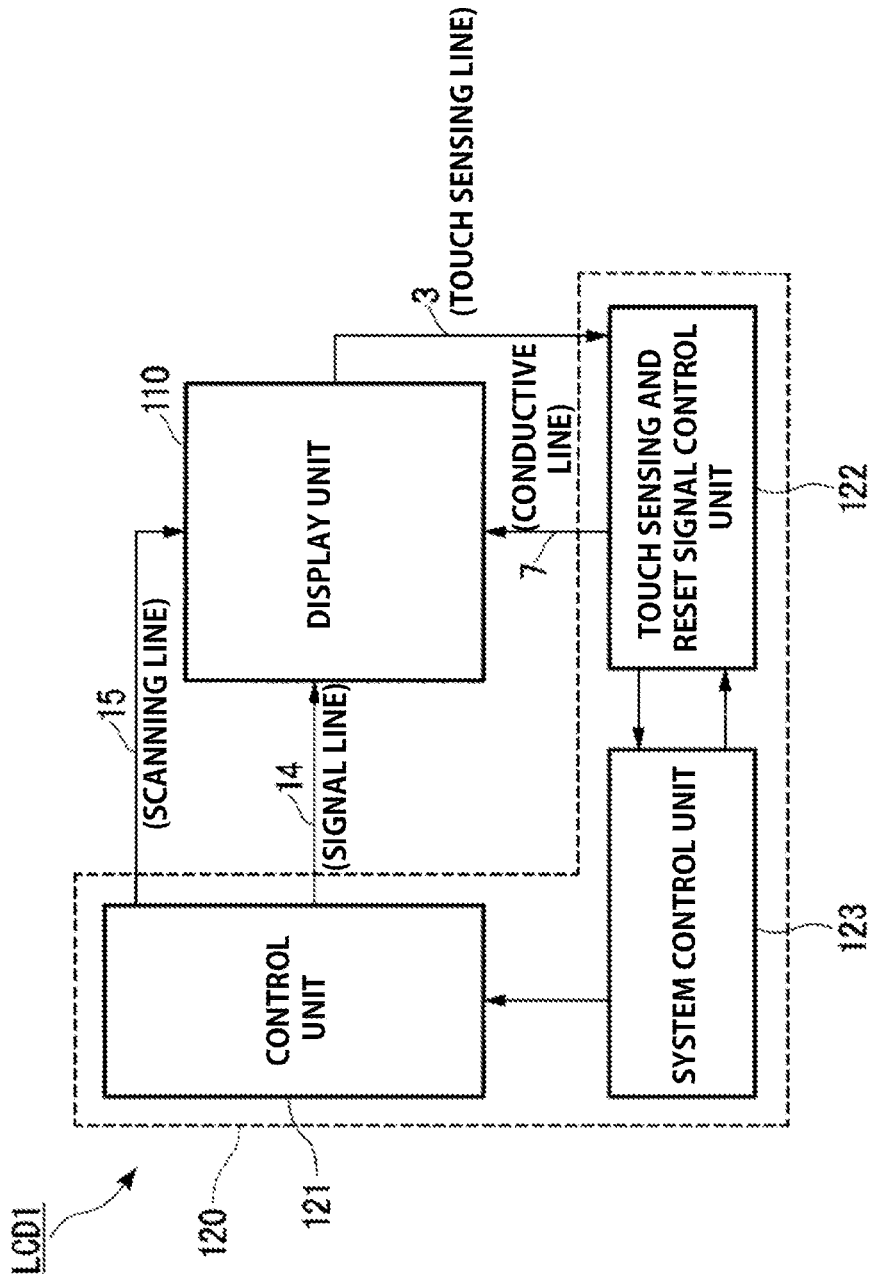
FIG. 1 is a block diagram of a liquid crystal display device according to a first embodiment of the present invention.

The embodiments will now be described with reference to the accompanying drawings, wherein like reference numerals designate corresponding or identical elements throughout the various drawings.

A description will be given on embodiments of the present invention below with reference to the drawings.

In the following description, identical or substantially identical functions and components are denoted by identical reference signs to omit or simplify the description, or will be given only when it is necessary. In each figure, dimensions and ratios of the individual components are differentiated from the actual ones as appropriate so as to make the components large enough to be recognized on the drawings.

In each embodiment described below, only a characteristic part of a display device according to the present embodiments will be described, and descriptions will be omitted on parts that are not different from, for example, components used in a common display device. In each embodiment, an example of a liquid crystal display device or display-device substrate will be described, but a display-device substrate according to the present embodiments can be applied to a display device other than a liquid crystal display device such as an organic EL display device.

First Embodiment (Configuration of Liquid Crystal Display Device LCD 1)

With reference to FIGS. 1 to 16G, a liquid crystal display device according to a first embodiment of the present invention will be described below.

FIG. 1 is a block diagram of a liquid crystal display device according to the first embodiment of the present invention. As shown in FIG. 1, a liquid crystal display device LCD 1 of the present embodiment includes a display unit 110, and a control unit 120 for controlling the display unit 110 and a touch sensing function.

The control unit 120 has a known configuration and includes an image signal timing control unit 121 (first control unit), a touch sensing and reset signal control unit 122 (second control unit), and a system control unit 123 (third control unit).

The image signal timing control unit 121 sets a transparent electrode 2 (a plurality of transparent electrode patterns described later) provided on a display-device substrate 100 to a constant potential, and transmits a signal to a gate line 15 provided on the array substrate 200 (a scanning line described later) and a source line 14 (a signal line described later). The image signal timing control unit 121 drives liquid crystal molecules of a liquid crystal layer 300 by applying a liquid crystal driving voltage for display to a pixel electrode 17 (described later) in a lamination direction Z between the transparent electrode 2 and a pixel electrode 17. An image is thus displayed on the array substrate 200. An image signal that sets the transparent electrode 2 to a constant voltage and has, for example, an AC rectangular waveform is individually applied to each of the plurality of pixel electrodes 17 via a source line (signal line). The rectangular wave may be a positive or negative DC rectangular wave.

The touch sensing and reset signal control unit 122 applies a touch sensing driving voltage to one of a touch sensing line 3 (described later) and a conductive line 7 (described later), and detects a touch sensing signal through the other thereof, thus detecting a change in electrostatic capacitance (fringe capacitance) occurring between the touch sensing line 3 and the conductive line 7, and performing touch sensing. The touch sensing and reset signal control unit 122 can also supply a reset voltage (a reset signal described later) to the conductive line 7.

The touch sensing line 3 to be used for such a touch sensing operation refers to a touch driving line to which a touch sensing driving voltage is applied and a touch detection line for detecting a touch sensing signal. In a circumstance where the conductive line 7 serves as a touch driving line, the touch sensing line 3 serves as a touch detection line. In a circumstance where the conductive line 7 serves as a touch detection line, the touch sensing line 3 serves as a touch driving line. In other words, the roles of the touch sensing line 3 and the conductive line 7 may be switched with each other in the touch sensing function.

The system control unit 123 can control the image signal timing control unit 121 and the touch sensing and reset signal control unit 122 to drive the liquid crystals and detect a change in electrostatic capacity alternately, or in a time-division manner. The system control unit 123 controls signal supply to the touch sensing line 3 or the conductive line 7 in the touch sensing and reset signal control unit 122 in synchronization with the liquid crystal driving in the image signal timing control unit 121, thereby controlling supply of a reset voltage to the conductive line 7.

A conductive line 7 according to an embodiment of the present invention has a function of generating an electric field (electric field oriented in a direction intersecting the source line 14 in plan view) in a liquid crystal layer in accordance with a reset voltage applied to the conductive line 7, and serves as a touch sensing line for performing touch sensing such as touch detection or touch driving. The conductive line 7 performs these two functions in a time-division manner and can play various roles (two functions) with a lapse of time (on a time axis).

A reset voltage applied to the conductive line 7 includes a positive voltage and a negative voltage, and may be inverted to be positive or negative in every constant period (every image display period) of image display controlled by the image signal timing control unit 121. This makes it possible to invert the direction of the electric field, which is oriented in the direction intersecting the source line 14 in plan view. Note that the positive or negative sign of a reset voltage refers to whether the voltage has a positive or negative potential relative to the ground potential (0V). Not being limited to such a definition of a positive or negative reset voltage, a voltage may be applied to the two lines through a potential changeover of the two conductive lines to positive or negative, so that at least two different conductive lines in plan view each have a potential opposite to each other. Alternatively, an offset to a positive or negative reset voltage can be added to slightly shift the reset voltage to the low or high voltage side.

A touch sensing line (including a touch driving line and a touch detection line) and a conductive line according to an embodiment of the present invention can be formed of a highly conductive metal layer, and thus can be made more touch sensitive by lowering resistance values of these lines.

(Liquid Crystal Display Device LCD 1)

With reference to FIGS. 2 to 15, a description will be given of a liquid crystal display device according to the first embodiment.

The liquid crystal display device described in the present embodiment can include a display-device substrate according to an embodiment to be described later. The term "in plan view" set forth below means a plane viewed in the direction in which an observer observes the display surface of the liquid crystal display device (a plane of the display-device substrate). The shape of a display unit of a liquid crystal display device according to embodiments of the present invention, the shape of a pixel opening that defines a pixel, and the number of pixels constituting the liquid crystal display device are not limited. In the embodiments detailed below, however, a liquid crystal display device will be described with, in plan view, the direction of the shorter side of a pixel opening being defined as an X direction while the direction of the longer side being defined as a Y direction, and the thickness direction of a transparent substrate as a Z direction. In the following embodiments, a liquid crystal display device may be configured with the X and Y directions defined above being switched with each other.

Figure 2:
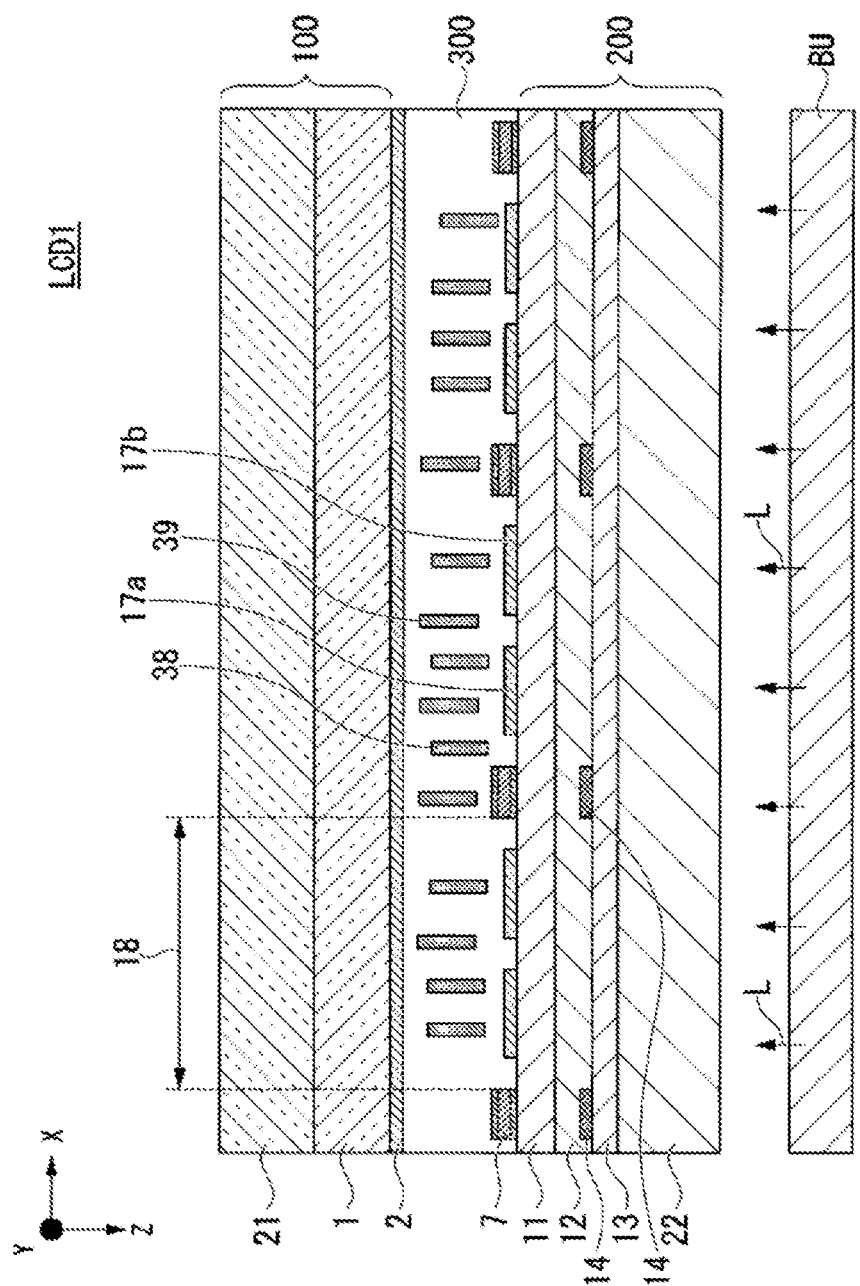
FIG. 2 is a cross-sectional view partially illustrating the liquid crystal display device according to a first embodiment of the present invention, taken along the line A-A' shown in FIG. 3.

FIG. 2 is a cross-sectional view partially illustrating a liquid crystal display device LCD 1 according to the present embodiment. FIG. 2 is also a cross-sectional view along the shorter side direction of the pixel opening, that is, a view taken along the line A-A' shown in FIG. 3.

The liquid crystal display device LCD 1 includes a display-device substrate 100 (counter substrate), an array substrate 200 bonded so as to face the display-device substrate 100, and a liquid crystal layer 300 sandwiched between the display-device substrate 100 and the array substrate 200.

A backlight unit BU for supplying light L to the liquid crystal display device LCD 1 is provided on a rear surface of the array substrate 200 constituting the liquid crystal display device LCD 1 (a surface opposite to a surface of a transparent substrate 22 of the array substrate 200 on which the liquid crystal layer 300 is arranged). The backlight unit BU may be provided on a lateral surface of the liquid crystal display device LCD 1. In this case, for example, a reflection plate, a light guide plate, or a light diffusion plate, or other plate for reflecting the light emitted from the backlight unit BU into the liquid crystal display device LCD 1 is provided on a rear surface of the transparent substrate 22 of the array substrate 200.

Figure 3:
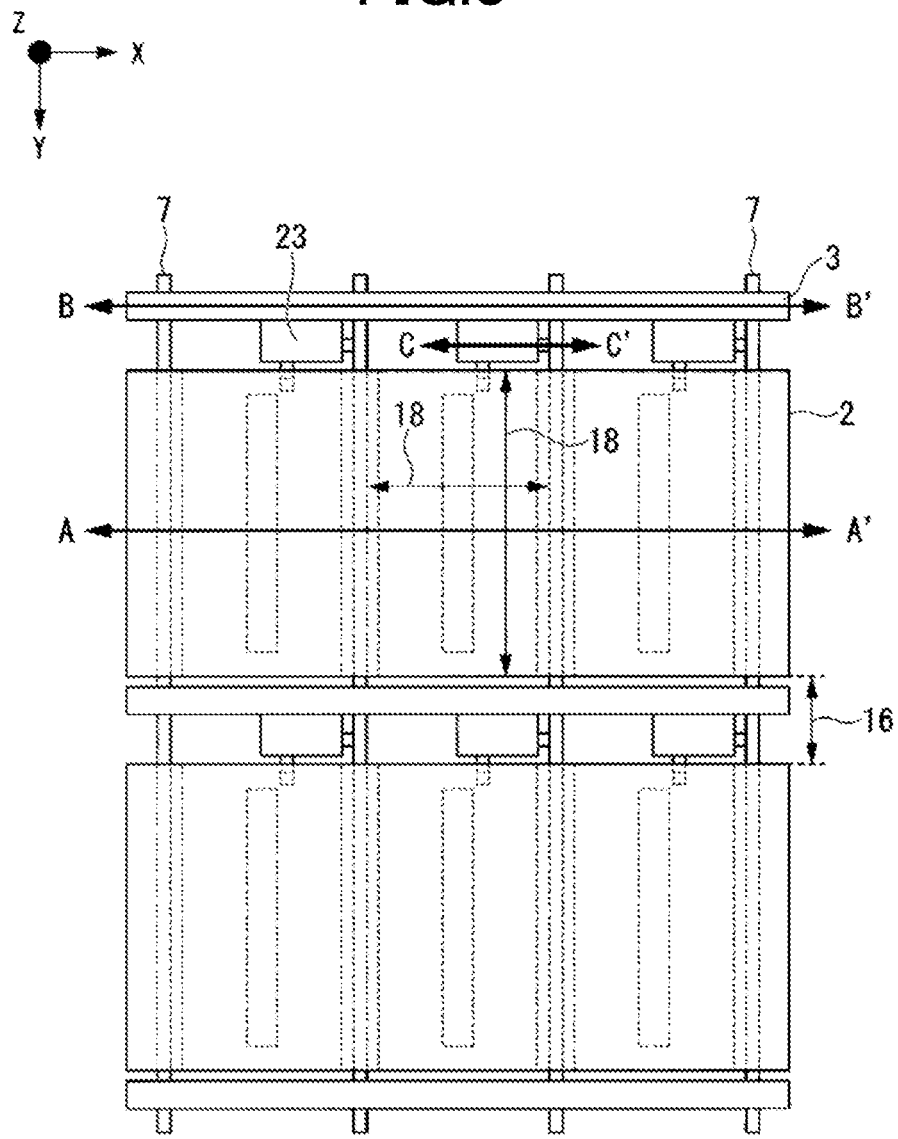
FIG. 3 is a partial plan view of the liquid crystal display device according to a first embodiment of the present invention as viewed from an observer side.
Figure 8:
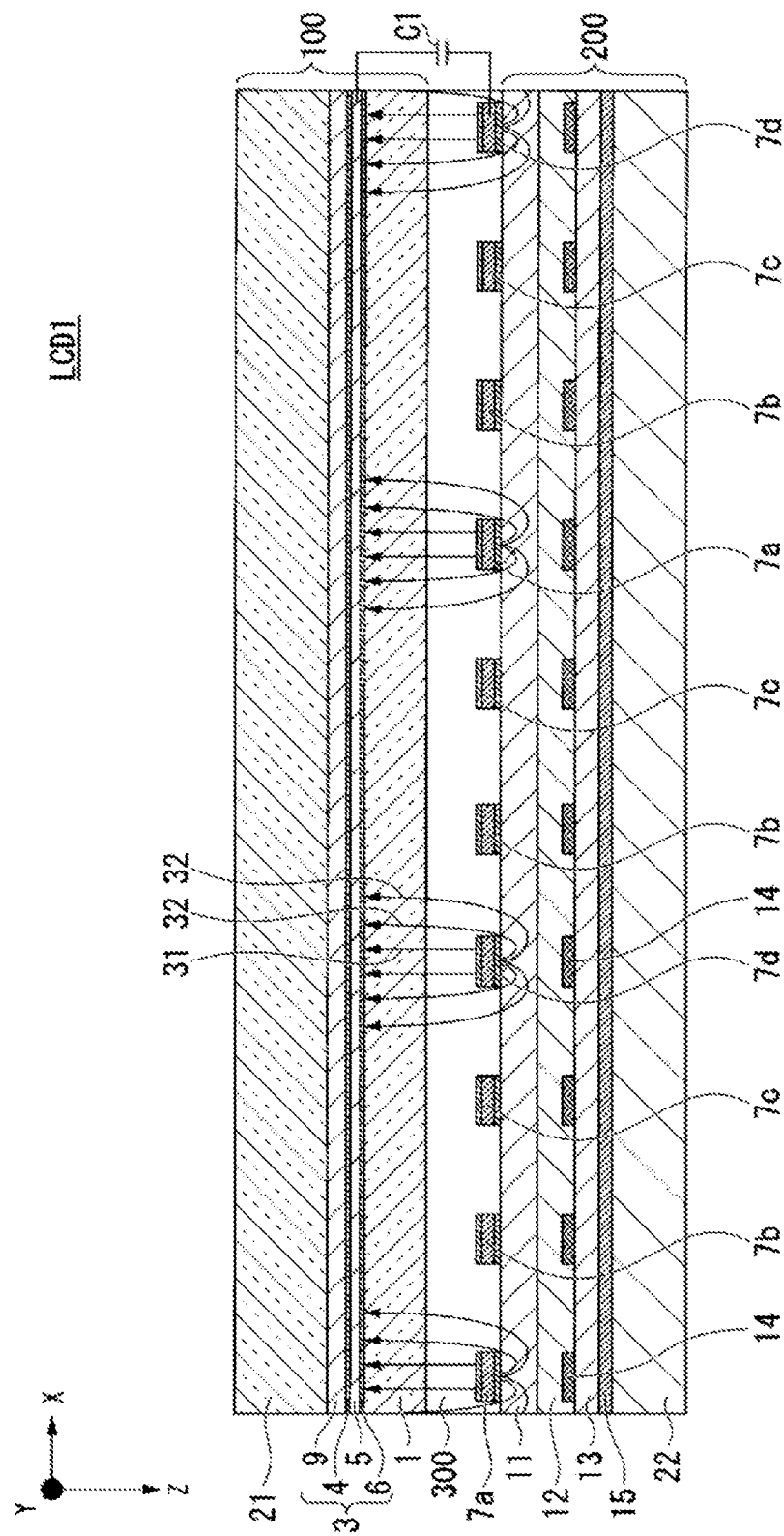
FIG. 8 is a cross-sectional view partially illustrating the liquid crystal display device according to the first embodiment of the present invention, taken along the line B-B' shown in FIG. 3.

The display-device substrate 100 includes a transparent substrate 21, a transparent resin layer 1 provided on the transparent substrate 21, and a transparent electrode 2. A touch sensing line 3 (a touch detection line or a touch driving line) positioned on the deep side of the page of FIG. 2 is formed on the display-device substrate 100. The touch sensing line 3 is also shown in FIGS. 3 and 8. The touch sensing line 3 is made up of a first black layer 9 formed on the transparent substrate 21 and a first metal layer 5 (described later) formed on the first black layer 9.

Materials that can be used as the transparent resin for the transparent resin layer 1 include a highly heat-resistant resin such as acrylic resin, polyimide resin, polyamide resin, and epoxy resin. Applying such a transparent resin layer 1 to an embodiment of the present invention makes it possible to provide a display device that boasts high resolution and is responsive to a quick touch input, a display-device substrate for the display device, and a display-device substrate having a color filter.

The array substrate 200 includes a transparent substrate 22, a third insulation layer 13 formed on the transparent substrate 22, a source line 14 formed on the third insulation layer 13, a second insulation layer 12 formed on the third insulation layer 13 so as to cover the source line 14, and a first insulation layer 11 formed on the second insulation layer 12. The array substrate 200 includes a plurality of pixel electrodes 17 formed on the first insulation layer 11, and a conductive line 7 formed on the first insulation layer 11 so as to be located between the plurality of pixel electrodes 17 (having electrode portions 17a, 17b).

The plurality of pixel electrodes 17 are formed on the surface closest to the liquid crystal layer 300. The conductive line 7 is formed so as to extend in the vertical direction (Y direction) of the page of FIG. 2 and in parallel with the source line 14. The conductive line 7 is configured to include at least a second metal layer.

The second metal layer constituting the conductive line 7 is a copper-containing layer such as a copper layer or a copper alloy layer. The conductive line 7 may have a configuration in which the second metal layer is sandwiched between two conductive metal oxide layers.

What will be described next is an advantage of the first metal layer or the second metal layer having a copper-containing layer.

When the first metal layer or the second metal layer has a copper-containing layer (copper layer or copper alloy layer), the conductive metal oxide layer sandwiching this metal layer is desirably a composite oxide layer that contains zinc oxide, indium oxide, and tin oxide. The reasons are as follows: For the composite oxide mentioned above, adjusting a composition ratio of zinc oxide and tin oxide constituting the composite oxide facilitates adjustment of an etching rate in wet etching. Hence, a conductive line 7 and a touch sensing line 3 that have a three-layer structure in which the copper-containing layer is sandwiched by conductive metal oxide layers composed of a composite oxide allow patterns of the same to be easily formed, even if it is multi-layered. Additionally, a copper-containing layer has poor adhesion to a resin such as a resin constituting a color filter or to a glass or other substrate, falling short of a practical level in terms of adhesiveness. On the other hand, a composite oxide layer composed of zinc oxide, indium oxide, and tin oxide is sufficiently adhesive not only to a color filter and glass but also to a copper-containing layer. A composite oxide layer thus sufficiently meets a practical level in terms of adhesiveness to a color filter, glass, and a copper-containing layer, and therefore can provide a conductive line 7 and a touch sensing line 3 with high adhesiveness.

Additionally, copper oxide has properties of being unlikely to obtain ohmic contact by electrical connection because copper oxide is formed over time on the surface of a copper-containing layer. On the other hand, a composite oxide layer of zinc oxide, indium oxide, and tin oxide can obtain ohmic contact and boasts good mounting stability. Hence, employing a laminated structure in which a copper-containing layer is sandwiched between composite oxide layers for the conductive line 7 and the touch sensing line 3 makes it possible to achieve a good wiring structure in terms of obtaining ohmic contact.

A description will be given on a metal layer applicable to the conductive line 7 and the touch sensing line 3.

Materials applicable to the metal layer include copper, silver, gold, titanium, molybdenum, aluminum, and alloys containing these metals. Nickel is a ferromagnetic material and therefore has a lower film formation rate, but a Nickel film can be formed by sputtering or other vacuum film formation method. Chromium has a negative aspect of being potentially hazardous to the environment and having a larger electrical resistance, but can still be used for the metal layer according to the present embodiment.

To make close contact with a glass substrate or resin, it is preferable to employ, as a metal material for forming the metal layer, a copper or aluminum alloy to which one or more metal elements selected from the group consisting of magnesium, calcium, titanium, molybdenum, indium, tin, zinc, neodymium, nickel is added.

The amount of a metal element added to the material for forming the metal layer is preferably 3 at % or less because this ratio does not significantly lower the resistance value of the copper alloy or aluminum. An example of a step of depositing a copper alloy is vacuum film formation by sputtering. A copper alloy thin film or an aluminum alloy thin film with a thickness of 100 nm to 150 nm or more will transmit almost no visible light. A metal layer according to the present embodiment can therefore obtain sufficient light shieldability with a film thickness of, for example, 100 nm to 300 nm.

A description will then be given on the first black layer 9 constituting the touch sensing line 3.

The black layer is made of, for example, a colored resin with a black coloring material being dispersed. Copper oxide or copper alloy oxide cannot provide sufficient black color or low reflectivity, but the reflectance of visible light on an interface between the black layer and the glass or other substrate according to the present embodiment is kept to 3% or less, which provides high visibility.

Materials available as the black coloring material include carbon, carbon nanotube, and a mixture of a plurality of organic pigments. For example, carbon can be used at a ratio of 51 mass % or more relative to the total amount of coloring materials, that is, as a main coloring material. In order to adjust a reflection color, a blue, red, or other organic pigment can be added to a black coloring material. For example, adjusting a carbon concentration in a photosensitive black coating solution, which is a starting material (lowering the carbon concentration), can improve reproducibility of the black layer.

Even on an occasion when a large-sized exposure device, that is a device for manufacturing a display device, is used, a black layer with a pattern whose line width (fine line) is 1 to 6 μm can be formed (patterned). The carbon concentration in the present embodiment is set within the range of 4 to 50 mass %, inclusive, relative to a total solid content including a resin, a hardening agent and a pigment. The carbon concentration may exceed 50 mass % relative to the total solid content, but such concentration tends to lower coating suitability. Setting the carbon concentration to 4 mass % or less did not provide a sufficient black color, and a reflected light occurring in an underlying metal layer located underneath the black layer was recognized larger, occasionally resulting in being less visible.

By carrying out an exposure treatment in photolithography, that is a post-processing step, a substrate to be exposed is aligned with a mask. On this occasion, a priority can be placed on the alignment to keep an optical density of 2 or less, for example, based on transmission measurement in a black layer. Other than carbon, a mixture of a plurality of organic pigments can be used for color adjustment of black to form a black layer. In consideration of a refractive index (approximately 1.5) of a base material made of glass, transparent resin, or others, a reflectance of the black layer is set so that the reflectance on an interface between the black layer and the base material is 3% or less. In this case, it is desirable to adjust the content and type of the black coloring material, the resin for the coloring material, and the film thickness of the resin. Optimizing these conditions enables the reflectance on the interface between the glass or other base material having a refractive index of approximately 1.5 and the black layer to be 3% or less within the wavelength range of visible light, thereby achieving low reflectance. The reflectance of the black layer is desirably 3% or less in consideration of the necessity of preventing re-reflection of reflection light caused by light emitted from the backlight unit BU, and of better visibility for an observer. Note that the refractive index of the acrylic resin used for a color filter and that of a liquid crystal material are normally in the range of approximately 1.5 to 1.7.

Forming a metal oxide having light-absorbing properties on the touch sensing line 3 can restrain light reflection of a metal layer used for the touch sensing line 3. Constitutions of a metal oxide layer and a metal layer applicable to an embodiment of the present invention include: a layer structure obtained by forming, for example, ITO (indium tin oxide), IZTO, or IZO (trade mark) containing indium oxide as a main base material in a state where oxygen is insufficient, on a metal layer of a copper alloy layer, or a layer structure obtained by laminating molybdenum oxide, tungsten oxide, a mixed oxide of nickel oxide and copper oxide, titanium oxide, and others on a metal layer of an aluminum alloy or a copper alloy.

A layer structure obtained with a metal oxide layer and a metal layer has an advantage that it can be continuously formed with a sputtering device or other vacuum film-forming device.

Referring again to FIG. 3, the liquid crystal display device LCD 1 will be described.

The region in the X direction located between the conductive lines 7 adjacent to each other is a pixel opening 18. The pixel opening 18 in the Y direction is located between touch sensing lines 3 adjacent to each other or between gate lines 15 adjacent to each other, as shown in FIG. 3.

FIG. 2 omits an alignment film for initially aligning the liquid crystal layer 300, an optical film such as a polarizer film and an optical retardation film, a protective cover glass and the like. A polarizer film is attached to each of front and back surfaces of the liquid crystal display device LCD 1 so that an optical axis may be in a crossed Nicol state.

The liquid crystal layer 300 includes liquid crystal molecules 38, 39 having negative dielectric anisotropy. The liquid crystal molecules 38, 39 are initially aligned perpendicularly to a substrate surface of the display-device substrate 100 or the array substrate 200. Note that the vertical alignment of liquid crystal molecules refers to an inclination in the range of approximately 0° to 5° relative to a normal direction of a substrate surface, that is, refers to a pretilt. A potential method of forming a pretilt is to use a photo alignment method to align an alignment film material so that liquid crystal molecules have a small pretilt angle of, for example, 0.1° to 1.5° as desired. To achieve high-quality black display, an inclination (pretilt) of an initial alignment of liquid crystal molecules is preferably a small inclination close to a normal direction.

Specific procedures of a photo alignment approach are as follows:

At first, a photosensitive alignment film material is applied to face-to-face surfaces of the display-device substrate 100 and the array substrate 200, followed by drying the alignment film material to a slight degree. Further, a seal portion for sealing the liquid crystal layer 300 is formed on at least one of the display-device substrate 100 and the array substrate 200 so as to be located around a display screen. Then, liquid crystals are dropped onto one of the display-device substrate 100 and the array substrate 200 (one drop filling: ODF). The display-device substrate 100 and the array substrate 200 are bonded to each other so as to sandwich the dropped liquid crystals (liquid crystal layer 300) to seal the liquid crystal layer 300 (cell formation). Then, for example, ultraviolet rays are irradiated onto the substrate while applying a voltage for driving the liquid crystals to the liquid crystal layer 300, and the alignment film material is aligned while hardening it. Polarized or non-polarized ultraviolet rays may be used.

FIG. 3 is a partial plan view of a liquid crystal display device LCD 1 according to the present embodiment as viewed from an observer. FIG. 3 omits the transparent substrate 21 and transparent resin layer 1 described above.

A transparent electrode 2 is formed of, for example. an ITO (indium tin oxide) or other conductive metal oxide. In plan view, the transparent electrode 2 is formed to have a stripe pattern (strip shape). A slit 16 is formed between adjacent strip-shaped transparent electrodes 2, and a touch sensing line 3 is located between the strip-shaped transparent electrodes 2. A gate line 15 (not shown) is located in a lower part (in the Z direction) of the touch sensing line 3 shown in FIG. 3, the gate line 15 being hidden in the drawing behind the touch sensing line 3. The gate line 15 is disposed so as to extend parallel with the touch sensing line 3 and located at a position that is substantially identical to the touch sensing line 3 in plan view. The touch sensing line 3 is disposed on the transparent substrate 21, and the gate line 15 is disposed on the array substrate 200.

Figure 4:
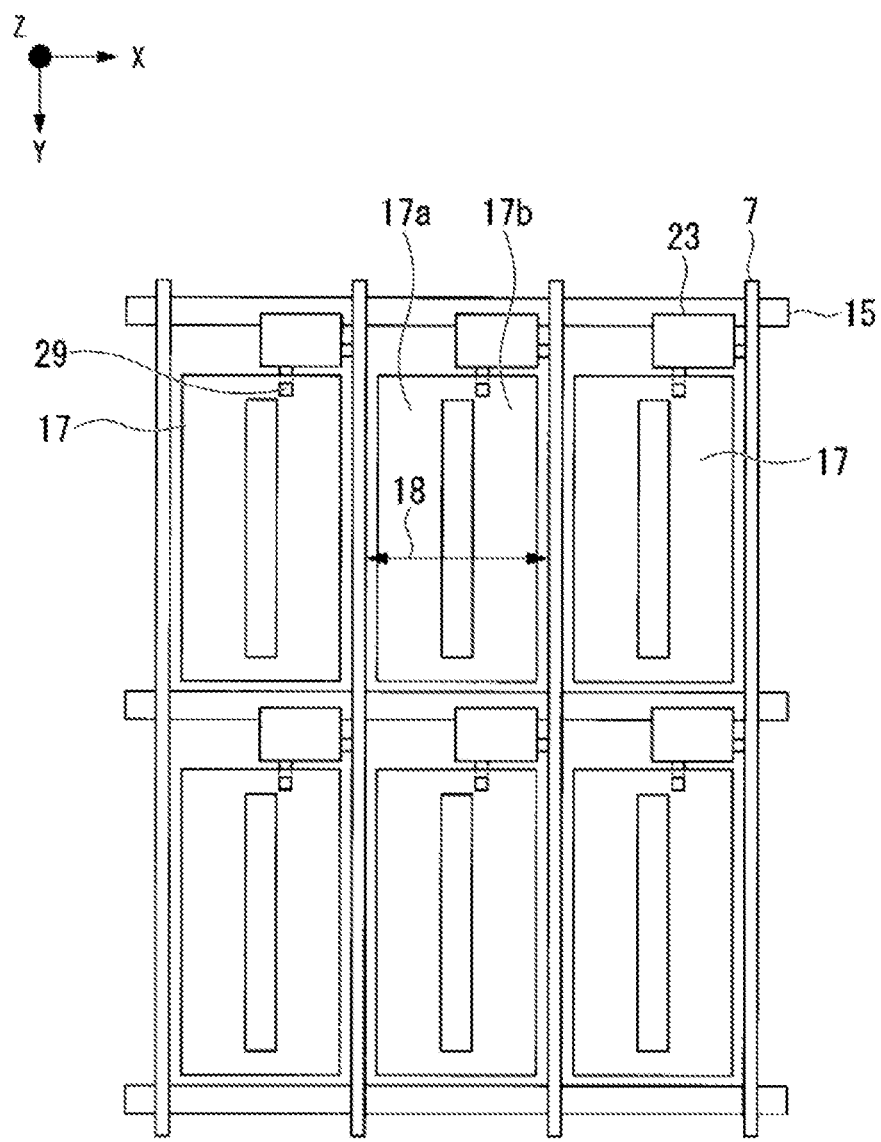
FIG. 4 is a partial plan view of an example of an array substrate according to the first embodiment of the present invention as viewed from an observer side.

FIG. 4 is a plan view partially illustrating a surface of the array substrate 200 of the liquid crystal display device LCD 1 according to the present embodiment, as viewed by an observer. For the sake of clarity, FIG. 4 omits the display-device substrate 100 described above.

Electrode portions 17a, 17b constituting a pixel electrode 17 are provided in a pixel opening 18. A conductive line 7, and a light shielding layer 23 (light shielding pattern) formed of a layer identical to a metal layer constituting the conductive line 7 are provided on the array substrate 200. However, the conductive line 7 and the light shielding layer 23 are electrically insulated from each other. A source line 14 (not shown) is positioned in a lower part (in the Z direction) of the conductive line 7 shown in FIG. 4, the source line 14 being hidden in the drawing behind the conductive line 7. The source line 14 is disposed so as to extend parallel with the conductive line 7 and located at a position that is substantially identical to the conductive line 7 in plan view.

A pixel electrode 17 has a pixel electrode pattern in which a transparent conductive film located at the center of the pixel electrode 17 is removed longitudinally in a slit shape. A pixel electrode 17 includes electrode portions 17a, 17b each having a shape corresponding to a pixel electrode pattern. Electrode portions 17a, 17b constituting a pixel electrode 17 are electrically connected to each other. Electrode portions 17a, 17b of a pixel electrode 17 are electrically connected via a contact hole 29 to a drain electrode 26 of an active element 28 shown in FIG. 5.

Figure 5:
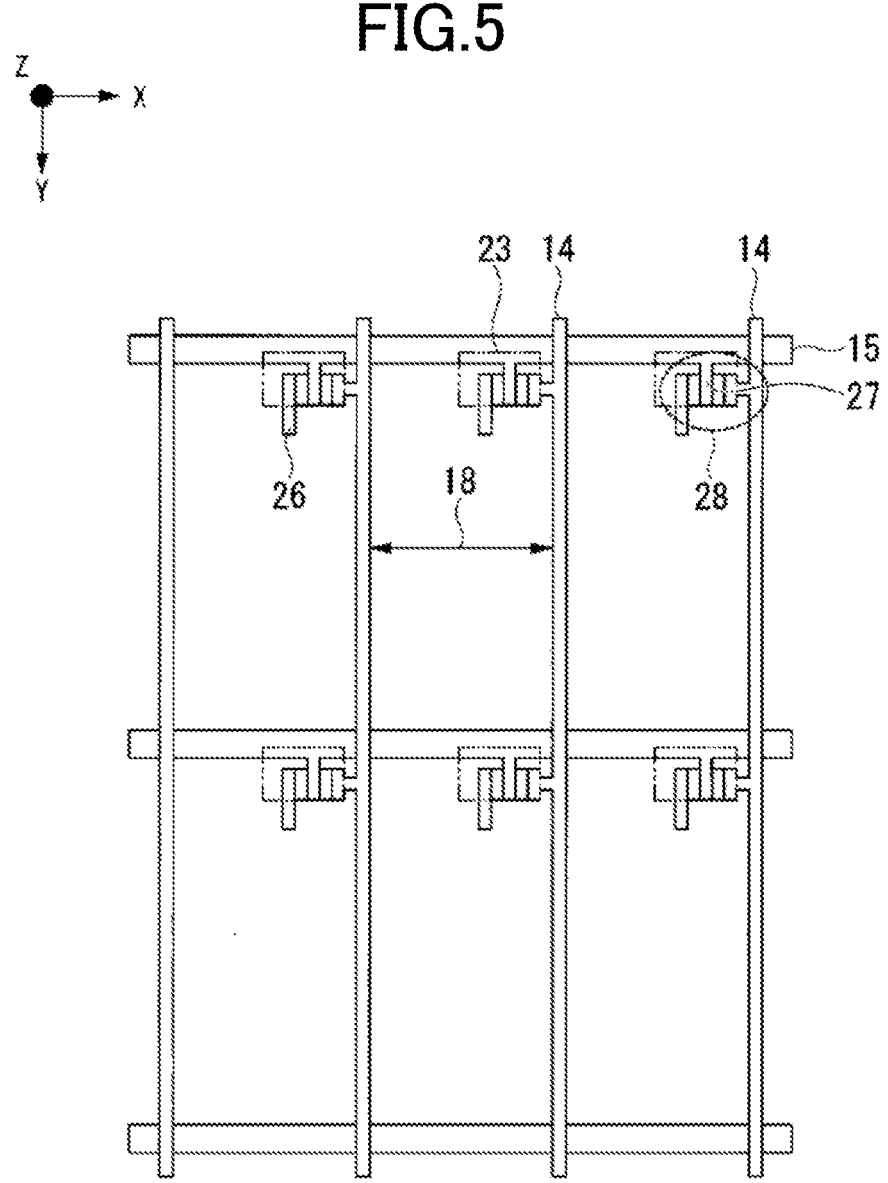
FIG. 5 is a partial plan view of an example of an array substrate according to the first embodiment of the present invention as viewed from an observer side.

FIG. 5 is a plan view partially illustrating a surface of the array substrate 200 of the liquid crystal display device LCD 1 according to the present embodiment, as viewed from an observer. For the sake of clarity, FIG. 5 omits the display-device substrate 100, the pixel electrode 17, the conductive line 7, and the light shielding layer 23, which are described above. In other words, FIG. 5 is a plan view partially illustrating an example of an arrangement of an active element 28, a gate line 15, and a source line 14. Note that, in FIG. 5, the location of the light shielding layer 23 is indicated by a two-dot chain line.

The pixel opening 18 is formed in a rectangular shape, which is one of polygonal patterns. The source lines 14 and the gate lines 15 orthogonally cross in plan view and form a matrix pattern along the sides of the pixel opening 18. A channel layer 27 is located in a central portion of an active element (thin film transistor: TFT).

Figure 6:
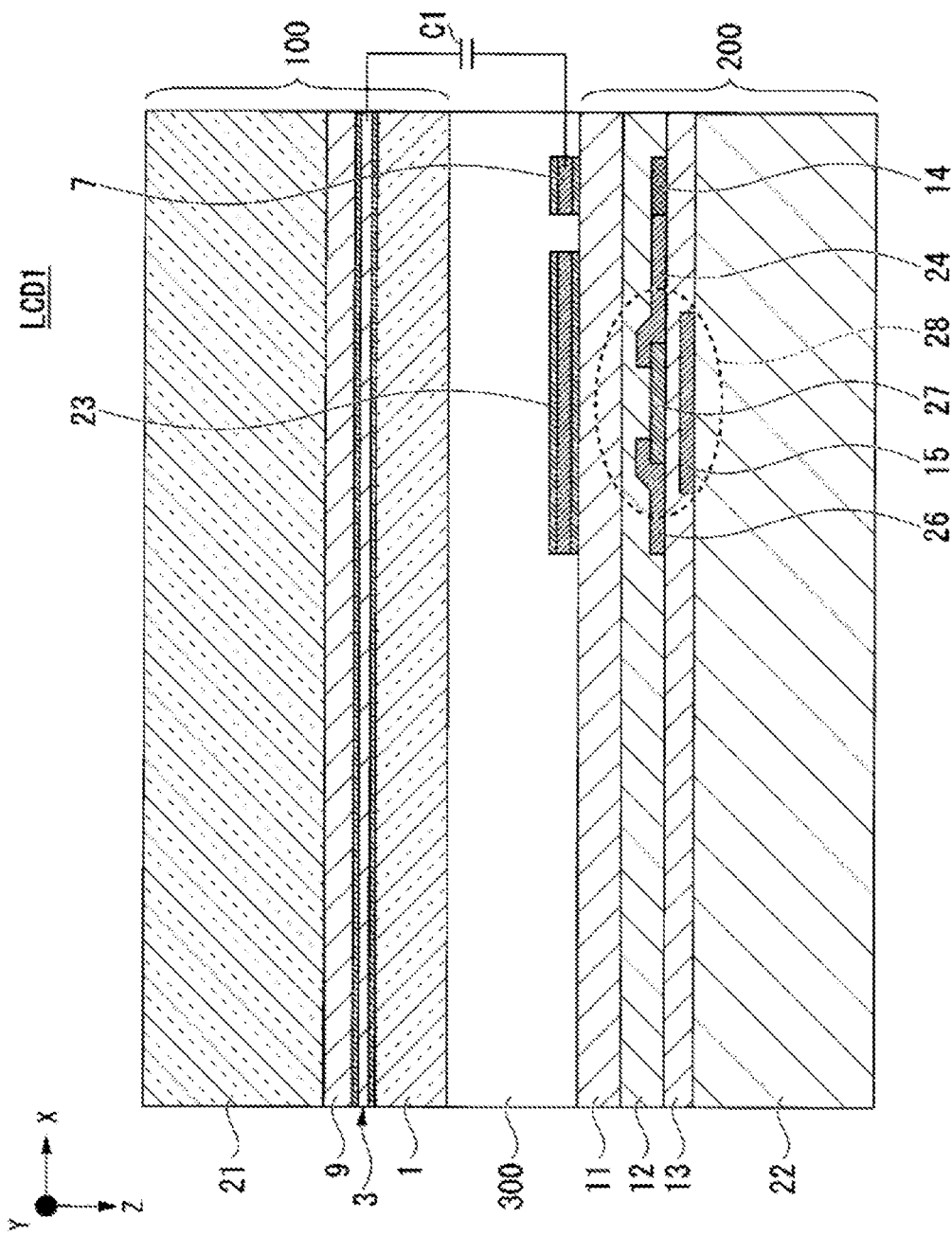
FIG. 6 is a cross-sectional view partially illustrating the liquid crystal display device according to the first embodiment of the present invention, taken along the line C-C' shown in FIG. 3.

FIG. 6 is a cross-sectional view partially illustrating a liquid crystal display device according to a first embodiment of the present invention, taken along the line C-C' shown in FIG. 3.

As shown in FIG. 6, an active element 28 is covered with a light shielding layer 23, which is a second metal layer.

Specifically, the active element 28 is a thin film transistor having a source electrode 24 electrically connected to a source line 14, a gate electrode 25 electrically connected to a gate line 15, and a channel layer 27 constituted by a semiconductor. The width of the light shielding layer 23 in the X direction is set so that the active element 28 is covered with the light shielding layer 23 in plan view.

Covering the channel layer 27 with the light shielding layer 23 prevents external light from entering the channel layer 27, and also prevents reflected light (re-reflected light) caused by light emitted from a backlight unit BU from entering the channel layer 27. This can prevent malfunction in the active element 28. As described above, a liquid crystal display device having high definition pixels such as of 300 ppi or more allows light to enter the active element 28 more easily, which causes the active element 28 to malfunction more easily, and consequently makes display quality of the liquid crystal display device more apt to deteriorate. Providing the light shielding layer 23, however, can prevent such deterioration.

The channel layer 27 is formed of an oxide semiconductor such as a metal oxide called IGZO, or others, or a silicon semiconductor such as polysilicon. Forming the channel layer with an IGZO or other oxide semiconductor containing two or more kinds of metal oxides selected from the group consisting of gallium, indium, zinc, tin, germanium, magnesium, and aluminum can substantially eliminate an influence of a coupling noise that occurs in dot inversion driving. This is because an active element using an IGZO or other oxide semiconductor can process a rectangular signal driven by a liquid crystal, which is an image signal, in an extremely short time (e.g., 2 milliseconds). Such an oxide semiconductor has memory properties that enable a liquid crystal display to hold a voltage applied to a pixel electrode after an image signal is applied. Thus, no new noise will occur while the voltage is held, which can further reduce the influence of noise caused by liquid crystal driving on touch sensing.

An IGZO or other oxide semiconductor is effective for three-dimensional image display because it has high electrical breakdown strength and therefore can drive a liquid crystal at a high speed with a higher voltage. A transistor in which an IGZO or other oxide semiconductor is used for a channel layer offers an advantage of being less liable to cause display flicker even when the liquid crystal drive frequency is low, for example, approximately 0.1 to 60 Hz because such transistors have high memory properties. Thus, the transistor not only provides a touch sensing function but also achieves a liquid crystal display device that consumes less power and flickers less.

Using a transistor in which IGZO is used for a channel layer and using dot inversion driving at low frequency in combination with touch sensing driving at another frequency can achieve low power consumption, high quality image display and high touch sensitivity. Acceptable transistor structures are a dual gate or other multi-gate structure and a bottom gate structure.

On an occasion when dot inversion driving is employed to drive a liquid crystal, using IGZO, which boasts good memory properties, can omit an auxiliary capacitance (storage capacitor) that would otherwise be necessary for constant voltage driving for maintaining the voltage of a pixel electrode at a constant voltage (constant potential).

Returning to FIG. 6, the description is continued.

The second metal layer is formed on a surface of the array substrate 200, and forms the conductive line 7 and the light shielding layer 23 as described above. The first metal layer is disposed above the display-device substrate 100 (on the first black layer 9) and forms the touch sensing line 3 (serving as a touch driving line or a touch detection line). Materials of such first metal layer and second metal layer may be identical or different. A good conductor by use of copper, aluminum, an alloy containing these or other metals is desirable as materials of the first metal layer and the second metal layer. Note that an inorganic insulation layer or an organic insulation layer may be formed as a layer located below the first metal layer or the second metal layer (underlayer) before forming the first metal layer and the second metal layer. An inorganic insulation layer or an organic insulation layer may be formed so as to cover the first metal layer or the second metal layer after patterning the touch sensing line 3 and the conductive line 7.

Figure 7:
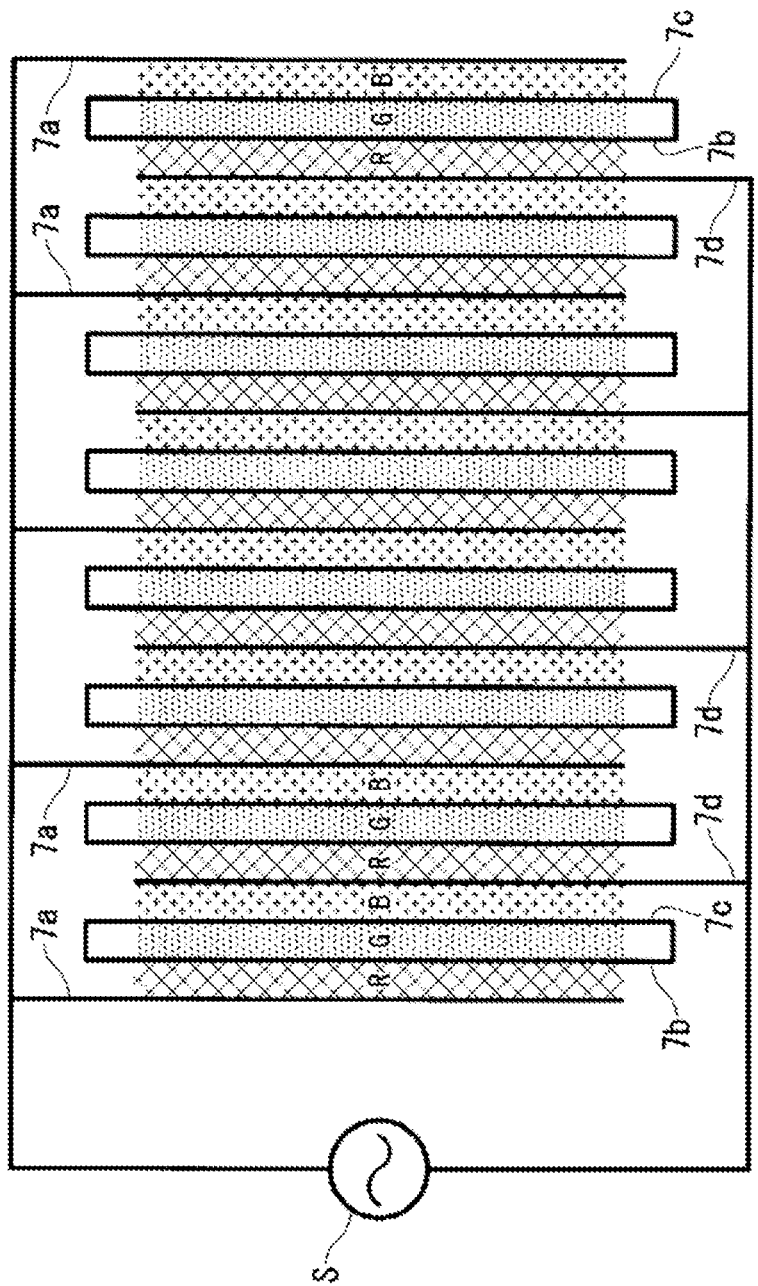
FIG. 7 is a plan view schematically illustrating conductive lines according to the first embodiment of the present invention for the purpose of illustrating conductive lines to which a reset voltage is applied.

FIG. 7 is a plan view schematically illustrating a conductive line according to an embodiment of the present invention, and is a view for describing a conductive line to which a reset voltage is applied.

FIG. 7 omits illustration of the array substrate 200 including the pixel electrode 17 and the first insulation layer 11, and shows a positional relationship among a red filter R, a green filter G, and a blue filter B, which constitute a color filter described later, and the conductive line 7.

As shown in FIG. 7, the conductive line 7 includes a first line group including a first conductive line 7a, a second line group including a second conductive line 7d, and a dummy line group including dummy lines 7b, 7c provided between the first conductive line 7a and the second conductive line 7d. The first line group and the second line group are formed in a comb shape so as to be engaged with each other.

Either a positive or negative reset voltage Vr is applied to the first line group and the second line group. When a positive voltage is applied to one line group, a negative voltage is applied to the other line group. Alternatively, one of the first line group and the second line group may be grounded (dropped to the ground) and a positive or negative voltage may be applied to the other line group (the ungrounded line group). The reset voltage to be applied to such line groups may be an AC voltage or a DC rectangular wave.

Thus, as shown in FIG. 7, an AC power supply S (virtual power supply) is taken to be virtually connected to the first line group and the second line group, where the reset voltage is an AC voltage.

Each of the plurality of first conductive lines 7a in the first line group has an end, so that the first conductive line 7a serves as an electrode (first conductive electrode). Similarly, each of the plurality of second conductive lines 7d in the second line group also has an end, so that the second conductive line 7d serves as an electrode (second conductive electrode).

The dummy lines 7b, 7c have an electrically floating potential. In the dummy line group, a lower end of the dummy line 7b and a lower end of the dummy line 7c are electrically connected, and an upper end of the dummy line 7b and an upper end of the dummy line 7c are electrically connected.

A pattern shape of the dummy lines 7b, 7c can be adjusted as appropriate by a noise filter connected to the first conductive line 7a and the second conductive line 7d, as well as by impedance, a frequency for touch sensing, and the like. The pattern shape of the dummy lines 7b, 7c should be determined in consideration of frequencies of the noise arising from liquid crystal driving, the noise entering the liquid crystal display device LCD 1 from the outside, and other noise.

As shown in FIG. 7, the dummy lines 7b, 7c form a loop antenna. The shape of the dummy lines 7b, 7c is not limited to such a loop antenna shape. For example, a dipole antenna shape with the lower end of the dummy lines 7b, 7c being opened may also be employed. Alternatively, a monopole antenna shape may be employed as well. A line width, length, pitch, etc. of the dummy lines 7b, 7c can be adjusted depending on the purposes of these lines.

The conductive lines 7 (first and second line groups) to which a reset voltage is applied as described above may serve as a touch detection line for detecting a touch sensing signal. In this circumstance, the shape of the touch detection line does not have to be necessarily linear. The touch detection line (first conductive line 7a and second conductive line 7d) may have an antenna structure for detecting a touch sensing signal well, while being hardly affected by noise. In a circumstance where the touch sensing line 3 serves as a touch detection line for detecting a touch sensing signal, the touch sensing line 3 may have an antenna structure.

A loop antenna shape, a dipole antenna shape, and a monopole antenna shape can be employed as a shape of the touch detection line. The width of the line constituting an antenna, the length of the line, the pitch of adjacent lines, and other designs can be adjusted according to the conditions of detecting touch sensing and the surrounding noise situation where the touch sensing is detected. Employing an antenna structure as the structure of a touch detection line makes the touch detection line less liable to be affected by a noise frequency.

The distance between the first conductive line 7a and the second conductive line 7d across which the reset voltage Vr is applied (e.g., the X direction) is determined according to the widths of a red filter R, a green filter G, and a blue filter B, which constitute a color filter and extend in a stripe pattern. For example, when the blue filter B is widened more than the green filter G in designing a color filter, the distance between the first conductive line 7a and the second conductive line 7d is set according to these widths. Note that the pattern of the conductive lines 7 determined in relation to the pattern of the red filter R, the green filter G, and the blue filter B shown in FIG. 7 is changed as appropriate, depending on how the liquid crystal display device LCD 1 is designed. The present invention does not limit the pattern of the conductive lines 7.

With reference to FIG. 8, a description will be given of a touch sensing line 3 provided on the display-device substrate 100. FIG. 8 is a cross-sectional view taken along the line B-B' shown in FIG. 3. As shown in FIG. 8, the touch sensing line 3 at least includes the first black layer 9 and the first metal layer 5 formed on the transparent substrate 21.

The touch sensing line 3 includes the first black layer 9 provided on the transparent substrate 21, a second conductive metal oxide layer 4 provided on the first black layer 9, a first metal layer 5 provided on the second conductive metal oxide layer 4, and a first conductive metal oxide layer 6 provided on the first metal layer 5. The first metal layer 5 is a copper-containing layer, such as a copper layer or a copper alloy layer. The touch sensing line 3 thus has a structure in which the first metal layer 5 is sandwiched between the second conductive metal oxide layer 4 and the first conductive metal oxide layer 6. As described later, a second black layer 19 may be formed on the first conductive metal oxide layer 6.

Figure 9:
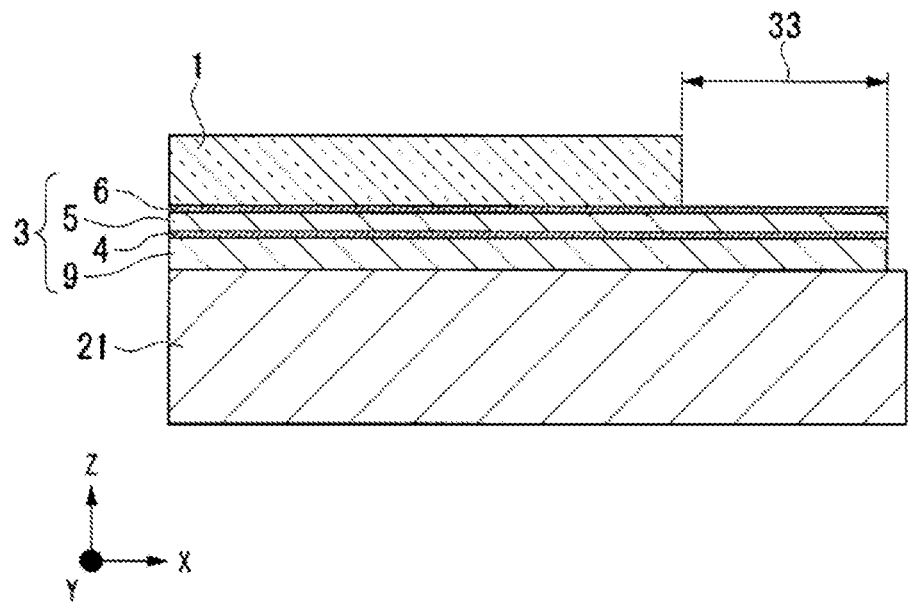
FIG. 9 is a cross-sectional view partially illustrating a terminal portion having a structure in which a first metal layer is sandwiched between conductive metal oxide layers in the liquid crystal display device according to the first embodiment of the present invention.

With reference to FIG. 9, a description will be given on a structure of the touch sensing line 3 at an end (terminal portion) of the display-device substrate 100. FIG. 9 is a cross-sectional view partially illustrating a terminal portion 33 having a structure in which the first metal layer 5 is sandwiched between conductive metal oxide layers.

Figure 10:
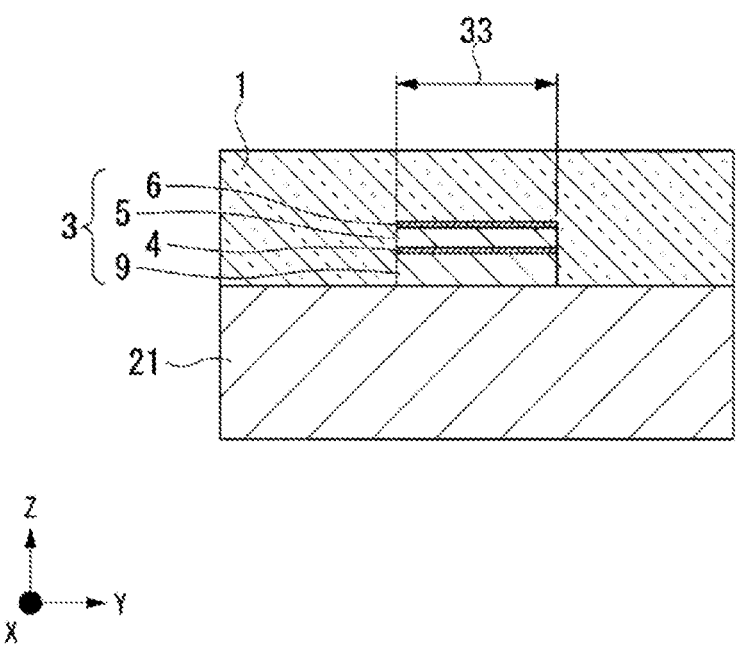
FIG. 10 is a cross-sectional view illustrating a structure of a touch sensing line according to the first embodiment of the present invention.

FIG. 10 is a cross-sectional view of the touch sensing line shown in FIG. 9, illustrating a width of the touch sensing line in the Y direction. As shown in FIGS. 9 and 10, in the terminal portion 33 formed at an end of the transparent substrate 21, the second conductive metal oxide layer 4, the first metal layer 5 (copper alloy layer), and the first conductive metal oxide layer 6 are laminated in this order on the first black layer 9 formed on the transparent substrate 21. In other words, the touch sensing line 3 has a three-layer structure. The transparent resin layer 1 is applied and formed on the transparent substrate 21 so as to have, for example, an area corresponding to a rectangular display surface in plan view. The transparent resin layer 1 is not formed on the terminal portion 33. The surface of the terminal portion 33 is covered with the first conductive metal oxide layer 6, and the first conductive metal oxide layer 6 is exposed at the terminal portion 33. This enables the terminal portion 33 to form a stable electrical connection.

At an end of the array substrate 200, a terminal portion is provided so as to correspond to the location of the terminal portion 33 of the display-device substrate 100 in plan view. The terminal portion of the array substrate 200 and the terminal portion 33 of the display-device substrate 100 are electrically connected to each other.

An electric connection (conduction) can be achieved between the terminal portion of the display-device substrate 100 and the terminal portion of the array substrate 200, for example, by forming a conductive column (connecting conductor) with a size of several μm to several tens of μm in a sealing portion for sealing the liquid crystal layer 300.

This connects the touch sensing line 3 to a touch sensing and reset signal control unit 122 of the liquid crystal display device LCD 1, as shown in FIG. 1. In other words, a signal is transmitted from the touch sensing and reset signal control unit 122 to the touch sensing line 3, or vice versa, through a conductive column provided between the terminal portion 33 of the display-device substrate 100 and the terminal of the array substrate 200. This makes it possible to provide a display-device substrate that enables stable electrical implementation.

(Operation of Liquid Crystal Display Device LCD 1)

(1. Operation of Rapidly Bringing Liquid Crystals Back to be Vertically Aligned by Voltage Application to a Conductive Line)

Figure 11:
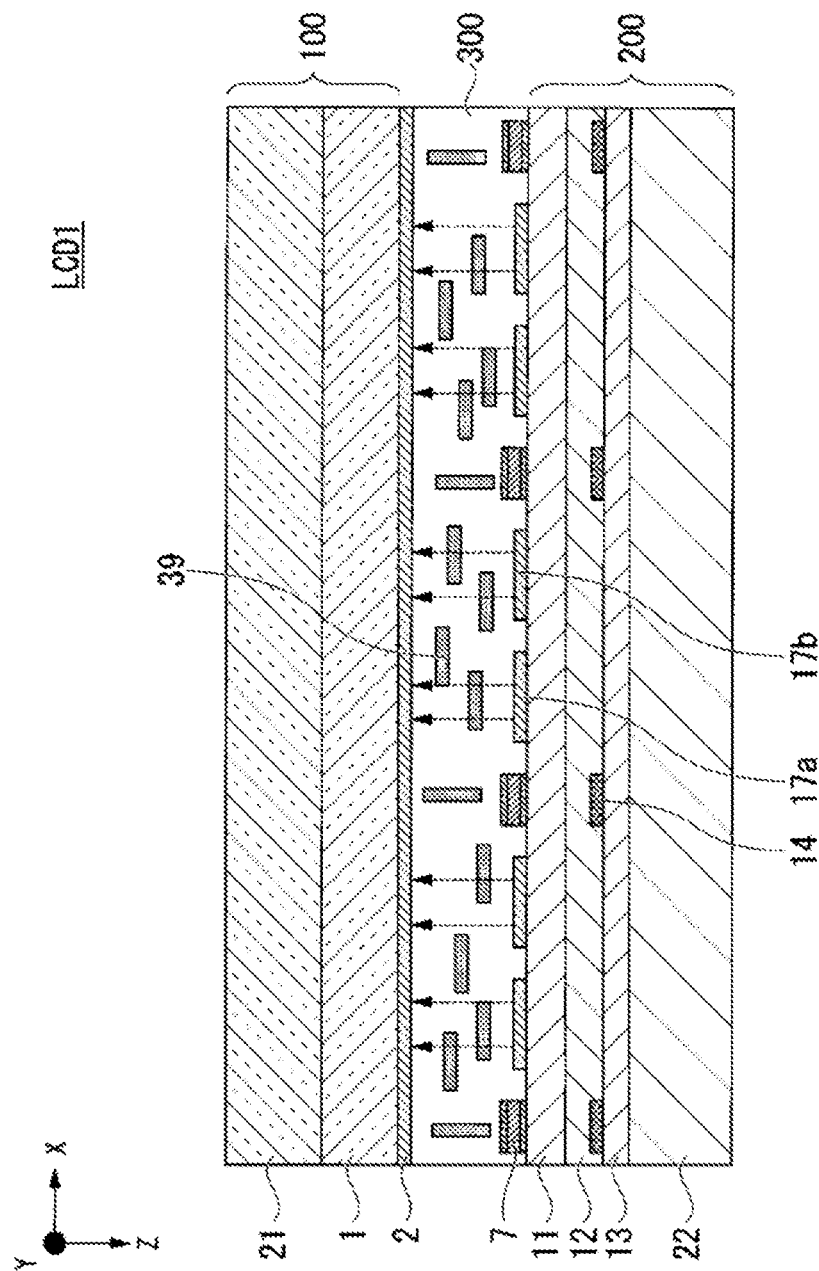
FIG. 11 is a cross-sectional view that partially illustrates the liquid crystal display device according to the first embodiment of the present invention, that is, partially illustrates a state of white display.

FIG. 11 is a cross-sectional view partially illustrating a state of white display created when a liquid crystal driving voltage is applied across the transparent electrode 2 and the pixel electrode 17 (when a liquid crystal driving voltage is turned ON).

Applying a liquid crystal driving voltage across the electrode portions 17a, 17b of the pixel electrode 17 and the transparent electrode 2 generates an electric field between the pixel electrode 17 and the transparent electrode 2. By an action of such an electric field, a liquid crystal molecule 39 tilts until it lies parallel to a surface of the array substrate 200 to create a white display on the liquid crystal display device LCD 1. No voltage is applied to the conductive line 7 while a liquid crystal driving voltage is turned ON.

Figure 12:
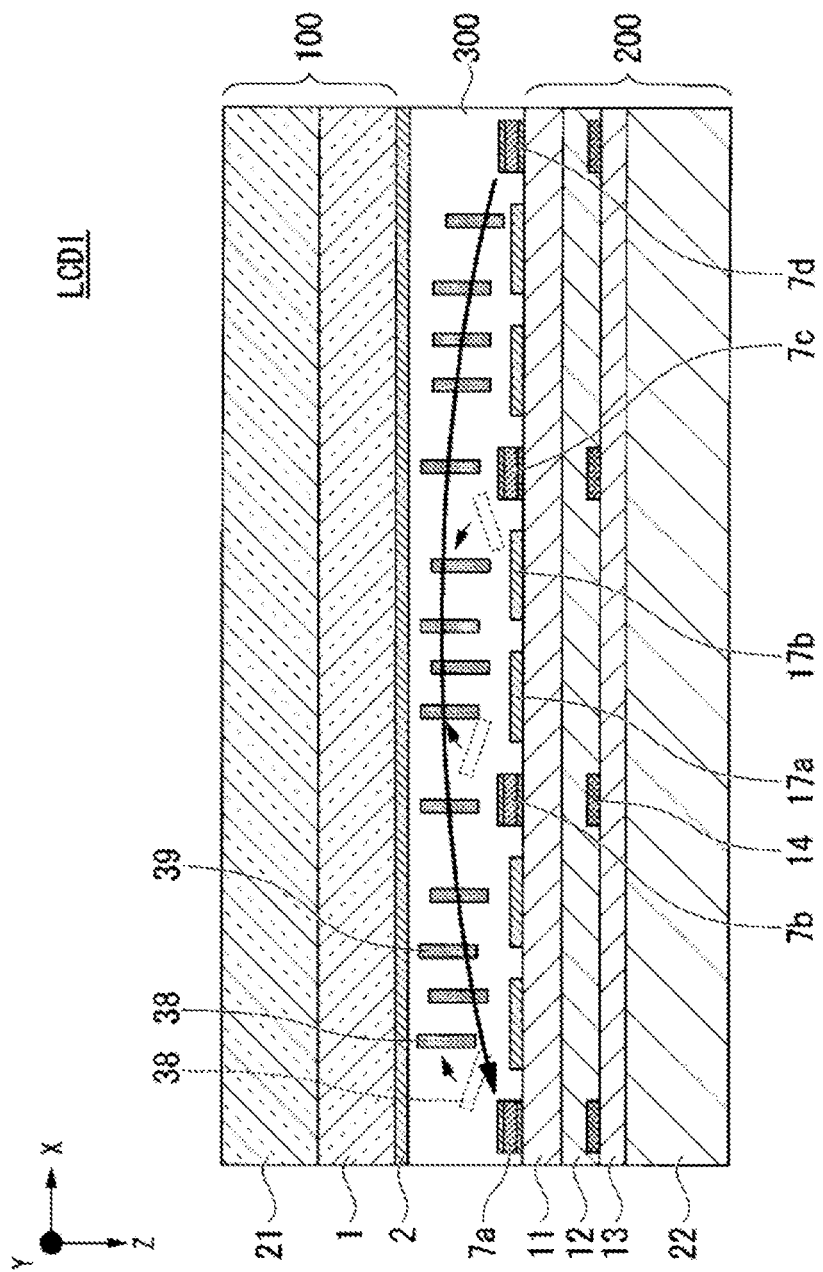
FIG. 12 is a cross-sectional view partially illustrating the liquid crystal display device according to the first embodiment of the present invention, that is, a view illustrating how liquid crystal molecules return at a time when a reset voltage is applied to the liquid crystal molecules immediately after stopping the application of a liquid crystal driving voltage (when a liquid crystal driving voltage is turned OFF).

FIG. 12 shows how liquid crystal molecules restore their alignment at a time when a reset voltage is applied to liquid crystal molecules immediately after stopping the application of a liquid crystal driving voltage across the transparent electrode 2 and the pixel electrode 17 (while a liquid crystal driving voltage is turned OFF). In FIG. 12, a reset voltage is applied across the two conductive lines 7, that is, the first conductive line 7a and the second conductive line 7d. This generates an electric field between the first conductive line 7a and the second conductive line 7d (in the direction from the second conductive line 7d to the first conductive line 7a), and brings the liquid crystal molecules that have lain parallel to the substrate surface of the array substrate 200 rapidly back to be vertically aligned. As a result, the liquid crystal display changes from white to black.

Specifically, after the liquid crystal driving voltage is turned OFF, setting the potential of the first conductive line 7a to 0 V (ground) and applying a reset voltage to the second conductive line 7d, that is, applying a reset voltage across the first conductive line 7a and the second conductive line 7d, generates an electric field from the second conductive line 7d toward the first conductive line 7a. In plan view, such an electric field occurs in a direction intersecting the liquid crystal layer 300 located between the first conductive line 7a and the second conductive line 7d, and the source line 14. In this circumstance, a major axis of a liquid crystal molecule 38 having negative dielectric anisotropy becomes perpendicular to a direction in which the electric field is applied. As shown in FIG. 12, the liquid crystal molecule 38 is thus aligned vertically, as it was initially aligned, and provides black display in a short time.

A reset voltage applied between the first conductive line 7a and the second conductive line 7d may be lower than or equal to a liquid crystal driving voltage (e.g., 6 V). The reset voltage may be within the range of 0.5 V to 6 V (the liquid crystal driving voltage) because a threshold voltage for operating the liquid crystal molecules is, for example, 0.5 V to 6 V. The reset voltage is a voltage for rapidly bringing the liquid crystal molecules lying parallel to a substrate surface back to be vertically aligned (initial alignment); hence the voltage value may be lowered. Applying a reset voltage across the first conductive line 7a and the second conductive line 7d can significantly shorten τoff.

Figure 13:
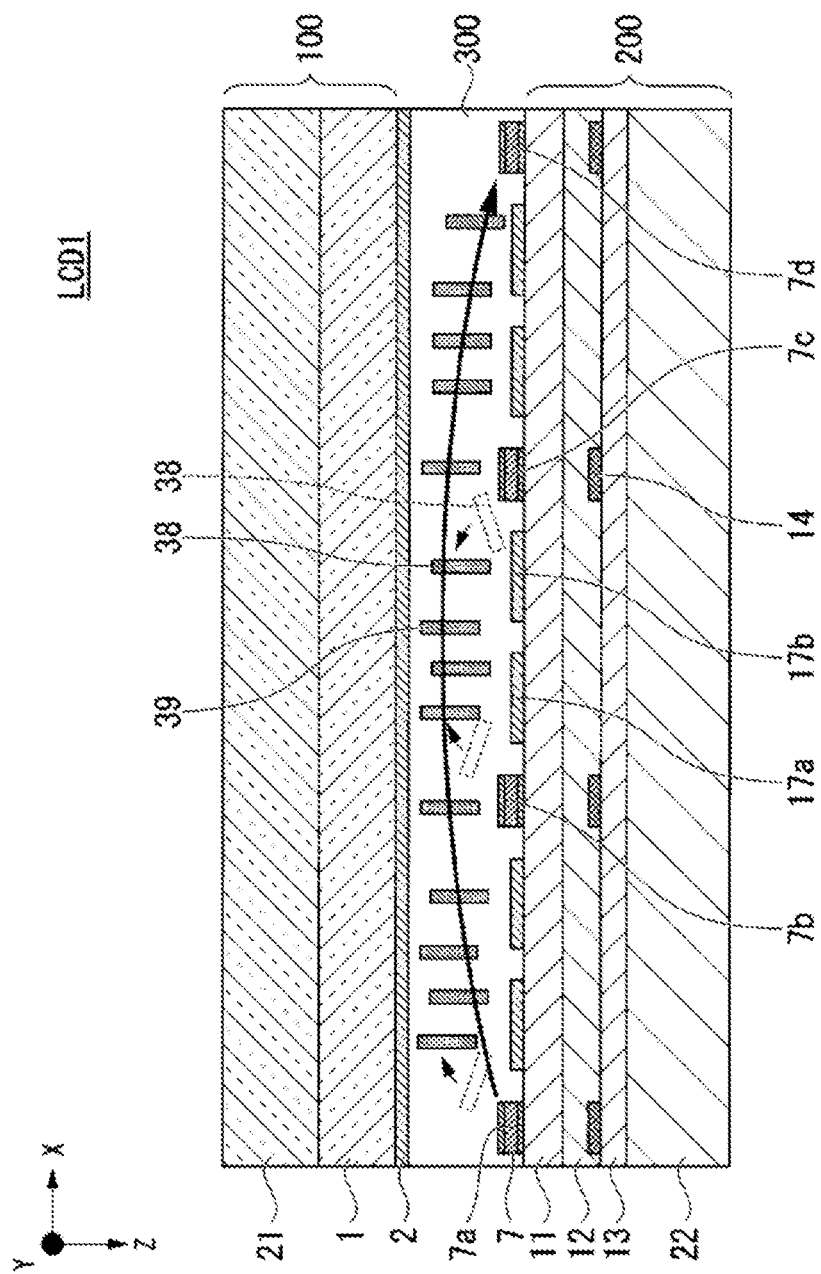
FIG. 13 is a cross-sectional view partially illustrating the liquid crystal display device according to the first embodiment of the present invention, that is, a view illustrating how liquid crystal molecules return on an occasion when an electric field is applied in a direction opposite to the electric field direction shown in FIG. 12, at a time when a reset voltage is applied to the liquid crystal molecules immediately after stopping the application of a liquid crystal driving voltage (while the liquid crystal driving voltage is turned OFF).

Similar to FIG. 12, FIG. 13 shows how liquid crystal molecules restore their alignment at a time when a reset voltage is applied to liquid crystal molecules immediately after stopping the application of a liquid crystal driving voltage across the transparent electrode 2 and the pixel electrode 17 (while a liquid crystal driving voltage is turned OFF). In FIG. 13, after the liquid crystal driving voltage is turned OFF, a reset voltage is applied across the first conductive line 7a and the second conductive line 7d, and the tilted liquid crystal molecules 38, 39 are brought back to be vertically aligned, which is their initial alignment, to create black display on the liquid crystal display device LCD 1. However, FIG. 13 is different from FIG. 12 in that a reset voltage is applied to the first conductive line 7a and the potential of the second conductive line 7d is set to 0 V (ground). In other words, in FIG. 13, a reset voltage, whose positive and negative voltages are inverted from those shown in FIG. 12, is applied across the two conductive lines. This generates an electric field between the first conductive line 7a and the second conductive line 7d (in the direction from the first conductive line 7a to the second conductive line 7d), and rapidly brings the liquid crystal molecules lying parallel to a substrate surface of the array substrate 200 back to be vertically aligned. As a result, the liquid crystal display turns from white to black.

By alternately inverting the positive and negative voltages of the reset voltage as shown in FIGS. 12 and 13, an electric field occurring in the direction from the second conductive line 7d to the first conductive line 7a and an electric field occurring in the direction from the first conductive line 7a to the second conductive line 7d are alternately generated with the lapse of time. Electric charge can accumulate in a liquid crystal cell and cause image sticking can thus be neutralized.

The timing of applying a reset voltage to the conductive line 7 is based on the timing diagram shown in FIG. 15, which is described later. Inversion of positive and negative voltages is controlled by a control unit 120.

(2. Operation of Performing Touch Sensing by Use of a Conductive Line)

Figure 14:
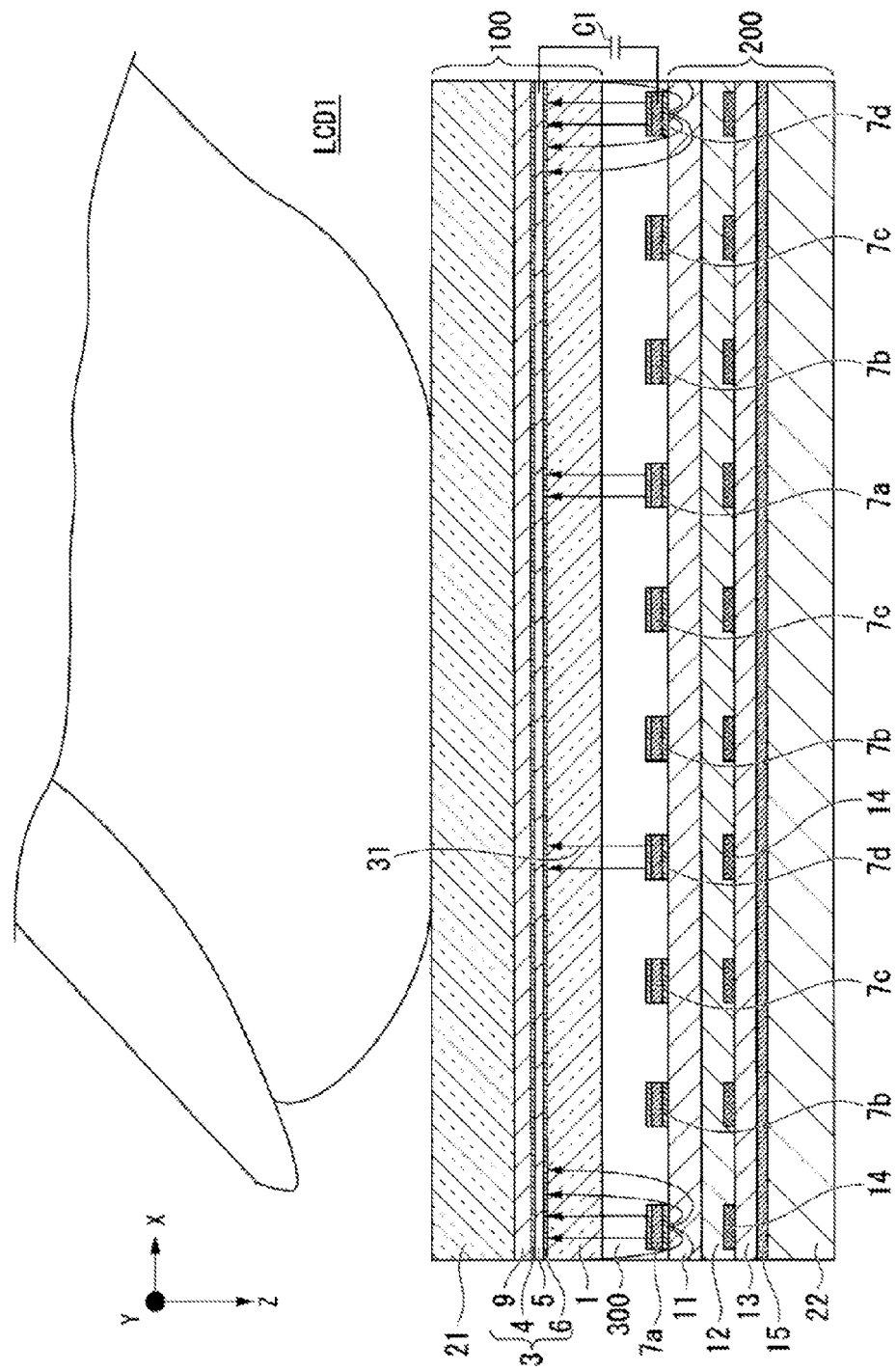
FIG. 14 is a cross-sectional view partially illustrating the liquid crystal display device according to the first embodiment of the present invention, taken along the line B-B' shown in FIG. 3, that is, a view illustrating how a fringe electric field changes when a finger or other pointer comes into contact with or comes close to a display-device substrate.

FIGS. 8 and 14 are views taken along the line B-B' shown in FIG. 3.

FIG. 8 partially illustrates a state of a fringe electric field occurring when a touch sensing driving voltage is applied across a conductive line and the touch sensing line 3.

FIG. 14 partially illustrates how the fringe electric field changes when a touch sensing driving voltage is applied across the conductive line and the touch sensing line 3 and when a finger or other pointer comes into contact with or comes close to the surface of the display-device substrate 100 facing the observer.

In FIGS. 8 and 14, the first conductive line 7a, the dummy line 7b, the dummy line 7c, the second conductive line 7d, the dummy line 7b, the dummy line 7c, the first conductive line 7a, the dummy line 7b, the dummy line 7c, and the second conductive line 7d are arranged from the right to the left so that these lines correspond to the line pattern shown in FIG. 7. In FIGS. 8 and 14, the touch sensing line 3 serves as a touch detection line (touch sensing detection line) for detecting a touch sensing signal. The first conductive line 7a and the second conductive line 7d serve as a touch driving line (touch sensing driving line). The potential of each of the dummy line 7b and the dummy line 7c is a floating potential.

In FIG. 8, a fringe electric field occurs between the conductive lines 7 (7a, 7d) across which a touch sensing driving voltage is applied and the touch sensing line 3 (touch detection line) so that the electric force lines 31, 32 are oriented from the conductive lines 7 to the touch sensing line 3. At this time, an electrostatic capacitance C1 is held between the conductive lines 7 and the touch sensing line 3.

As shown in FIG. 14, the touch sensing line 3 detects a change in electrostatic capacitance as a touch sensing signal when a finger or other pointer comes into contact with or comes close to the transparent substrate 21.

The touch sensing line 3 serving as a touch detection line in FIGS. 8 and 14 may serve as a touch driving line. In this circumstance, the conductive lines 7 serve as a touch detection lines. The roles of the touch sensing line 3 can be thus switched.

An inorganic or organic film imparted with visible light absorptivity may be laminated on the conductive lines 7 (7a, 7b, 7c, 7d). On an occasion when an inorganic film having visible light absorptivity is used, a metal oxide film or a multilayer structure including the oxide film constitutes the inorganic film. On an occasion when an organic film having visible light absorptivity is used, a black layer described later, as an example, can be used as the organic film. Some or all of the conductive lines 7 (7a, 7b, 7c, 7d) can be used as touch driving lines, and alternatively some or all of the conductive lines 7 (7a, 7b, 7c, 7d) can be used as touch detection lines.

In the present embodiment, in a circumstance where the conductive lines 7 (7a, 7d) are used as touch driving lines, application of a reset voltage Vr to the conductive lines 7 and application of a touch sensing driving voltage $V_{touch}$ to the conductive lines 7 are performed in a time-division manner as described later.

In a circumstance where the conductive lines 7 are used as touch detection lines, the touch sensing line 3 serves as a touch driving line. In this circumstance, a touch sensing driving voltage $V_{touch}$ is applied to the touch sensing line 3 and the reset voltage Vr is applied to the conductive lines 7, so that the conductive lines 7 detect a touch sensing signal.

Some of the plurality of conductive lines 7 may have a floating potential. Further, one of the two conductive lines may be grounded at a time of a changeover of the reset voltage between positive and negative (e.g., at a time of a changeover of a state in which an electric field occurs (an electric field direction) from the state shown in FIG. 12 to the state shown in FIG. 13). Optional actions on the conductive lines 7, such as applying a reset voltage to the conductive lines 7, changing the potential of the conductive lines 7 to a floating potential, and connecting the conductive lines 7 to the ground (grounding), can be performed via a switching element.

In the touch sensing described above, there is no need to use all the touch sensing lines constituting the liquid crystal display device for the touch sensing operation. In this circumstance, all the touch sensing lines may be divided into a plurality of groups at first. The groups must be fewer than all the touch sensing lines. For example, six lines may be taken to constitute one group. In this case, for example, two lines (lines fewer than all the lines) are selected out of all the six lines. In one group, the selected two lines are used to carry out a touch sensing operation, and the potentials of the remaining four lines are set to a floating potential (thinned-out driving). Since the liquid crystal display device has a plurality of groups, it can carry out a touch sensing operation for each group in which the functions of the lines are defined as described above.

The following description addresses a driving frequency of touch sensing.

For example, in a circumstance where the potential of a transparent electrode, which is a common electrode for liquid crystal driving, is set to a constant potential of zero volts and dot inversion driving is performed at each of a plurality of pixels, the transparent electrode plays a role of an electric shield in liquid crystal driving and touch sensing driving.

In the case where the touch sensing line 3 provided on the display-device substrate 100 is permitted to serve as a touch driving electrode and the conductive line 7 provided on the array substrate 200 is permitted to serve as a touch detection electrode, driving conditions of touch sensing can be differentiated from driving conditions of liquid crystals (frequency, voltage, etc.).

For example, the touch sensing drive frequency can be set to 60 Hz to several tens of KHz, and the liquid crystal driving frequency can be set to 0.1 Hz to 480 Hz. In a circumstance where liquid crystals are driven by a TFT in which the channel layer of an active element is formed of an IGZO or other oxide semiconductor, the driving frequency can be set to 60 Hz or less. Further, touch driving and liquid crystal driving can be carried out in a time-division manner.

In a circumstance where one of the touch sensing lines 3 provided on the display-device substrate 100 or the conductive lines 7 provided on the array substrate 200 is permitted to serve as a touch driving electrode (scanning electrode), a scanning frequency at which an electrostatic capacitance is detected can be arbitrarily adjusted in accordance with a required touch input speed.

(3. Time-Division Driving of Application of Voltage to Conductive Line and Touch Sensing Operation)

The following description addresses the timing at which the reset voltage Vr is applied to the conductive lines 7 and the timing at which touch sensing driving is carried out.

Figure 15:
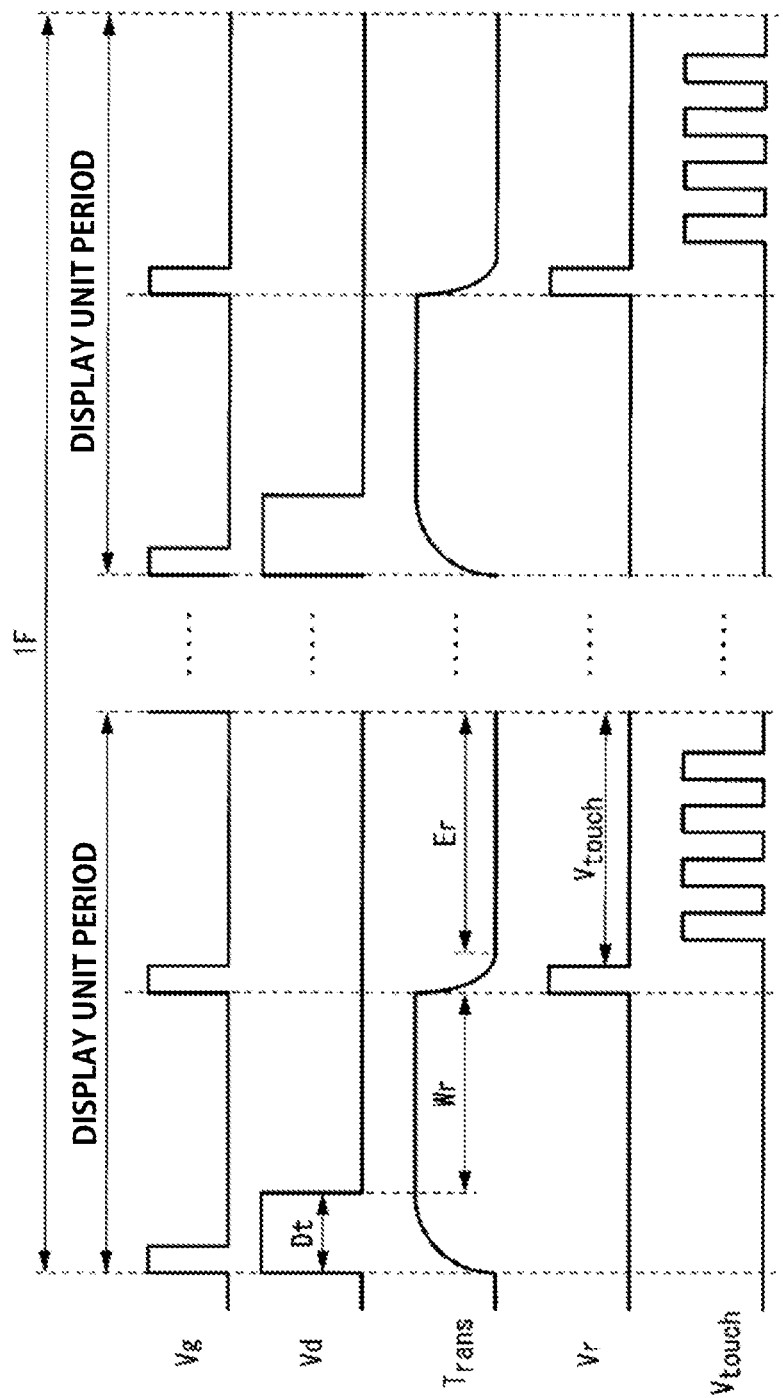
FIG. 15 is a signal timing diagram for describing a liquid crystal display device according to an embodiment of the present invention, that is, for showing an example of waveforms of signals and the like on an occasion when liquid crystal driving and touch sensing driving are performed in a time-division manner.

FIG. 15 is a signal timing diagram for describing a liquid crystal display device LCD 1 according to an embodiment of the present invention, that is, showing an example of waveforms of signals in a circumstance where liquid crystal driving and touch sensing driving are carried out in a time-division manner.

The display period shown in FIG. 15 is a period of one frame (1F), for example, a period during which image writing corresponding to 60 Hz is performed. FIG. 15 shows timings at which white display (a liquid crystal driving voltage is turned ON) and black display (a liquid crystal driving voltage is turned OFF) are performed in one pixel unit period during the one frame period.

In FIG. 15, reference sign Vg denotes a signal (gate signal) supplied to the gate line 15, and a waveform of the signal. Reference sign Vd denotes a signal (image signal) supplied to the source line 14, and a waveform of the signal. Reference sign $T_{rans}$ denotes a state in which the active element 28 is writing video to the pixel electrode 17, that is, denotes a transmittance of a liquid crystal. Reference sign Vr denotes a signal applied to the conductive line 7, and a waveform of the signal. Reference sign $V_{touch}$ denotes a signal of a touch sensing driving voltage and a waveform of the signal.

During the display unit period, the signal Vg is supplied to the gate line 15 twice at a regular interval. At a time when an image is written to the pixel electrode 17 through the active element 28, the signal Vd is supplied to the source line 14 in synchronization with the generation of the signal Vg. This turns the active element 28 ON, and starts image writing to the pixel electrode 17. As liquid crystal molecules change their alignment from vertical to horizontal, the transmittance $T_{rans}$ increases. The signal Vd continues to be supplied to the source line 14 until the transmittance $T_{rans}$ reaches a given level, and then the white display is held. A signal Vd application period Dt denotes a time period during which a liquid crystal driving voltage is applied. When the transmittance $T_{rans}$ reaches a given level, it is then maintained for a stable white display period Wr. When the reset voltage Vr is applied to the conductive lines 7 thereafter, the transmittance $T_{rans}$ decreases as the liquid crystal molecules lying parallel to the substrate surface rapidly rise back to vertical alignment, and then the display turns black. Reference sign Er shown in FIG. 15 represents a stable black display period, during which the transmittance of the black display is stable. During the stable black display period Er, a pulsed signal $V_{touch}$ is generated to apply a touch sensing driving voltage to the conductive lines 7, so that the touch sensing line 3 detects a touch sensing signal. In a circumstance where the touch sensing line 3 serves as a touch driving line, a touch sensing driving voltage is applied to the touch sensing line 3 with the generation of the signal $V_{touch}$, so that the conductive line 7 detects a touch sensing signal.

The stable white display period Wr depends on the type of semiconductor material that constitutes a channel layer 27 of the active element 28. For example, for an active element 28 whose channel layer 27 is formed of an oxide semiconductor, the application time of the signal Vd may be short. The active element 28 can hold a voltage satisfactorily and therefore maintain a high transmittance even after the application time Dt has elapsed. A relationship between the signal Vd and the transmittance $T_{rans}$ will be described later.

The reset voltage Vr is applied to the second touch sensing line 7 at a timing: (1) after image writing to a pixel is performed (after image display lasting over a display unit period), (2) after image writing is performed in a horizontal line, (3) after image writing is performed in a vertical line, or (4) after an image writing is performed at one frame.

In a circumstance where the liquid crystal display device is driven by the dot inversion driving method, it is preferable to apply a reset voltage to a conductive line 7 of each of pixel electrodes after an image is written to a pixel electrode. Note that a display unit period refers to a period during which image writing to one pixel and resetting thereof is performed on an occasion of dot inversion driving, while it refers to a period of image writing to one horizontal line and resetting thereof on an occasion of one horizontal line driving. On an occasion when a frame inversion is performed on one screen, a display unit period refers to a period during which an image is written to one screen and resetting thereof.

A timing of applying the reset voltage Vr can be provided after such a display unit period has elapsed and while the liquid crystal driving voltage is turned OFF (a voltage is applied to the conductive line after the liquid crystal driving voltage is applied to the pixel electrode and while the liquid crystal driving voltage is not applied to the pixel electrode).

At a time when an image is written to a pixel, noise occurs less frequently in an inversion driving method that acts on groups of pixels before performing an inversion, such as one-vertical-line inversion driving (column inversion driving), than in dot inversion driving, which performs inversion at individual pixels.

As described above, one pixel unit period is made up of a period of white display (ON) and a period of black display (OFF). In synchronization with a black display (OFF) signal, the reset voltage Vr is applied to the conductive lines 7. In FIG. 15, the touch sensing period $T_{touch}$ represents a period from the point of time when the reset voltage Vr has been applied to the conductive line 7 to the point of time when the subsequent signal Vg is generated. There are timings when: the reset voltage is applied to the conductive line 7; a source signal is applied to the source line; and a gate signal is applied to the gate line. One of all these timings can be delayed, for example, by around 20 nanoseconds to 2 milliseconds using a delay circuit so as to prevent noise from occurring and overlapping a touch sensing event.

Comparing an active element (thin film transistor) including a channel layer formed of IGZO or other oxide semiconductor, with an active element including a channel layer formed of, for example, an amorphous silicon semiconductor, there is a significant difference in transmittance $T_{rans}$ of a pixel (liquid crystal display).

As shown in FIG. 15, a channel layer formed of an oxide semiconductor exhibits a sharp rise in transmittance $T_{rans}$ after an image has been written by an active element writing.

Figure 30:
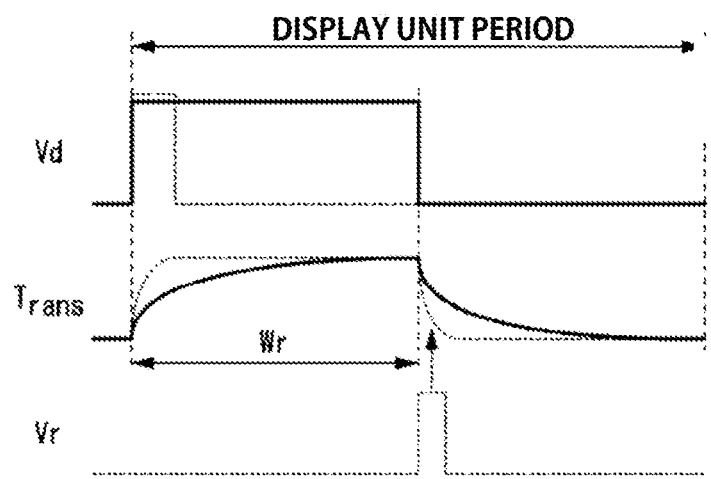
FIG. 30 is a diagram comparing a waveform related to liquid crystal driving in a conventional example and a waveform related to liquid crystal driving in a liquid crystal display device according to an embodiment of the present invention.

In contrast, as shown in FIG. 30, a channel layer formed of an amorphous silicon semiconductor exhibits a gradual rise in transmittance $T_{rans}$ after an image has been written by an active element writing.

The comparison finds that a channel layer formed of an amorphous silicon semiconductor causes more transistor leakage current. Compensating for a voltage drop due to a leakage current requires continuous application of the signal Vd (liquid crystal driving voltage) to the source line during the stable white display period Wr.

A channel layer formed of an oxide semiconductor, however, causes a leakage current that is lower by around three orders of magnitude than an amorphous silicon semiconductor has, and therefore can hold a voltage. Thus, the application time Dt of a liquid crystal driving voltage may be shorter. The touch sensing frequency of the touch sensing period $T_{touch}$ needs to be higher than the liquid crystal driving frequency. This is because the timing of a touch sensing event is irregular and short. For this reason, the touch sensing frequency (detection frequency) is preferably high in order to avoid a touch being undetected.

Performing touch sensing driving at a high frequency and obtaining an integrated value of a touch sensing signal enables stable detection of a touch sensing event. It is desirable to avoid detecting a touch sensing signal at the timing immediately after turning ON and OFF of a liquid crystal driving voltage for writing an image to an active element, in order to reduce the amount of noise affecting the touch sensing signal. Hence, a touch sensing signal can be detected during the stable white display period Wr during which the transmittance of white display is stable and during the stable black display period Er during which the transmittance of black display is stable.

As shown in the timing diagram of FIG. 15, a touch sensing signal is detected at a high frequency in the stable black display period Er. During the stable black display period Er, light emission of an LED or other light emitting element the backlight unit BU can be stopped.

(Modification of Touch Sensing Line 3)

The touch sensing line 3 according to the above embodiment has a structure in which a first black layer 9, a second conductive metal oxide layer 4, a first metal layer 5, and a first conductive metal oxide layer 6 are sequentially laminated on a transparent substrate 21. A structure in which a second black layer is provided on the first conductive metal oxide layer 6 may also be provided as a modification of the touch sensing line 3.

(Method of Manufacturing Display-Device Substrate 100)

The following description addresses a method of manufacturing a display-device substrate 100 equipped with a liquid crystal display device LCD 1 according to the first embodiment. The following description refers particularly to a process of forming the touch sensing line 3 on the transparent substrate 21. The following description also refers to a method of manufacturing the touch sensing line 3 according to the first embodiment and a method of manufacturing the touch sensing line 3 according to the modification described above.

FIGS. 16A to 16G show a part of a process of manufacturing a display-device substrate having a touch sensing line. This method can form a touch sensing line including a black layer and a metal layer with an identical line width.

Figure 16A:
FIG. 16A is a process chart of an example of a process of manufacturing a conductive line according to the first embodiment of the present invention.

A transparent substrate 21 is prepared at first, as shown in FIG. 16A.

Figure 16B:
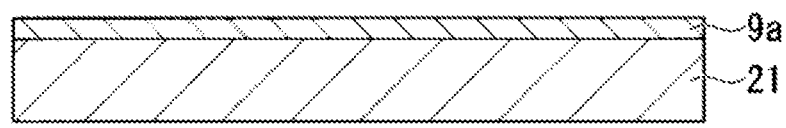
FIG. 16B is a process chart of an example of a process of manufacturing a conductive line according to the first embodiment of the present invention.

Then, as shown in FIG. 16B, a thermosetting black coating liquid in which carbon is used as a coloring material is applied onto the entire surface of the transparent substrate 21. Thereafter a 250° C. heat treatment is applied to the black coating liquid, followed by hardening the film to form a first entirely black layer 9a.

Figure 16C:
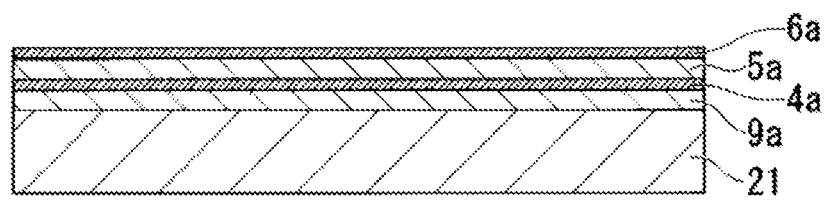
FIG. 16C is a process chart of an example of a process of manufacturing a conductive line according to the first embodiment of the present invention.

Then, as shown in FIG. 16C, a second entirely conductive metal oxide (composite oxide) layer 4a, a first entirely metal surface layer 5a, and a first entirely conductive metal oxide layer 6a are continuously formed on the first entirely black layer 9, the second entirely conductive metal oxide layer 4a being made of a ternary mixed oxide (composite oxide) containing zinc oxide, indium oxide, and tin oxide, the first entirely conductive metal oxide layer 6a being made of the same material as the second entirely conductive metal oxide layer 4a, Here, the second entirely conductive meta oxide layer 4a, the first entirely metal layer 5a, and the first entirely conductive metal oxide layer 6a are formed so as to substantially cover the surface of the transparent substrate 21. A sputtering device is used to continuously form these three layers while maintaining a vacuum.

The second entirely conductive metal oxide layer 4a will serve as a second conductive metal oxide layer 4 after a patterning process. The first entirely metal layer 5a will serve as a first metal layer 5 after a patterning process. The first entirely conductive metal oxide layer 6a will serve as a first conductive metal oxide layer 6 after the patterning process.

Compositions of zinc oxide, indium oxide, and tin oxide constituting the second entirely conductive metal oxide layer 4a and the first entirely conductive metal oxide layer 6a are as follows. Compositions of a copper alloy (copper-containing layer) constituting the first entirely metal layer 5a are as follows. In the following compositions, metal elements in a mixed oxide are shown in atomic percent (hereinafter referred to as at %), where oxygen is not taken into account but only metal elements are taken into account.

Composition of the first entirely conductive metal oxide layer 6a (first conductive metal oxide layer 6): In:Zn:Sn=88:10:2.

When the amount of all the metals constituting the first entirely conductive metal oxide layer 6a is taken to be 100%, the proportion of In is 88%, the proportion of Zn is 10%, and the proportion of Sn is 2%.

Composition of the second entirely conductive metal oxide layer 4a (second conductive metal oxide layer 4): In:Zn:Sn=90:8:2.

When the amount of all the metals constituting the first entirely conductive metal oxide layer 4a is taken to be 100%, the proportion of In is 90%, the proportion of Zn is 8%, and the proportion of Sn is 2%.

Composition of the first while-surface metal layer 5a (first metal layer 5): Cu:Mg=99.5:0.5.

When the amount of all the metals constituting the first entirely metal layer 5a is taken to be 100%, the proportion of Cu is 99.5% and the proportion of Mg is 0.5%.

Zinc (Zn) in the first entirely conductive metal oxide layer 6a and the second entirely conductive metal oxide layer 4a may be greater than tin (Sn). Containing more tin than zinc poses trouble in wet etching (a process carried out after a film forming process). In other words, in this occasion, the metal layer containing copper is etched more than the conductive metal oxide layer, failing to provide desired etching selectivity. As a result, the second conductive metal oxide layer 4, the first metal layer 5, and the first conductive metal oxide layer 6 are apt to have a different line width.

A small amount of titanium, zirconium, magnesium, aluminum, germanium or other elements can also be added to the conductive metal oxide layer.

Figure 16D:
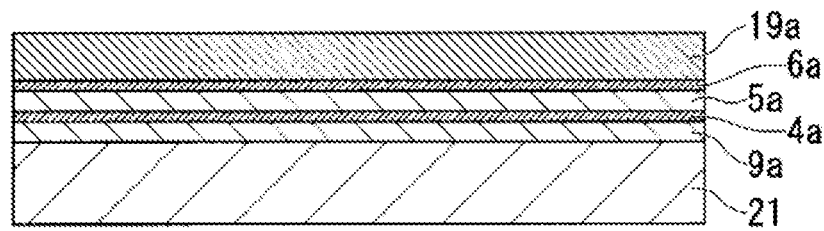
FIG. 16D is a process chart of an example of a process of manufacturing a conductive line according to the first embodiment of the present invention.

As shown in FIG. 16D, after the metal layer is formed, a black coating liquid containing carbon as a main coloring material and having alkali developability and photosensitivity is applied onto the transparent substrate 21. Then the black coating solution is dried to form a second entirely black layer 19a. The dry thickness of the second entirely black layer 19a is approximately 1.1 μm.

The following description addresses an example in which a negative type photosensitive resist is used as the second entirely black layer 19a, but a positive type photosensitive resist may be used.

In the subsequent process, a halftone mask is used. The halftone mask has a region with a 100 percent transmittance, a region with a 40 percent transmittance, and a region with a 0 percent transmittance. The region with a 40 percent transmittance is a mask region for forming a terminal portion 33 on the display-device substrate 100, and the region with a 100 percent transmittance is a mask region for forming a pattern of the touch sensing line 3 on the display-device substrate 100. A substrate constituting this halftone mask is an artificial quartz substrate, and the transmittance mentioned above is a transmittance referencing the transmittance of the artificial quartz substrate.

An exposure treatment is applied to the transparent substrate 21 on which the second entirely black layer 19a is, through such a halftone mask. After the exposure treatment, the transparent substrate 21 is alkali-developed to obtain a transparent substrate 21 having the laminated structure shown in FIG. 16E.

Figure 16E:
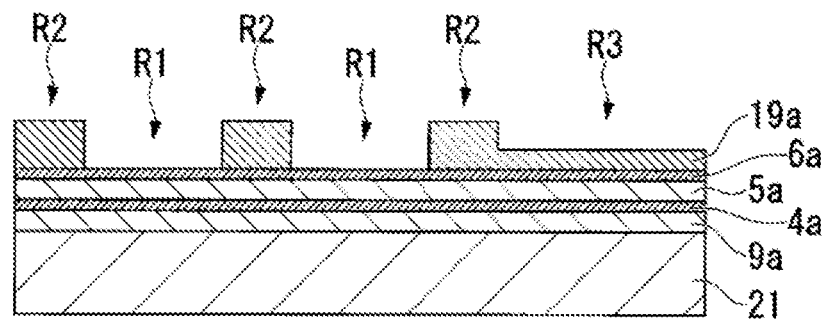
FIG. 16E is a process chart of an example of a process of manufacturing a conductive line according to the first embodiment of the present invention.

As shown in FIG. 16E, in a substrate region R1, which corresponds to the region with the 0 percent transmittance of the halftone mask (the region in which the exposed portion of the photosensitive resist is developed and removed), the second entirely black layer 19a has been completely removed to expose the first entirely conductive metal oxide layer 6a.

In a substrate region R2, which corresponds to the region with the 100 percent transmittance of the half-tone mask (the region in which the exposed portion of the photosensitive resist is photo-hardened to form a thick film portion), large part of second entirely black layer 19a remains.

In a substrate region R3, which corresponds to the region with the 40 percent transmittance of the halftone mask, the second entirely black layer 19a is partially removed. The second entirely black layer 19a is thinner in the substrate region R3 than in the substrate region R2.

Figure 16F:
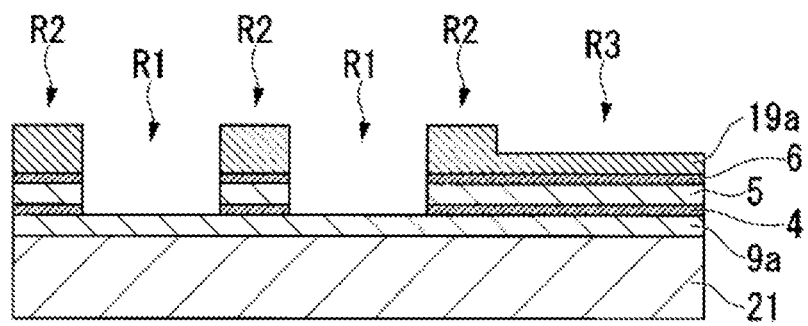
FIG. 16F is a process chart of an example of a process of manufacturing a conductive line according the first embodiment of the present invention.
Figure 16G:
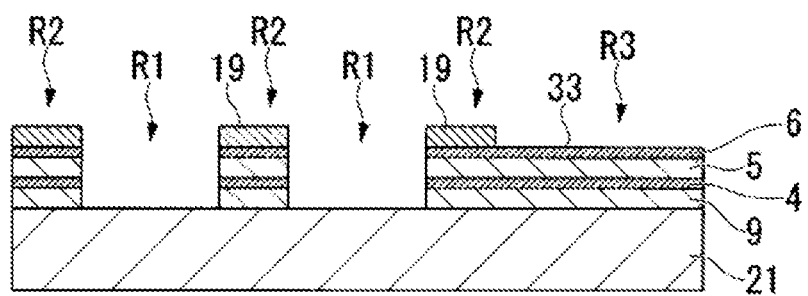
FIG. 16G is a process chart of an example of a process of manufacturing a conductive line according to the first embodiment of the present invention.

Then, as shown in FIG. 16F, the first entirely conductive metal oxide layer 6a exposed on the transparent substrate 21 in the substrate region R1 is wet-etched using an oxalic acid-based etchant. Subsequently, in the substrate region R1, the first entirely metal layer 5a is wet-etched using a phosphoric acid-based etchant. Further, in the substrate region R1, the second entirely conductive metal oxide layer 4a is wet-etched using an oxalic acid-based etchant. These wet etching processes can pattern the second conductive metal oxide layer 4a to form the second conductive metal oxide layer 4, can pattern the first entirely metal layer 5a to form the first metal layer 5, and can pattern the first entirely conductive metal oxide layer 6a to form the first conductive metal oxide layer 6. In other words, a touch sensing line 3 having a structure in which three conductive layers are laminated is formed. In the substrate region R1, a surface of the first entirely black layer 9a is exposed.

Then, as shown in FIG. 16Q a dry-etching device is used to dry etch the first entirely black layer 9a such that the first entirely black layer 9a is etched with a depth of 0.6 Thus, the first entirely black layer 9a is patterned to form the first black layer 9. As a result, a touch sensing line 3 including at least the first black layer 9 and the first metal layer 5 formed on the first black layer 9 is formed.

The gas to be fed into the dry-etching device is a mixed gas in which argon is used as a base gas and 8 vol % of oxygen is added to the base gas.

Such dry etching completely removes the second entirely black layer 19a located in the terminal portion 33 (substrate region R3) and exposes the second conductive metal oxide layer 4 in the terminal portion 33. Further, on the patterned touch sensing line 3, that is, in the substrate region R2, a second black layer 19 with an approximately 0.5 μm thickness is formed. A touch sensing line 3 having a structure in which a metal layer is sandwiched between the first black layer 9 and the second black layer 19 is thus formed.

As an example, forming such a touch sensing line 3 yielded the following results. The pattern of the touch sensing line 3 had an approximately 3 µm line width. The first conductive metal oxide layer 6, the first metal layer 5 and the second conductive metal oxide layer 4 should each have a line width within a ±0.2 µm margin of error, but they were actually all equal.

According to a manufacturing method according to the embodiment described above, there is no need to align the first black layer 9, the first conductive metal oxide layer 6, the first metal layer 5, and the second conductive metal oxide layer 4 with one another. There is thus no need to consider an alignment margin of ±1.5 µm, which is normally required for manufacturing a display-device substrate, either. This consequently enables a high aperture ratio.

The embodiment (example) described above shows a configuration in which the second black layer 19 is formed on the touch sensing line 3, but a configuration that does not include the second black layer 19 may be employed as necessary.

In the above embodiments and modifications, the first black layer 9 is provided between the transparent substrate 21 and the second conductive metal oxide layer 4, which enables a reflectance of light on the interface between the transparent substrate 21 and the first black layer 9 to be 3% or less at a time when the transparent substrate 21 is viewed in the observer's direction. This achieves an excellent configuration in terms of visibility.

Second Embodiment

With reference to FIGS. 17 to 21, a liquid crystal display device according a second embodiment of to the present invention will be described.

Figure 17:
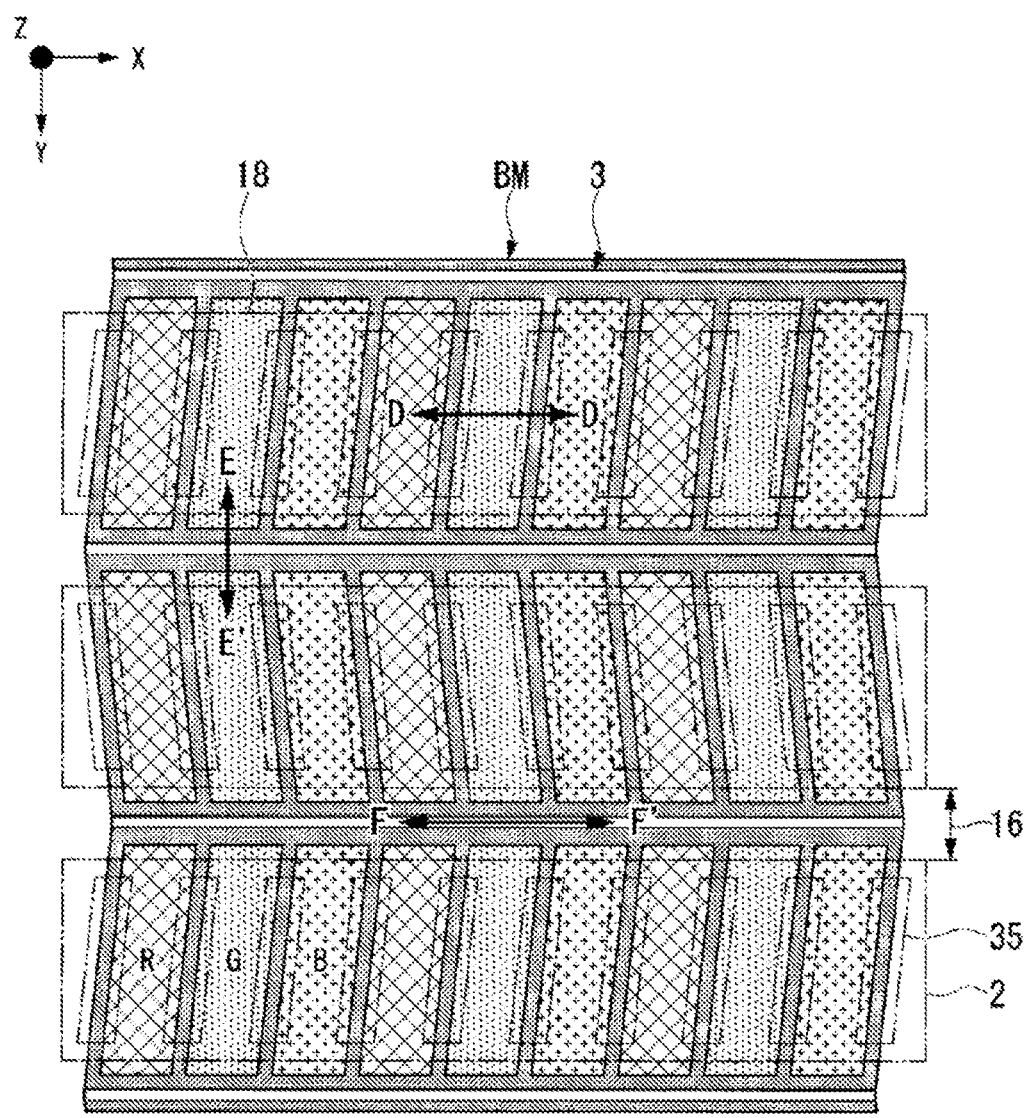
FIG. 17 is a plan view partially illustrating a liquid crystal display device according to a second embodiment of the present invention, that is, a view seen from a surface on which a display-device substrate and a liquid crystal layer are in contact with each other, toward a display surface of the display-device substrate.

FIG. 17 is a plan view partially illustrating a liquid crystal display device LCD 2 according to the second embodiment of the present invention, that is, a view as viewed perpendicularly to a display surface of the display-device substrate 100, from a surface on which a display-device substrate 100 and a liquid crystal layer 300 are in contact with each other.

Figure 18:
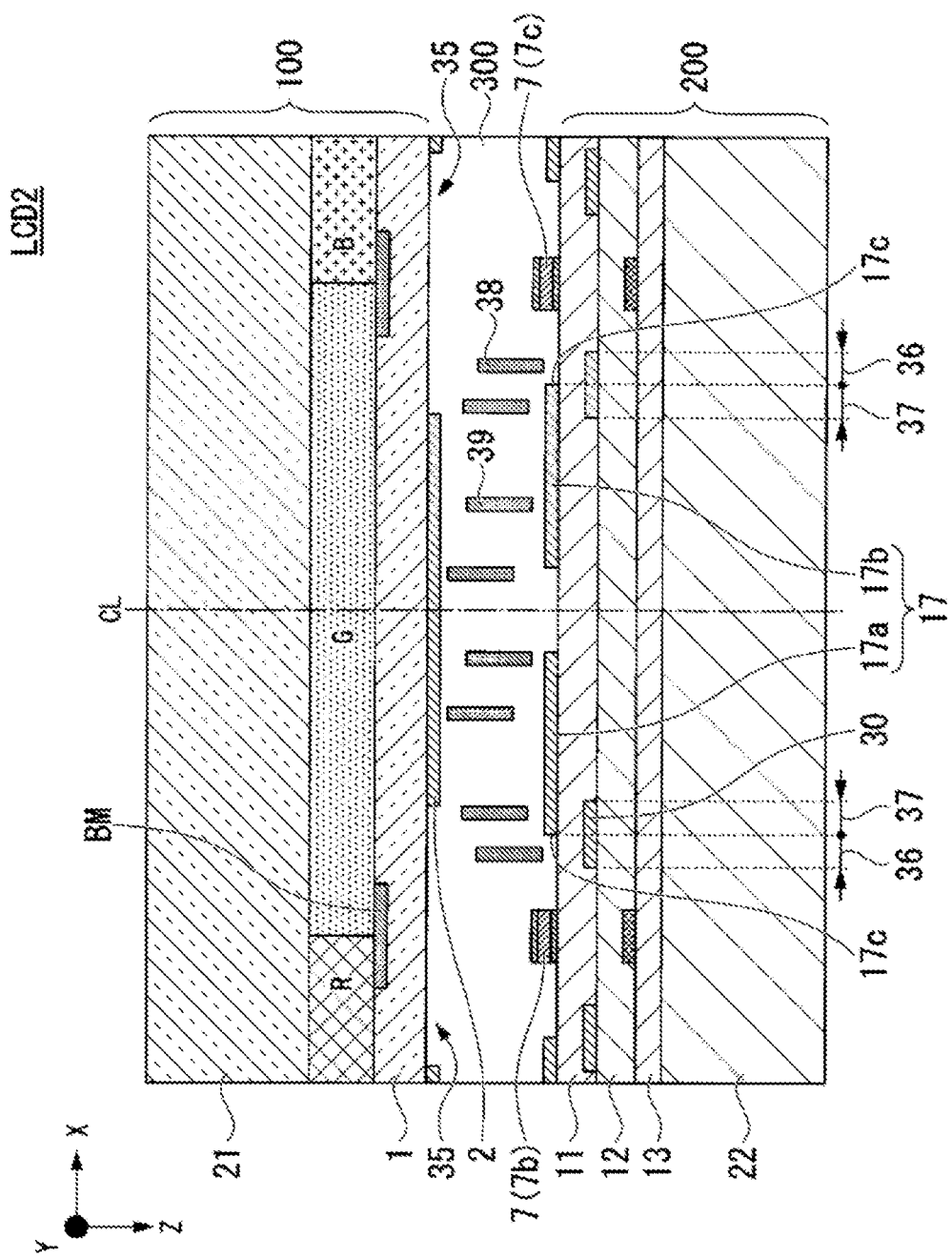
FIG. 18 is a cross-sectional view partially illustrating the liquid crystal display device according to the second embodiment of the present invention.

FIG. 18 is a cross-sectional view partially illustrating a liquid crystal display device according to the second embodiment of the present invention.

As shown in FIG. 17, red filters R, green filters G, and blue filters B constituting a color filter are disposed at positions corresponding to a plurality of pixel openings 18. The shape of a pixel opening is, for example, a parallelogram. Acceptable pixel opening shapes include polygons having at least two parallel sides, such as a quadrangle and a dog-legged pattern.

As shown in FIGS. 17 and 18, in the display-device substrate 100, a red filter R, a green filter G, and a blue filter B are disposed on a transparent substrate 21, and a black matrix BM (black matrix layer) is provided on the filters R, and B. In plan view, the black matrix BM is located at a boundary between two filters selected from the red filter R, the green filter G, and the blue filter B.

A transparent resin layer 1 is formed so as to cover the black matrix BM, the red filter R, the green filter G, and the blue filter B.

A transparent electrode 2 is formed on the transparent resin layer 1 so as to have a stripe pattern parallel to the X direction and to overlap the plurality of pixel openings 18 arranged in the X direction. In the transparent electrode 2, an ITO opening 35 is formed at a position between adjacent pixel openings (provided with a red filter R, a green filter G, and a blue filter B). In the ITO opening 35, no ITO or other transparent electrode is formed. The ITO opening 35 is a slit provided in the transparent electrode 2, and the center of the ITO opening 35 coincides with a pixel center CL.

Since the transparent electrode 2 has a stripe pattern, a plurality of band-shaped transparent electrodes 2 are arranged in the Y direction on the transparent resin layer 1. A slit 16 is formed between adjacent transparent electrodes 2. No ITO or other transparent electrode is formed in the slit 16. A black matrix BM and a touch sensing line 3 are arranged in the slit 16 in plan view.

As shown in FIG. 18, an array substrate 200 includes a second insulation layer 12 provided under a first insulation layer 11, and a common electrode 30 provided between the second insulation layer 12 and a pixel electrode 17 (electrode portions 17a, 17b). In plan view, the common electrode 30 has an overlapping portion 37 overlapping with the pixel electrode 17, and a portion 36 (projecting portion) protruding in the X direction from an end 17c of the pixel electrode 17.

The electrode portion 17a, the protruding portion 36 (first protrusion) located on the left side of the page, and the overlapping portion 37 (first overlapping portion) located on the left side of the page are arranged symmetrically, relative to the pixel center CL, with the electrode portion 17b, the protruding portion 36 (second protrusion) located on the right side of the page, and the overlapping portion 37 (second overlapping portion) located on the right side of the page. The protruding portion 36 may be disposed not only in the long-side direction of a pixel but also in the short-side direction thereof.

Arranging the black matrix BM at a location closer to the liquid crystal layer 300 can reduce leakage of stray light and re-reflected light in a defective liquid crystal alignment region occurring in the vicinity of the black matrix BM (see FIG. 28), as will be described later in a fourth embodiment.

As in the first embodiment, the liquid crystal layer 300 has liquid crystal molecules that are initially aligned vertically.

In the liquid crystal display device LCD 2 according to the present embodiment as well, a plurality of conductive lines 7 (7a, 7b, 7c, 7d) are formed on a first insulation layer 11, as in the above embodiment. Descriptions on the functions of the plurality of conductive lines 7 according to the present embodiment are omitted because the functions are identical to those in the above embodiment. In the present embodiment, the first conductive line 7a and the second conductive line 7d, both of which are applied with a reset voltage, are not shown, but dummy conductive lines 7b, 7c are shown in FIGS. 18 to 21. The conductive lines 7b, 7c are in an electrically floating state.

In the following description, application of a voltage to the conductive line 7 generates an electric field, thereby bringing a liquid crystal molecule lying parallel to a substrate surface of the array substrate 200 rapidly back to vertical alignment, but only a direction of the electric field is referred to, and a conductive line to which the voltage is applied is omitted. Note that the conductive line 7 to which the reset voltage is applied is arranged in a pixel adjacent to the pixel shown in FIGS. 18 to 21.

FIG. 18 shows a state in which no liquid crystal driving voltage is applied across the transparent electrode 2 and the pixel electrode 17, and the liquid crystal molecules 38, 39 are vertically aligned, that is, a black display state.

Figure 19:
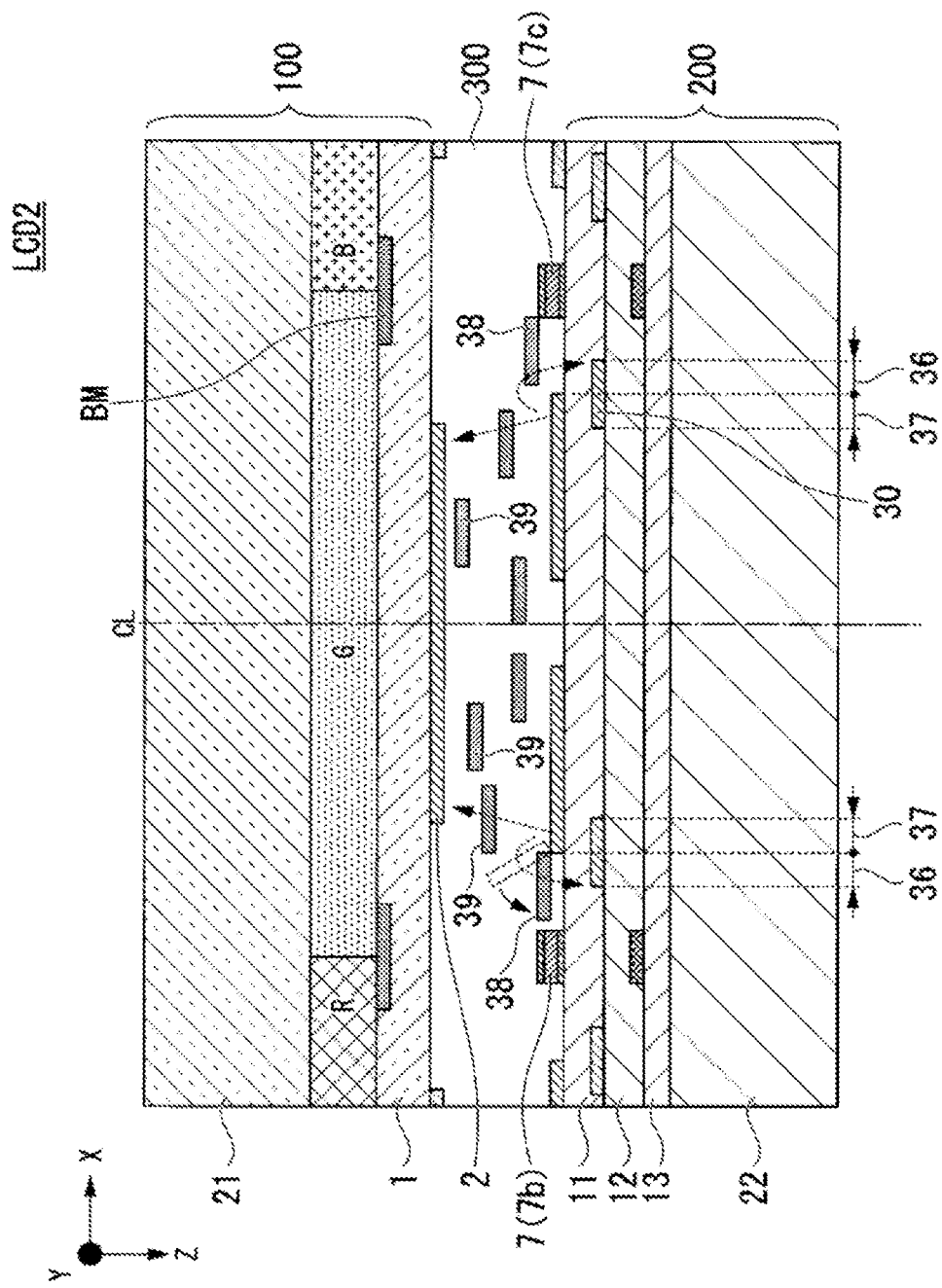
FIG. 19 is a cross-sectional view partially illustrating the liquid crystal display device according to the second embodiment of the present invention, that is, a view partially illustrating a state of white display.

FIG. 19 is a cross-sectional view partially illustrating a white display state at a time when a liquid crystal driving voltage is applied across the transparent electrode 2 and the pixel electrode 17 (at a time when a liquid crystal driving voltage is turned ON).

At the time when a liquid crystal driving voltage is turned ON, a liquid crystal driving voltage is applied across the pixel electrode 17 and the transparent electrode 2, and across the pixel electrode 17 and the common electrode 30. At the time when the voltage is applied, the liquid crystal molecule 38 located close to the protruding portion 36 immediately tilts to a large degree due to generation of a strong electric field between the pixel electrode 17 and the common electrode 30 and becomes aligned parallel to the pixel electrode 17. The remaining liquid crystal molecules 39 tilt in a line symmetrical direction relative to the pixel center CL so that the behaviors of the liquid crystal molecules 38 aligned near the protruding portion 36 propagate.

As a result, the liquid crystal molecules 38, 39 are aligned to form a linearly symmetrical arrangement (array) with respect to the pixel center CL, which provides a wide field of view.

Figure 20:
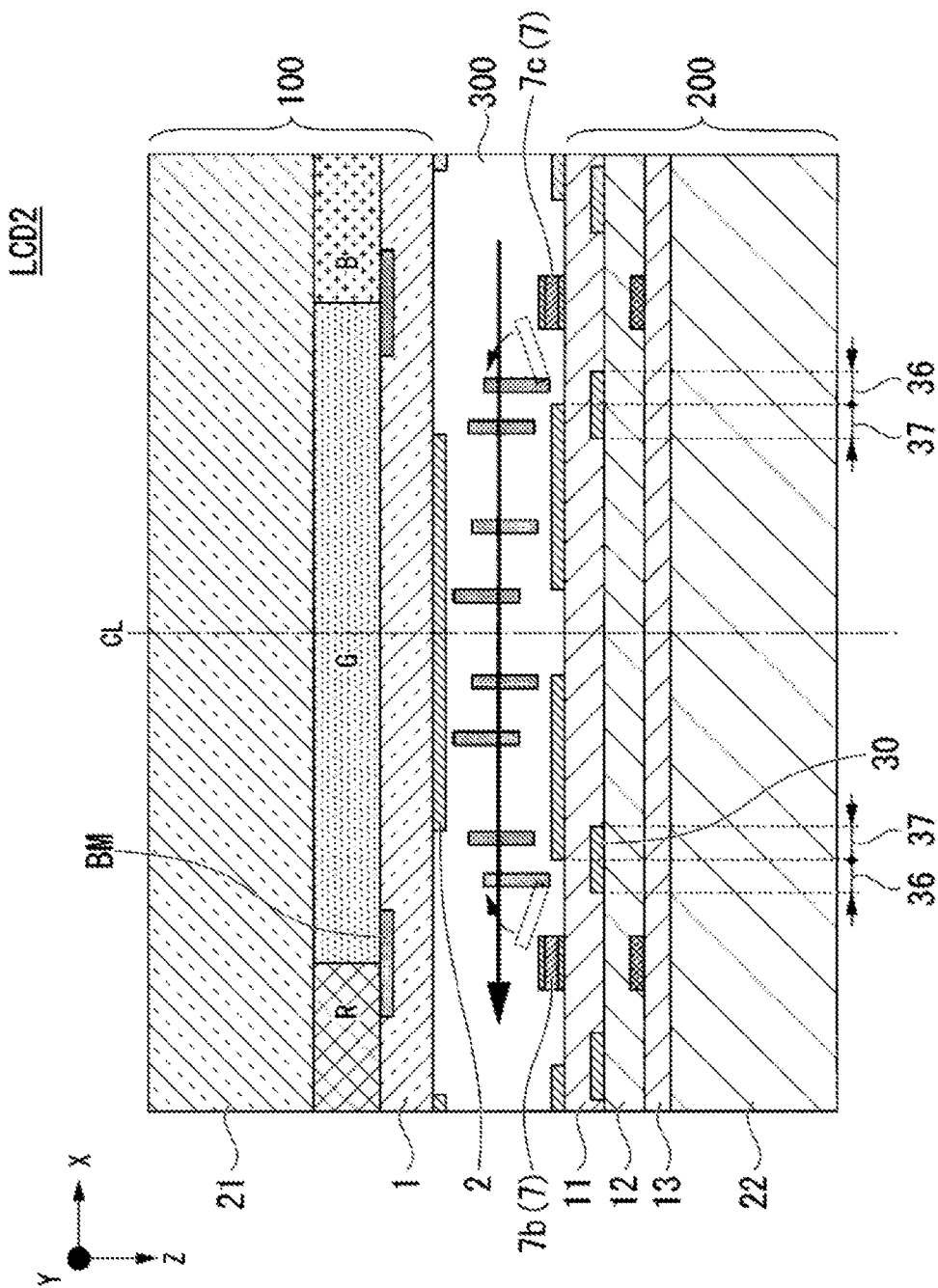
FIG. 20 is a cross-sectional view partially illustrating the liquid crystal display device according to the second embodiment of the present invention, that is, a view illustrating how liquid crystal molecules return at a time when a reset voltage is applied to the liquid crystal molecules immediately after stopping the application of a liquid crystal driving voltage (while the liquid crystal driving voltage is turned OFF).

FIG. 20 shows a state in which, immediately after stopping the application of a liquid crystal driving voltage (at a time when a liquid crystal driving voltage is turned OFF), a reset voltage is applied to a first conductive line 7a and a second conductive line 7d of adjacent pixels, so that the liquid crystal molecules 38, 39 rise back to vertical alignment to exhibit a black display state.

Generation of an electric field (from the right side to the left side) by application of a reset voltage rapidly brings the liquid crystal molecules lying parallel to the substrate surface of the array substrate 200 back to vertical alignment. As a result, the white liquid crystal display turns black. Application of a reset voltage significantly shortens τoff. Shortened τoff makes a stable black display period Er longer. Therefore, the back light unit BU may be stopped from emitting light during this period.

Figure 21:
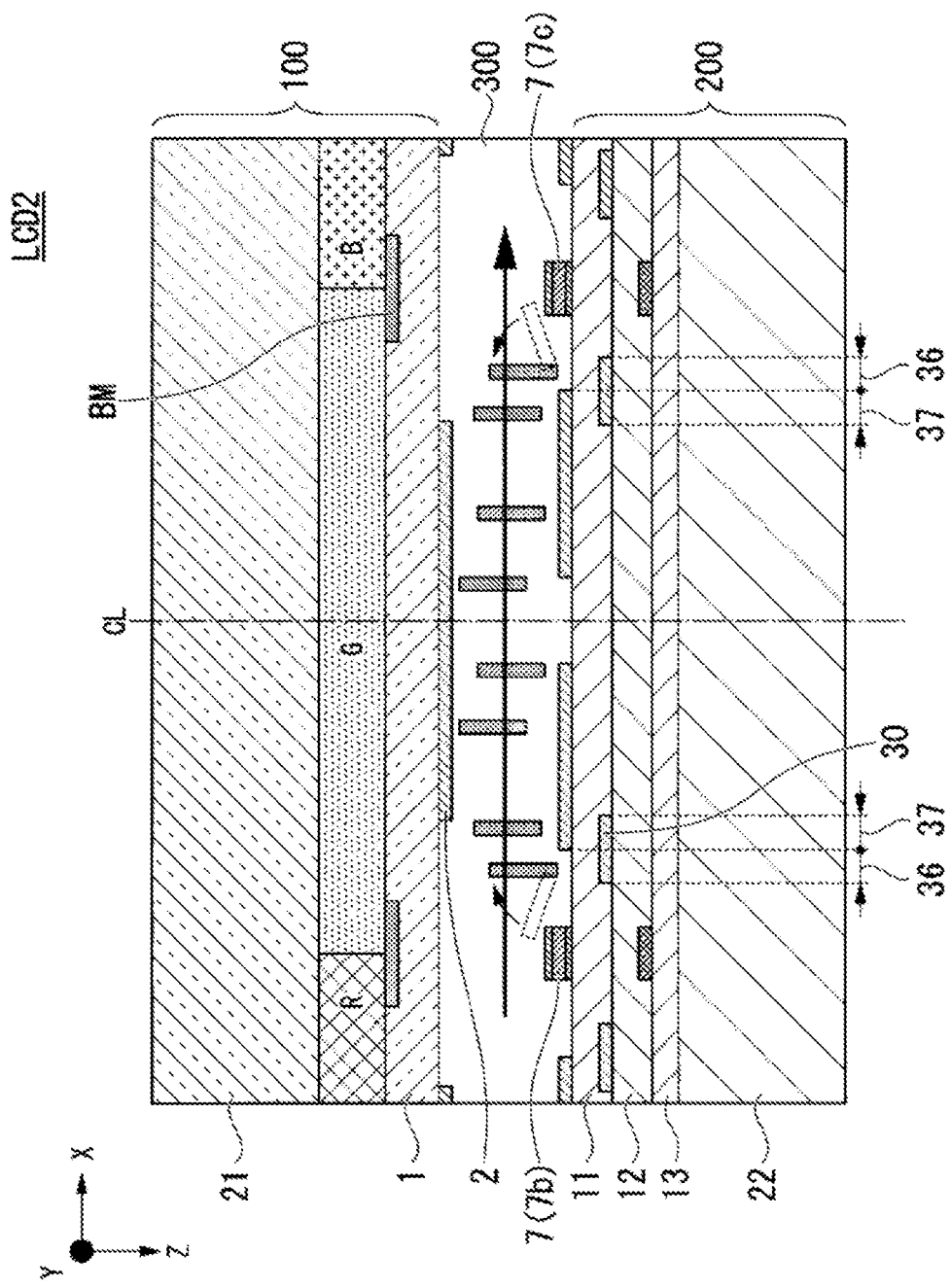
FIG. 21 is a cross-sectional view partially illustrating the liquid crystal display device according to the second embodiment of the present invention, that is, illustrating how liquid crystal molecules return on an occasion when an electric field is applied in a direction opposite to the electric field direction shown in FIG. 20, at a time when a reset voltage is applied to the liquid crystal molecules immediately after stopping the application a liquid crystal driving voltage (while the liquid crystal driving voltage is turned OFF).

FIG. 21 shows a state in which, immediately after stopping the application of a liquid crystal driving voltage (at a time when a liquid crystal driving voltage is turned OFF), a reset voltage is applied to a first conductive line 7a and a second conductive line 7d of adjacent pixels, so that the liquid crystal molecules 38, 39 rise back to vertical alignment to exhibit a black display state. However, FIG. 21 is different from FIG. 20 in the direction of an electric field generated by application of a reset voltage.

The operation shown in FIG. 21 achieves the same advantageous effects as in FIG. 20. Alternate generation of the electric field shown in FIG. 20 and the electric field shown in FIG. 21 can neutralize electric charge that accumulates in a liquid crystal cell and cause image sticking.

According to the present embodiment, in addition to advantageous effects similar to those of the first embodiment, the liquid crystal molecule 38 located close to the protruding portion 36 can be immediately tilted to a large degree by a strong electric field generated between the pixel electrode 17 and the common electrode 30. In other words, a rise time (τon) at a time when a liquid crystal driving voltage is applied to liquid crystal molecules (a liquid crystal layer) can be shortened. Further, the liquid crystal molecules in the entire liquid crystal layer 300 can be tilted in a direction linearly symmetrical with respect to the pixel center CL so that the behaviors of a liquid crystal molecule 38 aligned near the protruding portion 36 propagate, ensuring a wide field of view.

Third Embodiment

With reference to FIG. 17 and FIGS. 22 to 27, a liquid crystal display device according to a third embodiment of the present invention will be described.

Figure 22:
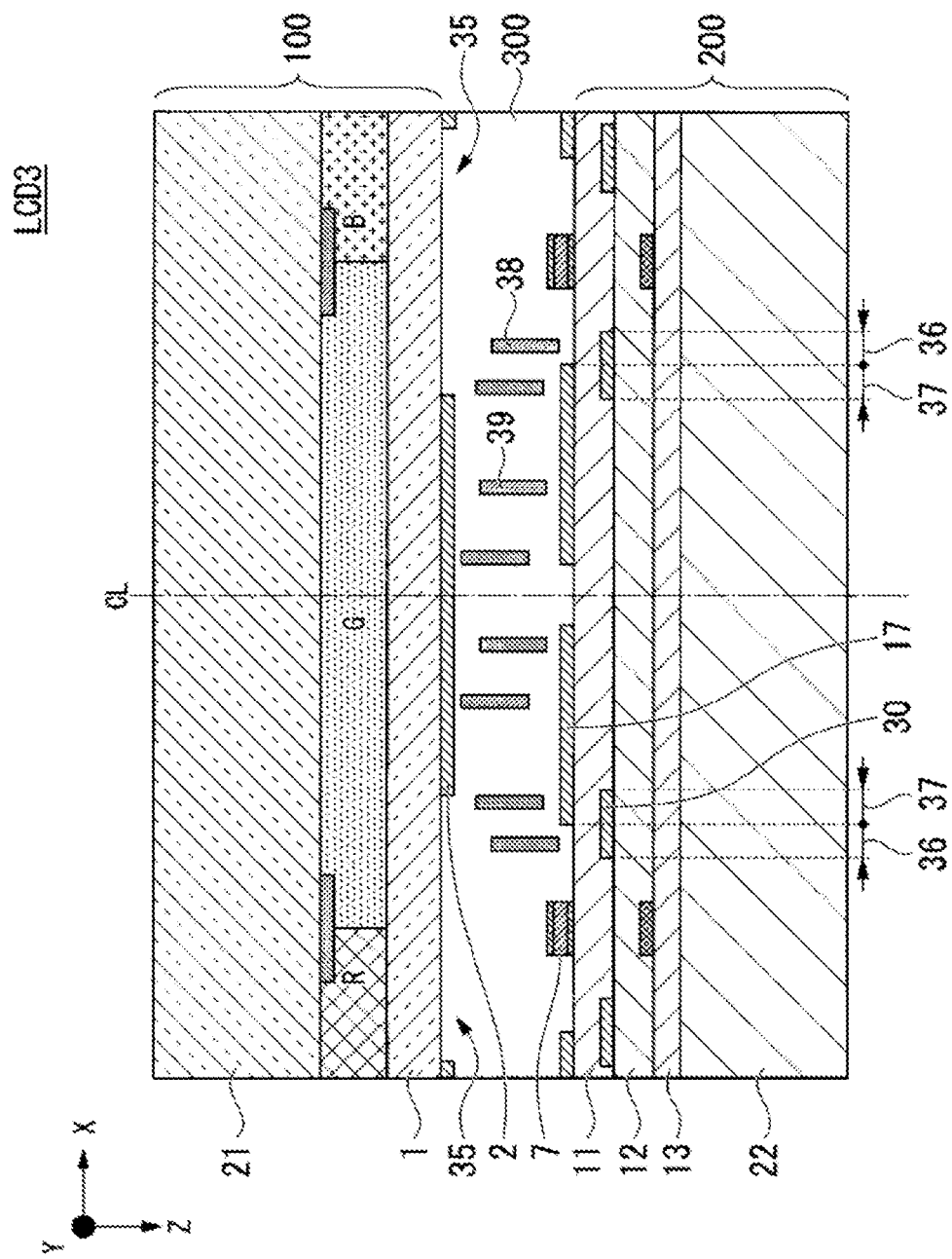
FIG. 22 is a cross-sectional view partially illustrating a liquid crystal display device according to a third embodiment of the present invention, taken along the line D-D' shown in FIG. 17.

FIG. 22 is a cross-sectional view partially illustrating a liquid crystal display device LCD3 according to the third embodiment of the present invention.

Figure 23:
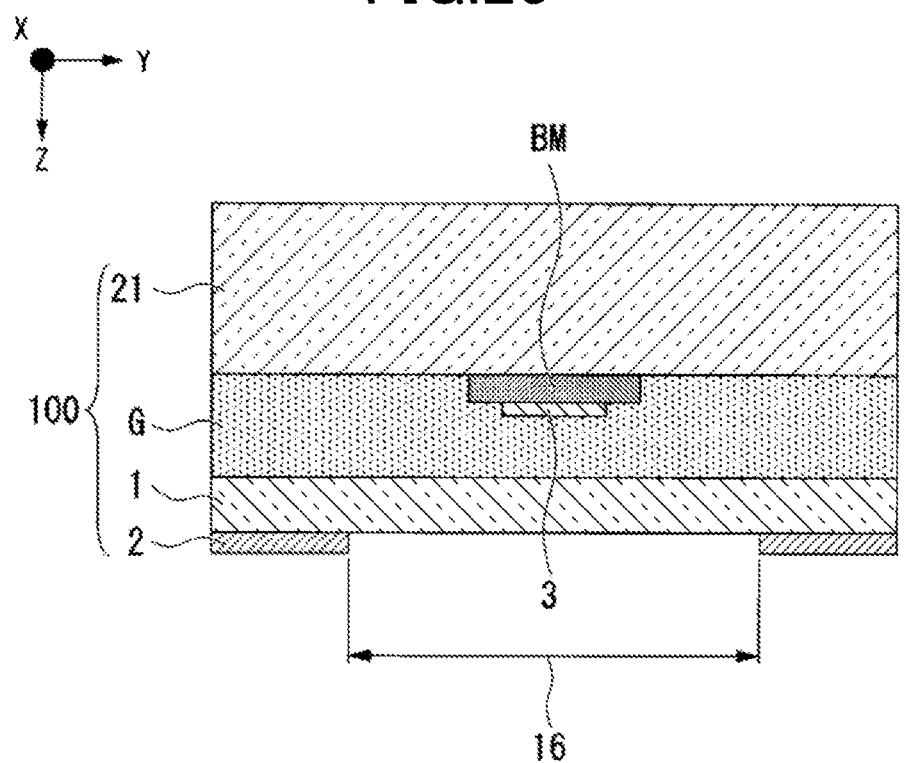
FIG. 23 is a cross-sectional view partially illustrating the liquid crystal display device according to the third embodiment of the present invention, taken along the line E-E' shown in FIG. 17.

FIG. 23 is a cross-sectional view taken along the line E-E' shown in FIG. 17.

The third embodiment is different from the second embodiment in the location of a black matrix BM relative to a color filter.

As shown in FIG. 22, in a display-device substrate 100, a black matrix BM is disposed on a transparent substrate 21, and a red filter R, a green filter G, and a blue filter B are arranged on the transparent substrate 21 so as to cover the black matrix BM. A transparent resin layer 1 is formed so as to cover the red filter R, the green filter G, and the blue filter B. As in the second embodiment, a transparent electrode 2 is formed on the transparent resin layer 1 so as to have a stripe pattern parallel to the X direction.

As shown in FIG. 23, a touch sensing line 3 is provided on a black matrix BM that is the location corresponding to an ITO opening 35 of the transparent electrode 2.

As in FIG. 17, an array substrate 200 includes a common electrode 30 provided between a second insulation layer 12 and a pixel electrode 17 (electrode portions 17a, 17b). The common electrode 30 has a portion 37 overlapping with the pixel electrode 17 and a portion 36 protruding in the X direction from an end 17c of the pixel electrode 17.

As in the second embodiment, the liquid crystal layer 300 has liquid crystal molecules that are initially aligned vertically.

FIG. 22 shows a state in which no liquid crystal driving voltage is applied across the transparent electrode 2 and the pixel electrode 17, and liquid crystal molecules 38, 39 are vertically aligned, that is, a black display state.

Figure 24:
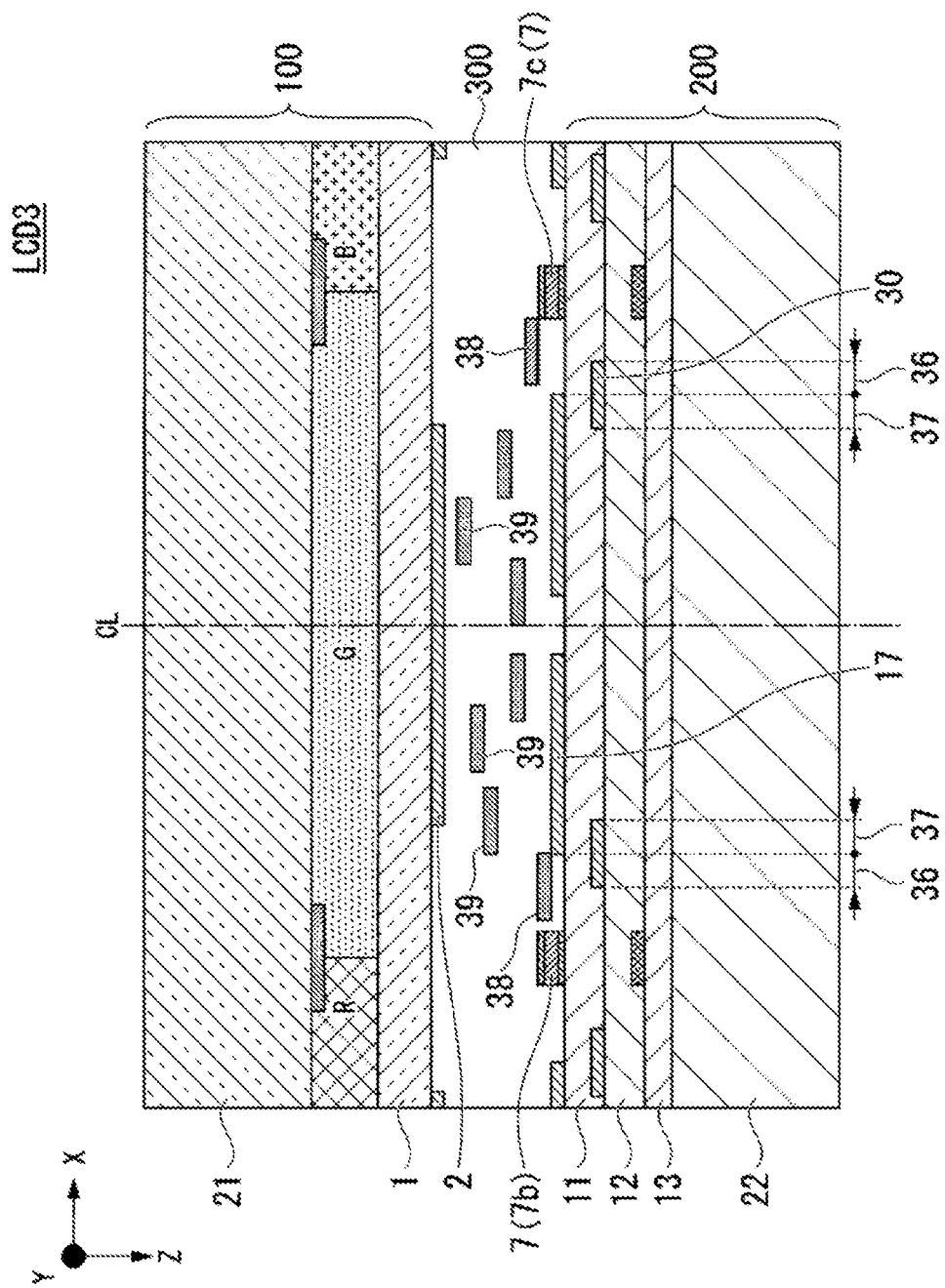
FIG. 24 is a cross-sectional view that partially illustrates the liquid crystal display device according to the third embodiment of the present invention, that is, a view partially illustrating a state of white display.

FIG. 24 is a cross-sectional view partially illustrating a white display state at a time when a liquid crystal driving voltage is applied across the transparent electrode 2 and the pixel electrode 17 (at a time when a liquid crystal driving voltage is turned ON).

Figure 25:
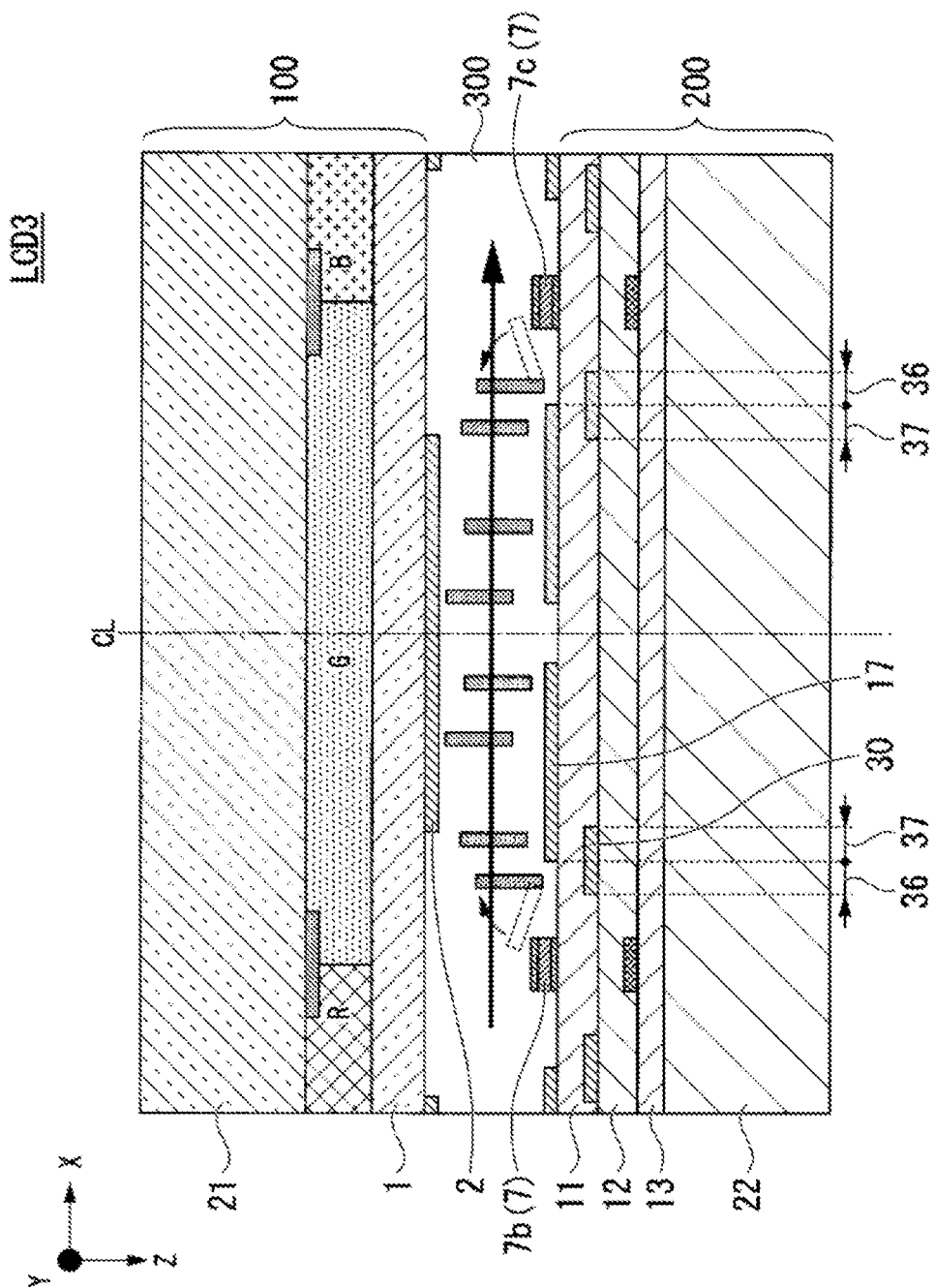
FIG. 25 is a cross-sectional view partially illustrating the liquid crystal display device according to the third embodiment of the present invention, that is, a view illustrating how liquid crystal molecules return at a time when a reset voltage is applied to the liquid crystal molecules immediately after stopping the application of a liquid crystal driving voltage (while a liquid crystal driving voltage is turned OFF).

FIG. 25 shows a state in which, immediately after stopping the application of a liquid crystal driving voltage (at a time when a liquid crystal driving voltage is turned OFF), a reset voltage is applied to the first conductive line 7a and the second conductive line 7d of adjacent pixels, so that the liquid crystal molecules 38, 39 rise back to vertical alignment to exhibit a black display state.

Figure 26:
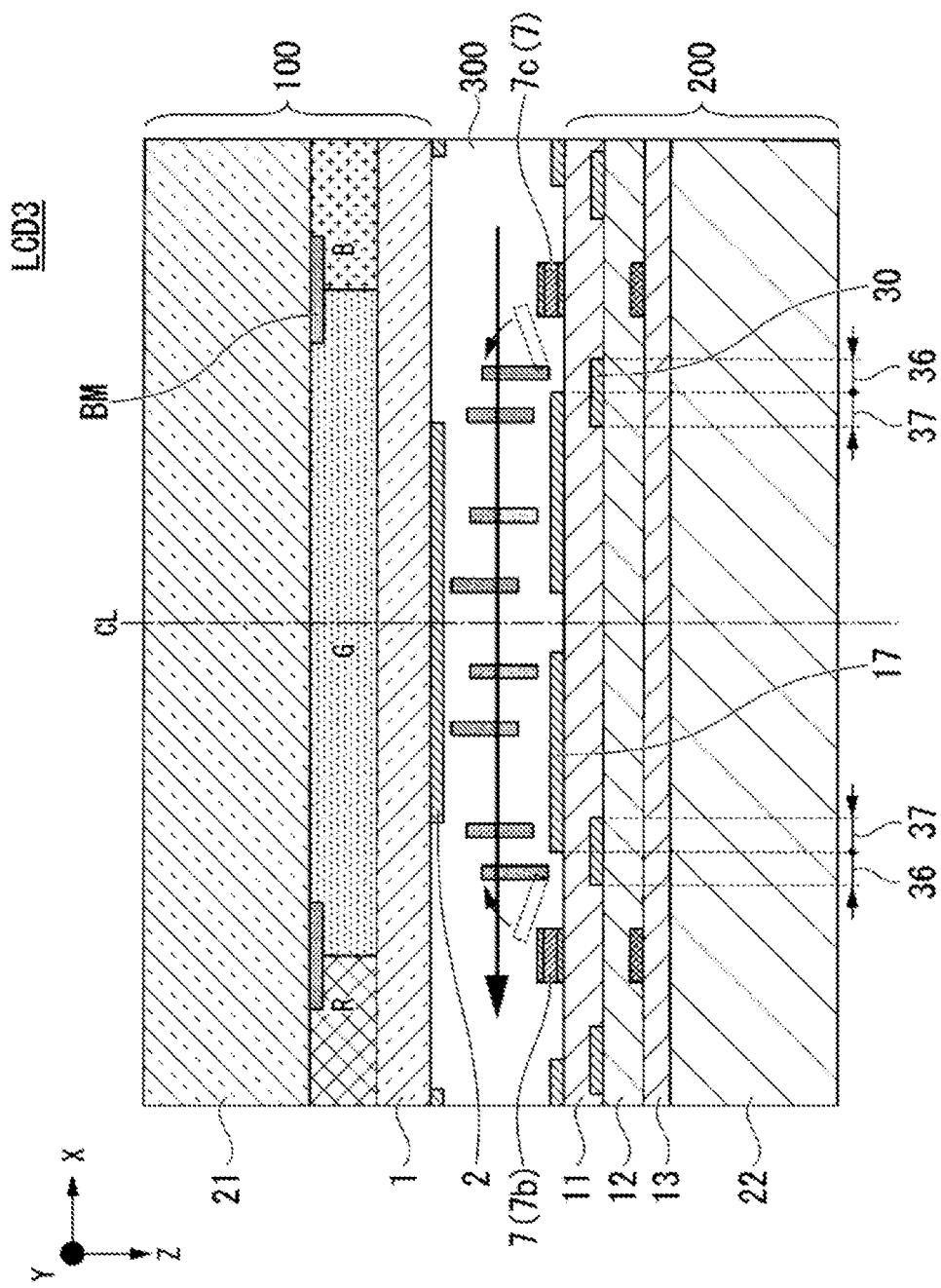
FIG. 26 is a cross-sectional view partially illustrating the liquid crystal display device according to the third embodiment of the present invention, that is, a view illustrating how liquid crystal molecules return when an electric field is applied in a direction opposite to the electric field direction shown in FIG. 25, at a time when a reset voltage is applied to the liquid crystal molecules immediately after stopping the application of a liquid crystal driving voltage (while a liquid crystal driving voltage is turned OFF).

FIG. 26 shows a state in which, immediately after stopping the application of a liquid crystal driving voltage (at a time when a liquid crystal driving voltage is turned OFF), a reset voltage is applied to the first conductive line 7a and the second conductive line 7d of adjacent pixels, so that the liquid crystal molecules 38, 39 rise back to vertical alignment to exhibit a black display state. However, FIG. 26 is different from FIG. 25 in the direction of an electric field generated by application of a reset voltage.

As shown in FIGS. 24 to 26, a behavior of the liquid crystal molecules 38, 39 at a time when a liquid crystal driving voltage is applied and a behavior of the liquid crystal molecules 38, 39 at a time when a reset voltage is applied to a conductive line 7 are the same as in the second embodiment.

An electrode structure in which a common electrode 30 has a protruding portion 36 improves a viewing angle and halftone display. Application of a liquid crystal driving voltage across the electrode portions 17a, 17b of the pixel electrode 17 and the transparent electrode 2 tilts the liquid crystal molecules 38, 39, providing white display as shown in FIG. 24.

Turning the liquid crystal driving voltage OFF and applying a reset voltage to the conductive line 7 after appearance of the white display, an electric field is generated across the liquid crystal layer 300 and the source line in plan view. An action of the electric field brings the liquid crystal molecules 38, 39 rapidly back to vertical alignment (initial alignment) as shown in FIG. 25.

Similarly, turning the liquid crystal driving voltage OFF and applying a reset voltage to the conductive line 7 after production of the white display shown in FIG. 24, an electric field is generated across the liquid crystal layer 300 and the source line. An action of the electric field brings the liquid crystal molecules 38, 39 rapidly back to vertical alignment (initial alignment) as shown in FIG. 26. In FIG. 26, the positive voltage and the negative voltage of the reset voltage in FIG. 25 are inverted, and an inverted reset voltage is applied to the conductive line 7. FIG. 26 is hence different from FIG. 25 in the orientation of an electric field generated by application of a reset voltage to the conductive line 7. Advantageous effects achieved by the electric fields shown in FIGS. 25 and 26 are the same as in FIGS. 20 and 21.

Figure 27:
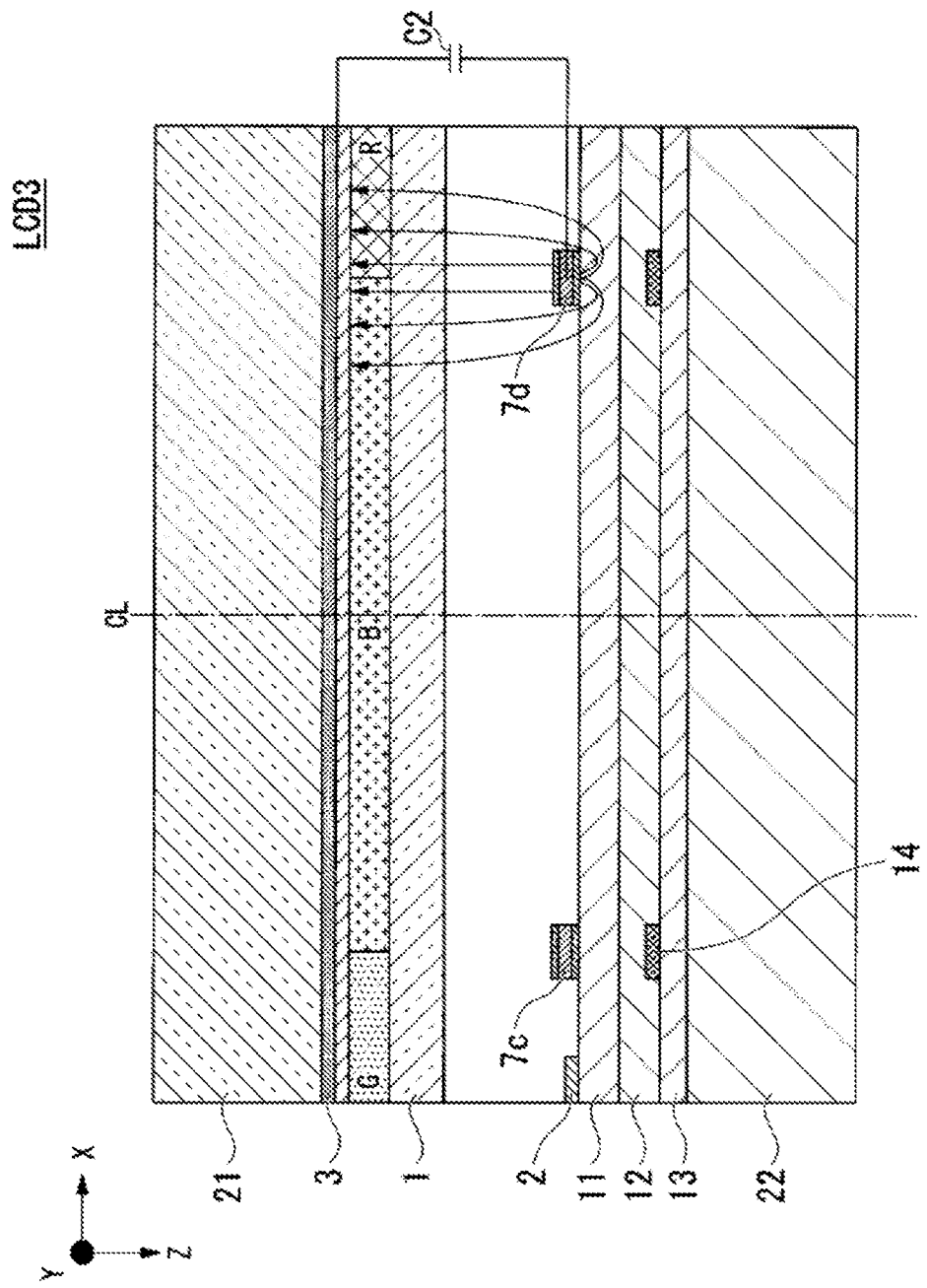
FIG. 27 is a cross-sectional view partially illustrating the liquid crystal display device according to the third embodiment of the present invention, taken along the line E-E' shown in FIG. 17, that is, a view for describing an electrostatic capacitance occurring between a touch sensing line (touch detection line) and a conductive line (touch driving line).

FIG. 27 is a cross-sectional view partially illustrating the liquid crystal display device according to the third embodiment of the present invention, taken along the line F-F' shown in FIG. 17, that is, a view for describing an electrostatic capacitance occurring between a touch sensing line 3 serving as a touch detection line and the conductive line 7 serving as a touch driving line.

With reference to FIG. 27, a description will be given on a touch sensing technique by use of the conductive line 7 as a touch sensing line.

As shown in FIG. 27, a dummy line 7c is provided so as to overlap with a boundary between the green filter G and the blue filter B, a second conductive line 7d is provided so as to overlap with a boundary between the blue filter B and the red filter R, in plan view.

By applying a touch sensing driving voltage between the second conductive line 7d and the touch sensing line 3, a fringe electric field is generated. A state in which the fringe electric field occurs is indicated by electric force lines 31, 32. An electrostatic capacitance C2 is held between the second conductive line 7d and the touch sensing line 3. As described in the first embodiment, when a finger or other pointer comes into contact with or comes close to the transparent substrate 21, the electrostatic capacity C2 changes. The change in electrostatic capacitance is detected by the touch sensing line 3 as a touch sensing signal. No fringe electric field is generated between the second conductive line 7c and a touch sensing line 3 because the dummy line 7c has an electrically floating potential. The conductive lines 7 (second conductive line 7d and dummy line 7c) may be constituted by an aluminum alloy.

Fourth Embodiment

Figure 28:
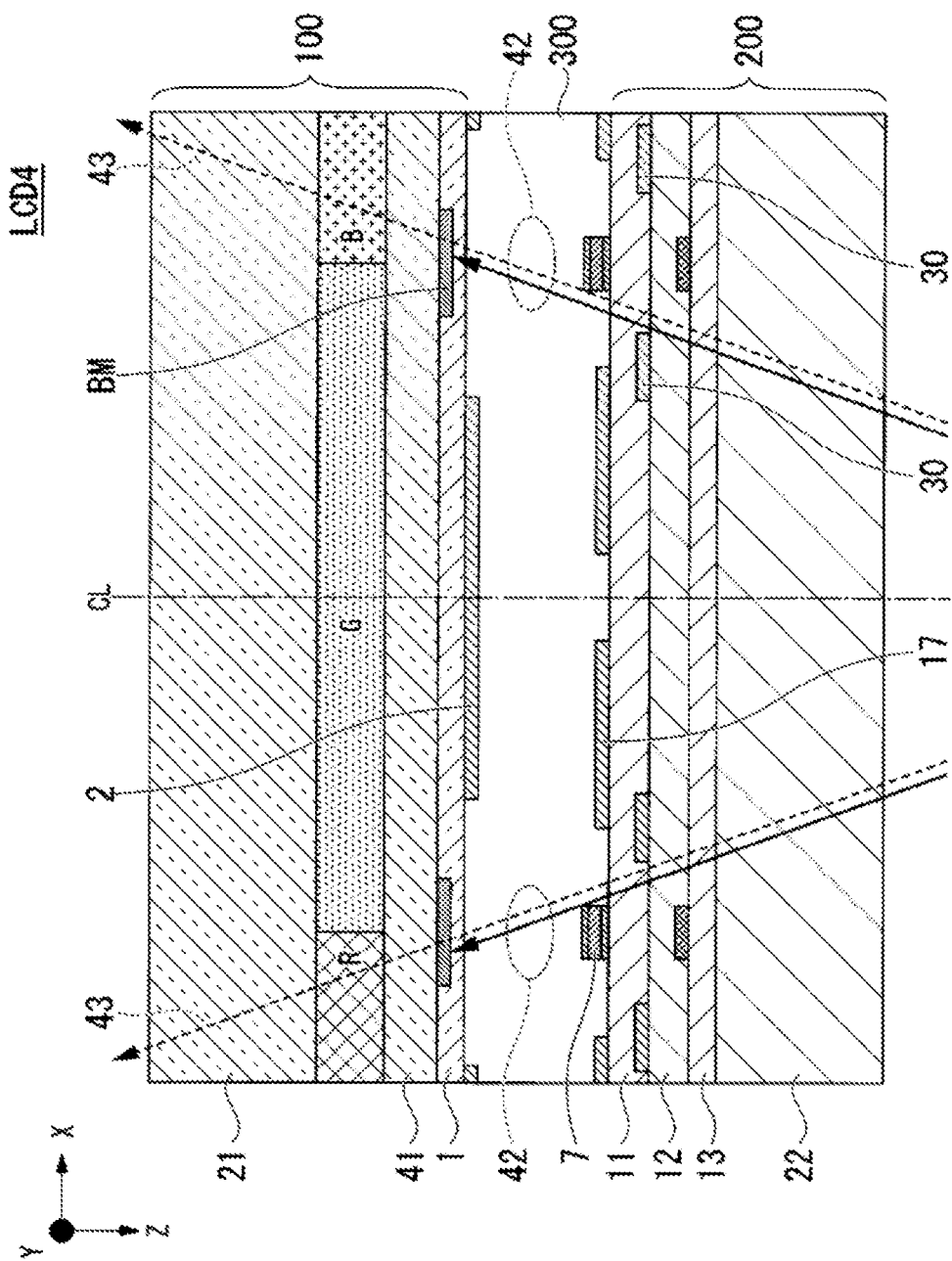
FIG. 28 is a cross-sectional view partially illustrating a liquid crystal display device according to a fourth embodiment of the present invention.

With reference to FIG. 28, a liquid crystal display device according to a fourth embodiment of the present invention will be described.

FIG. 28 is a cross-sectional view partially illustrating a liquid crystal display device according to the fourth embodiment of the present invention. A liquid crystal display device LCD 4 shown in FIG. 28 has a display-device substrate 100 in which a black matrix BM is arranged close to a liquid crystal layer 300, compared with the liquid crystal display device LCD 2 shown in FIG. 18.

Specifically, in the display-device substrate 100, a red filter R, a green filter G, and a blue filter B are disposed on a transparent substrate 21, and a second transparent resin layer 41 is disposed on the filters R, and B. The black matrix BM is provided on the second transparent resin layer 41. In plan view, the black matrix BM is located at a boundary between two filters selected from the red filter R, the green filter G, and the blue filter B. Further, a transparent resin layer 1 (first transparent resin layer) is provided on the second transparent resin layer 41 so as to cover the black matrix BM.

The black matrix BM is provided between two adjacent pixels. Specifically, the black matrix BM is arranged so as to face a boundary region located between a first pixel which is located at the center of FIG. 28 and a second pixel located on the left side to the first pixel. Specifically, a black matrix BM is arranged so as to be located between the pixel where the red filter R is disposed and the pixel where the green filter G is disposed and between the pixel where the green filter G is disposed and the pixel where the blue filter B is disposed, in plan view. In other words, the black matrix BM is provided so as to face a boundary region located between a pixel electrode 17 constituting the first pixel and a pixel electrode 17 constituting the second pixel. In this boundary region, a liquid crystal layer 300 is present between the display-device substrate 100 and the array substrate 200. In this boundary region, a liquid crystal driving voltage is not sufficiently applied to liquid crystal molecules of the liquid crystal layer 300 at a time when a liquid crystal is driven, compared with a region where the transparent electrode 2 and the pixel electrode 17 face with each other. In other words, this boundary region corresponds to a defectively aligned region 42. In the defectively aligned region 42, leakage light denoted by reference sign 43 easily passes through the liquid crystal layer 300 due to the defective alignment of liquid crystal molecules.

In the present embodiment, the black matrix BM is provided so as to face a boundary region located between two pixels that are thus adjacent to each other, that is, the defectively aligned region 42. The black matrix BM is provided on the second transparent resin layer 41, so that it is closer to the liquid crystal layer 300 than it is in the liquid crystal display device LCD 2 shown in FIG. 18.

Arrangement of the black matrix BM close to the liquid crystal layer 300 can shield the leakage light 43, which is emitted through the defectively aligned region 42, and thus can prevent display quality from deteriorating. On the other hand, a configuration in which the black matrix BM is formed far from the defectively aligned region 42 causes the leakage light 43 to increase, and thus is more apt to cause display quality to deteriorate.

In other words, in terms of preventing the leakage light 43 to occur, the black matrix BM is preferably located close to the liquid crystal layer 300 in the thickness direction of the liquid crystal layer 300. Note that the array substrate 200 of the liquid crystal display device LCD 4 shown in FIG. 28 is configured identically to the second embodiment.

Fifth Embodiment

Figure 29:
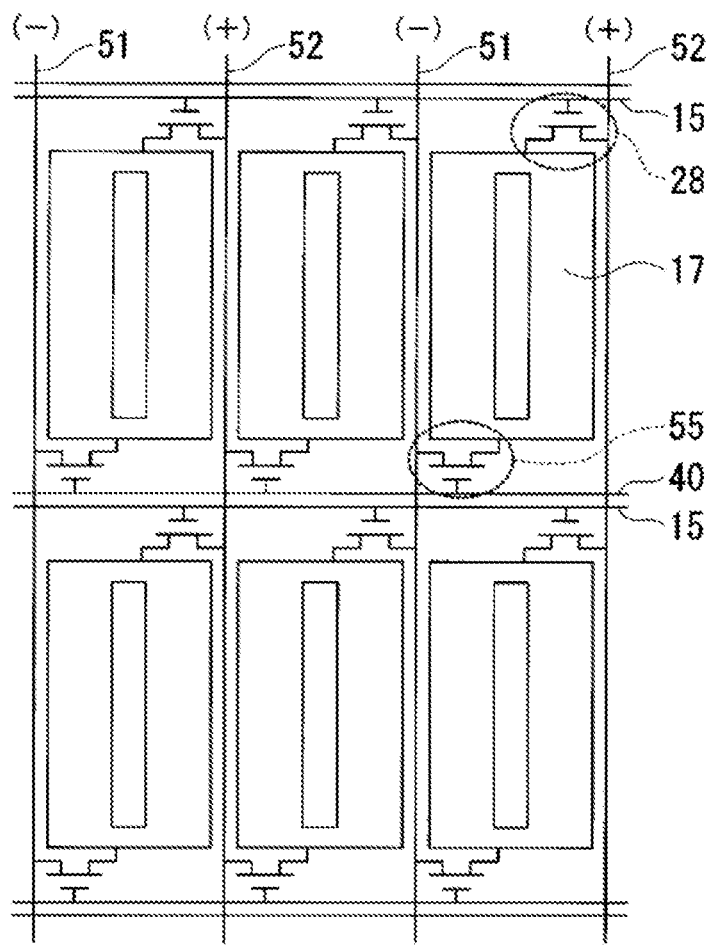
FIG. 29 is a circuit diagram partially illustrating a liquid crystal display device according to a fifth embodiment of the present invention, that is, a view illustrating an array structure having two active elements in one pixel.

With reference to FIG. 29, a fifth embodiment of the liquid crystal display device according to the present invention will be described.

FIG. 29 is a circuit diagram partially illustrating a liquid crystal display device according to the fifth embodiment of the present invention, that is, showing an array structure including two active elements in one pixel.

As shown in FIG. 29, each of the pixels corresponding to pixel openings has a pixel electrode 17. Two TFTs, that is, a first active element 28 and a second active element 55 are connected to the pixel electrode 17. Provided between two adjacent pixels (between two adjacent pixel openings) are a first gate line 15 and a second gate line 40 both extending in the X direction and an odd-numbered source line 51 and an even-numbered source line 52 both extending in the Y direction. A source electrode constituting a part of the active element is connected to each of the source lines 51, 52.

For example, at a time when an image signal is output from an image signal timing control unit 121 and input to the source line, a negative voltage is supplied as an image signal to an odd-numbered source line 51, and a positive voltage is supplied as an image signal to an even-numbered source line 52.

A second active element 55 hence has a source electrode electrically connected to a source line 51 to which an image signal is supplied as a negative voltage. A first active element 28 has a source electrode electrically connected to a source line 52 to which an image signal is supplied as a positive voltage.

A gate voltage is applied to one of the first gate line 15 and the second gate line 40, for example, for each frame of image display. This gate voltage is synchronized with either the odd-numbered source line 51 or the even-numbered source line.

The first active element 28 operates when an image signal enters the even-numbered source line 52, with a gate signal being input to the first gate line 15. On this occasion, the potential of the pixel electrode 17 is positive.

The second active element 55 operates, for example, when an image signal enters the odd-numbered source line 51, with the gate signal being input to the second gate line 40 at the subsequent timing. On this occasion, the potential of the pixel electrode 17 is negative.

The array structure shown in FIG. 29 makes it possible to perform dot inversion driving or column inversion driving by means of the TFT operation as described above. This array structure makes it possible to turn the potential of the pixel electrode 17 positive or negative without inverting the output polarity of a source line.

An ordinary pixel structure in which pixels are configured so that one active element corresponds to one pixel electrode 17 increases power consumption or generates noise, following an output inversion. On the other hand, the array structure shown in FIG. 29 can reduce power consumption and significantly restrain generation of noise. This can improve touch sensitivity.

Employing the array structure shown in FIG. 29 makes it possible to set the potential of the pixel electrode 17 to be positive or negative using a liquid crystal driving method such as dot inversion driving or column inversion driving. On this occasion, a transparent electrode 2 provided on the display-device substrate 100 can be set to zero volts or other constant potential. There is no need to change the potential of the transparent electrode 2, which leads to further restraining noise in relation to touch sensing driving. Additionally, the potentials of the source lines 51, 52 can be fixed to a negative or positive potential, which leads to restraining noise that occurs at a time of a changeover of a polarity of a signal applied to a source line.

In a circumstance where a liquid crystal display device having the structure according to the present embodiment has the touch sensing function described above, fixing the polarities of the potentials of the source lines 51, 52 makes it possible to eliminate an adverse influence on touch sensing.

Touch sensing by use of a selected line selected from a plurality of touch sensing lines (thinned-out driving) makes it possible to scan the touch drive electrode to thereby achieve high responsiveness. Additionally, the transparent electrode may serve as a driving electrode (scanning electrode) that applies a voltage at a constant frequency by a changeover between driving electrode and a detection electrode in touch sensing.

Note that, in touch sensing or liquid crystal driving, a voltage (AC signal) may be applied to a driving electrode in an inversion driving method, which inverts a positive and negative voltage. Touch driving and liquid crystal driving may be or may not be performed in a time-division manner.

Additionally, by narrowing a width (amplitude) of a voltage (AC signal) to be applied to a driving electrode, an effect on liquid crystal display can be alleviated.

As described above, in a liquid crystal display device according to the present embodiment, setting the potential of a conductive line 7 to a constant potential makes it possible to set a driving frequency of a touch sensing line or timing of signal detection, regardless of a driving frequency or timing of a liquid crystal. The driving frequency of a touch driving electrode can be set to a frequency that is different from a liquid crystal driving frequency, or can be set to a higher driving frequency.

In general, a liquid crystal driving frequency is 60 Hz or a driving frequency that is an integral multiple thereof. Normally, a touch sensing electrode is affected by the noise associated with the liquid crystal driving frequency. A touch sensing electrode is apt to pick up a noise arising from an electric device operating with an external power supply such as an ordinary household power source, which is an AC power source of 50 Hz or 60 Hz.

Hence, when a touch driving frequency is set to a different frequency slightly shifted from 50 Hz or 60 Hz or from an integral multiple thereof, the effect of noise arising from liquid crystal driving or an external electronic device can be significantly reduced. Alternatively, a timing of applying a signal may be shifted on the time axis shown in FIG. 15. Only a slight shift amount, for example, of ±3 to ±17% from a noise frequency may be sufficient to reduce interference with the noise frequency. For example, a touch driving frequency can be a frequency selected from the range of several kHz to several hundred kHz, that is, a frequency that does not interfere with the liquid crystal drive frequency or power supply frequency mentioned above. Selection of a frequency that does not interfere with a liquid crystal drive frequency or a power supply frequency can alleviate an effect of a coupling noise or other noise associating with dot inversion drive.

A 3D (stereoscopic image) display device requires a plurality of image signals (e.g., an image signal for the right eye and an image signal for the left eye) to three-dimensionally display an image that lies in front or behind, as well as a normal two-dimensional image. A liquid crystal driving frequency hence requires high-speed driving such as of 240 Hz or 480 Hz and many image signals.

The present embodiment, which can make a touch sensing driving frequency different from a liquid crystal driving frequency, is highly advantageous. For example, the present embodiment enables high-speed and highly accurate touch sensing in a 3D display game console with 3D display.

The present embodiment is also particularly useful for a device with a display screen with frequent finger or other touch inputs, such as a game console and an automatic cash dispenser. The stable black display period Er following application of the reset voltage Vr may be applied to black display inserted at a time of a changeover between an image for the right eye and an image for the left eye for 3D (stereoscopic image) display.

On an occasion of touch sensing driving, detection of a touch position by thinned-out driving, rather than by supplying a driving voltage to all touch sensing lines, can reduce power consumption.

A liquid crystal display device according to the embodiment of the present invention described above drives a vertically aligned liquid crystal layer by use of a vertical electric field.

Liquid crystal driving methods applicable to the vertical electric field method include a vertical alignment (VA) method, a hybrid-aligned nematic (HAN) method, a twisted nematic (TN) method, an optically compensated bend (OCB) method, a continuous pinwheel alignment (CPA) method, an electrically controlled birefringence (ECB) method, and a transverse bent alignment (TBA) method. These methods can be selected and used as appropriate. The VA mode achieves an excellent normally black display, and is therefore preferable to make good use of black display.

The VA mode that drives a vertically aligned liquid crystal is also superior to the FFS mode, which drives a horizontally aligned liquid crystal, in front luminance and black level of black display. A preferred liquid crystal material for the VA mode is, for example, a high purity material that achieves a liquid crystal layer having an intrinsic resistivity of $1 \times 10^{13}$ Ωcm or more. In addition to dot inversion driving, column inversion driving (source inversion driving), which sets a constant potential to a transparent electrode that is a common electrode, may be another liquid crystal driving method option. Alternatively, column inversion driving that sets a constant potential to the transparent electrode may be combined with dot inversion driving that sets a constant potential to the transparent electrode.

The VA or other vertical electric field method causes less deviation of electrostatic capacity in an in-cell touch and less image sticking than FFS because the former method applies positive and negative liquid crystal driving voltages across the pixel electrode 17 and the transparent electrode 2 by virtue of liquid crystal driving such as frame inversion, dot inversion, etc. Additionally, application of a positive and negative reset voltage for each horizontal line inversion or each frame inversion of one screen after writing an image to each pixel can alleviate deviation of electrostatic capacitance accumulated by touch sensing and improve the accuracy of in-cell type touch sensing.

A display device according to the embodiments of the present invention can be applied in various ways. Examples of an electronic device to which a display device according to the embodiments of the present invention can be applied include a mobile phone, a portable game console, a personal digital assistance, a personal computer, an electronic book, a video camera, a digital still camera, a head mounted display, a navigation system, an audio playback device (car audio, digital audio player, etc.), a copying machine, a facsimile, a printer, a multifunction printer, a vending machine, an automated teller machine (ATM), a personal authentication device, and an optical communication device. The above embodiments can be used in combination as desired.

While preferred embodiments of the present invention have been described, it should be understood that they are only examples of the invention and should not be construed as limiting the invention. Additions, omissions, substitutions, and other changes can be made without departing from the scope of the invention. Hence, the invention should not be regarded as limited by the foregoing description, but limited by the claims.

As discussed above, PTL2 describes a liquid crystal display device, and the liquid crystal display device, which uses a vertical electric field method in combination with a fringe electric field, can significantly shorten τon at a time when a liquid crystal driving voltage is applied to liquid crystal molecules (when a liquid crystal driving voltage is turned ON), resulting in faster liquid crystal driving. However, it takes time for the liquid crystal molecules to return to the original vertical alignment (black display) because no electric field is applied to the liquid crystal molecules when the driving voltage is turned OFF. This makes it difficult to reduce τoff, which is a fall time of liquid crystal molecules. Since the response time of a liquid crystal represents a total time of a rise time τon and a fall time τoff, improving responsiveness requires a shorter τoff.

In a known thin film transistor, an IGZO or other oxide semiconductor is used for a channel layer, such an oxide semiconductor being made of a composite oxide such as indium oxide, gallium oxide, or zinc oxide. Such a thin film transistor boasts electron mobility approximately 50 times higher than a conventional thin film transistor which uses an amorphous silicon semiconductor as a channel layer, so that it can write (an image signal) faster to a pixel electrode. Further, a thin film transistor including a channel layer formed of an oxide semiconductor allows only a very small amount of leakage current, so that the transistor can exhibit a good voltage retention after completing writing to the pixel electrode and eliminates the need to perform a rewrite for retaining image display. A liquid crystal display device that characteristically has good voltage retention, however, may cause a problem that pixel sticking is apt to occur.

An aspect of the present invention is a liquid crystal display device that provides a shorter response time thereof in a vertical electric field method, and reduces pixel sticking.

A liquid crystal display device according to one aspect of the present invention includes: a display-device substrate including a transparent substrate, a transparent resin layer, and a transparent electrode, wherein the transparent resin layer and the transparent electrode are formed in this order on the transparent substrate; an array substrate including a plurality of polygonal pixel openings, a pixel electrode provided in each of the plurality of pixel openings, a source line, a gate line, a first insulation layer arranged between the pixel electrode and the source line in cross-sectional view, and a conductive line that is provided at a location where the pixel electrode is divided on the first insulation layer in plan view, the conductive line being parallel to the source line; a liquid crystal layer sandwiched between the display-device substrate and the array substrate and including liquid crystal molecules that have negative dielectric anisotropy and are initially aligned vertically; and a control unit that drives the liquid crystal layer by supplying an image signal to the source line and applying a liquid crystal driving voltage across the transparent electrode and the pixel electrode in synchronization with the image signal, the control unit applying a voltage to the conductive line after the liquid crystal driving voltage is applied to the pixel electrode and while the liquid crystal driving voltage is not applied to the pixel electrode, thereby generating an electric field oriented in a direction traversing the source line in plan view between the conductive lines.

Examples of a shape pattern of the polygonal pixel opening include a square pattern, a rectangular pattern, a parallelogram pattern, or a dog-legged pattern.

One aspect of the present invention is a liquid crystal display device using a vertical electric field method because liquid crystal molecules used in the liquid crystal layer have negative dielectric anisotropy and are initially aligned vertically. The vertical electric field method is a method for driving a liquid crystal layer, that is, a method in which a liquid crystal driving voltage is applied in a thickness direction to the liquid crystal layer disposed between a transparent electrode provided on a substrate for a display device and a pixel electrode provided on an array substrate.

As described above, a control unit applies a voltage to the conductive line after the liquid crystal driving voltage is applied to the pixel electrode and while the liquid crystal driving voltage is not applied to the pixel electrode. An electric field oriented in a direction intersecting the source line in plan view is thus generated between the conductive lines. The electric field aligns the liquid crystal molecules vertically (initial alignment). Hence, in the following description, a voltage that generates an electric field oriented in a direction intersecting the source line and is applied to the conductive line may be referred to as a "reset voltage" or "reset signal". Also, a conductive line to which a reset voltage is applied may be referred to as a "reset line". Further, the driving of liquid crystal molecules which are (initially) aligned vertically by the generation of the electric field may be referred to as "reset driving".

Still further, a reset voltage refers to a voltage applied to a conductive line to reduce a fall time (hereinafter referred to as τoff) of liquid crystal molecules. Herein, resetting liquid crystal molecules refers to bringing liquid crystal molecules back to vertical alignment (black display), which is how they are initially aligned.

More specifically, in a liquid crystal display device according to one aspect of the present invention, some conductive lines (first conductive lines) may be connected to a ground (e.g., grounded to a housing of the liquid crystal display device), and a reset voltage may be applied to some other conductive lines (second conductive lines). In this case, a plurality of source lines are arranged between the first conductive line and the second conductive line in plan view. Note that one source line may be arranged between the first conductive line and the second conductive line. Application of a reset voltage across the first conductive line and the second conductive line generates an electric field between the first conductive line and the second conductive line so as to intersect a plurality of source lines in plan view. This allows liquid crystal molecules lying parallel to a substrate surface in a white display state to rise back to vertical alignment in an accelerated manner, achieving a shorter fall time τoff of the liquid crystal.

In a liquid crystal display device according to one aspect of the present invention, the voltage (reset voltage) applied to the conductive line may include a positive voltage and a negative voltage, and may be inverted to be positive or negative for each fixed period of image display (each image display period).

A liquid crystal display device according to one aspect of the present invention may have the liquid crystal display device including a backlight unit provided on a rear or side surface of the array substrate, and light emission of the backlight unit may be stopped during application of the voltage to the conductive line.

In a liquid crystal display device according to one aspect of the present invention, the transparent electrode may have, in a portion where the gate line is located, a stripe pattern in which slits parallel in plan view are formed, and the source line and the gate line may be orthogonal to each other in plan view and form a matrix pattern along a side of the pixel opening.

A liquid crystal display device according to one aspect of the present invention may include a touch sensing line provided on an interface between the transparent substrate and the transparent resin layer, at a position corresponding to the location of the slit of the transparent electrode in plan view.

In a liquid crystal display device according to one aspect of the present invention, the touch sensing line may include a black layer formed on the transparent substrate and a first metal layer formed on the black layer.

In a liquid crystal display device according to one aspect of the present invention, the control unit may include a touch sensing function for detecting a change in electrostatic capacitance between the touch sensing line and the conductive line, and the control unit may apply a touch sensing driving voltage to one of the touch sensing line and the conductive line after the liquid crystal driving voltage is applied to the pixel electrode and while the liquid crystal driving voltage is not applied to the pixel electrode, to detect a touch sensing signal through the other of the touch sensing line and the conductive line.

In a liquid crystal display device according to one aspect of the present invention, the touch sensing driving voltage may be applied to the conductive line, and the touch sensing line detects the touch sensing signal.

In this case, the conductive line serves as a touch driving line (touch driving electrode and touch sensing driving line), and the touch sensing line serves as a touch detection line (touch detection electrode and touch sensing detection line). On the other hand, the touch sensing line may serve as a touch driving line. In this case, the conductive line serves as a touch detection line.

The conductive line not only receives a reset voltage but also can thus serve as a touch driving line or a touch detection line.

Further, in a circumstance where a reset voltage is applied to a conductive line and a touch sensing driving voltage is applied to the conductive line, operation of touch sensing driving and reset-driving of a liquid crystal molecule can be performed in a time-division manner during an image display period.

Further, when a reset voltage is applied to a conductive line and the conductive line detects a touch sensing signal, the operation of detecting touch sensing and reset-driving of a liquid crystal molecule can be performed in a time-division manner during an image display period.

The touch sensing function is of an electrostatic capacitance type, which detects a change in electrostatic capacitance between the touch sensing line and the conductive line. A touch driving line to which a driving voltage is applied and a touch detection line that is used to detect a signal can be switched with each other.

Note that there is no need to use all the touch sensing lines constituting a liquid crystal display device for a touch sensing operation. For example, all the touch sensing lines provided in the liquid crystal display device can be divided into a plurality of groups (that are fewer than all the touch sensing lines), at each of which a touch sensing operation can be performed. On this occasion, one group includes a line where a touch sensing operation is performed and a line where the operation is not performed. In other words, the touch sensing operation can be achieved without using all the plurality of touch sensing lines (thinned-out driving).

In a liquid crystal display device according to one aspect of the present invention, the conductive line may include a second metal layer.

A liquid crystal display device according to one aspect of the present invention may include an active element that is a thin film transistor including a source electrode electrically connected to the source line, a gate electrode electrically connected to the gate line, and a channel layer constituted by a semiconductor, and a part of the second metal layer forms a light shielding layer covering the channel layer.

In a liquid crystal display device according to one aspect of the present invention, the channel layer may include an oxide semiconductor.

In a liquid crystal display device according to one aspect of the present invention, the array substrate may include a second insulation layer provided under the first insulation layer, and a common electrode provided between the second insulation layer and the pixel electrode, and in plan view, the common electrode may have a portion overlapping with the pixel electrode and a portion protruding from an end of the pixel electrode.

Use of this configuration achieves an electrode structure for shortening a rise time (hereinafter referred to as τon) of a liquid crystal molecule. Specifically, a liquid crystal driving voltage applied across the protruding portion of the common electrode and the pixel electrode acts as a fringe electric field so as to shorten τon.

In a liquid crystal display device according to one aspect of the present invention, on the display-device substrate, at least one of a red filter, a green filter, and a blue filter is provided at a location corresponding to the pixel opening.

A liquid crystal display device according to one aspect of the present invention may include a black matrix layer that is provided at any portion from a position of the touch sensing line to a position of the transparent electrode in a thickness direction of the display-device substrate, the black matrix layer defining the pixel opening.

In the touch sensing line of a liquid crystal display device according to one aspect of the present invention, in the touch sensing line, the first metal layer may be a copper-containing layer, and the touch sensing line may have a structure in which the copper-containing layer is sandwiched between conductive metal oxide layers.

Examples of the copper-containing layer include a copper layer or a copper alloy layer.

In the conductive line of a liquid crystal display device according to one aspect of the present invention, in the conductive line, the second metal layer may be a copper-containing layer, and the conductive line may have a structure in which the copper-containing layer is sandwiched between conductive metal oxide layers.

In a liquid crystal display device according to one aspect of the present invention, the conductive metal oxide layer may be made of a composite oxide including zinc oxide, indium oxide, and tin oxide.

In a liquid crystal display device according to one aspect of the present invention, each of pixels corresponding to the pixel opening may include a first active element and a second active element, the first active element may have a source electrode electrically connected to a source line to which an image signal is supplied as a negative voltage, and the second active element may have a source electrode electrically connected to a source line to which an image signal is supplied as a positive voltage.

According to one aspect of the present invention, the fall time τoff of a liquid crystal can be shortened to provide a liquid crystal display device capable of a high-speed response. A conductive line according to one aspect of the present invention serves both as a reset line to which a reset voltage for reducing τoff is applied and as a touch sensing line for touch sensing, so that it can provide a liquid crystal display device that enables touch sensing as well as high-speed liquid crystal driving. A conductive line according to one aspect of the present invention can be formed of an identical conductive layer without having to increase the number of manufacturing steps or conductive layers.

REFERENCE SIGNS LIST

1 . . . Transparent resin layer
2 . . . Transparent electrode
3 . . . Touch sensing line (touch driving line, touch detection line)
4 . . . Second conductive metal oxide layer
5 . . . First metal layer
6 . . . First conductive metal oxide layer
7 . . . Conductive line
9 . . . Black layer (first black layer)
11 . . . First insulation layer
12 . . . Second insulation layer
13 . . . Third insulation layer
14 . . . Source line
15 . . . Gate line (first gate line)
16 . . . Slit
17 . . . Pixel electrode
17a, 17b . . . Electrode portion (pixel electrode)
18 . . . Pixel opening
19 . . . Black layer (second black layer)
21, 22 . . . Transparent substrate
23 . . . Light shielding layer (light shielding pattern)
24 . . . Source electrode
25 . . . Gate electrode
26 . . . Drain electrode
27 . . . Channel layer
28 . . . Active element (first active element)
29 . . . Contact hole
30 . . . Common electrode
31, 32 . . . Electric line of force
33 . . . Terminal
38, 39 . . . Liquid crystal molecule
40 . . . Second gate line
51 . . . Odd-numbered source line
52 . . . Even-numbered source line
55 . . . Second active element
100 . . . Display device substrate
200 . . . Array substrate
300 . . . Liquid crystal layer
BM . . . Black matrix (Black matrix layer)

Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display device, comprising:
a display-device substrate including a transparent substrate, a transparent resin layer formed on the transparent substrate, and a transparent electrode formed on the transparent resin layer;
an array substrate including a source line, a gate line, a pixel electrode positioned in each of pixel openings defined by the source and gate lines, a first insulation layer formed between the source line and the pixel electrode in a cross-sectional view, and a conductive line parallel to the source line and formed on the first insulation layer in a portion where pixel electrodes are divided in a plan view;

a liquid crystal layer sandwiched between the display-device substrate and the array substrate and including liquid crystal molecules having negative dielectric anisotropy and initially aligned vertically; and a controller configured to drive the liquid crystal layer by supplying an image signal to the source line and applying a liquid crystal driving voltage across the transparent electrode and the pixel electrode in synchronization with the image signal, wherein the controller is configured to apply a voltage to the conductive line after the liquid crystal driving voltage is applied to the pixel electrode and while the liquid crystal driving voltage is not applied to the pixel electrode, such that an electric field oriented in a direction traversing the source line in the plan view is generated between conductive lines.

2. The liquid crystal display device according to claim 1, wherein the controller is configured such that a voltage applied to the conductive line includes a positive voltage and a negative voltage, and that the voltage is inverted to be positive or negative for each fixed period of an image display.

3. The liquid crystal display device of claim 1, further comprising:
a backlight unit formed on a rear or a side surface of the array substrate and configured such that light emission of the backlight unit is stopped during application of the voltage to the conductive line.

4. The liquid crystal display device of claim 1, wherein the transparent electrode has, in a portion where the gate line is located, a stripe pattern in which slits parallel in the plan view are formed, and the source and gate lines are orthogonal to each other in the plan view and form a matrix pattern along a side of the pixel opening.

5. The liquid crystal display device of claim 4, further comprising:
a touch sensing line formed at an interface between the transparent substrate and the transparent resin layer, at a position corresponding to a location of a slit of the transparent electrode in the plan view.

6. The liquid crystal display device of claim 5, wherein the touch sensing line comprises a black layer formed on the transparent substrate and a first metal layer formed on the black layer.

7. The liquid crystal display device of claim 5, wherein the controller includes a touch sensing function of detecting a change in electrostatic capacitance between the touch sensing line and the conductive line, and the controller is configured to apply a touch sensing driving voltage to one of the touch sensing line and the conductive line after the liquid crystal driving voltage is applied to the pixel electrode and while the liquid crystal driving voltage is not applied to the pixel electrode, such that a touch sensing signal is detected through the other of the touch sensing line and the conductive line.

8. The liquid crystal display device of claim 6, wherein the controller includes a touch sensing function of detecting a change in electrostatic capacitance between the touch sensing line and the conductive line, and the controller is configured to apply a touch sensing driving voltage to one of the touch sensing line and the conductive line after the liquid crystal driving voltage is applied to the pixel electrode and while the liquid crystal driving voltage is not applied to the pixel electrode, such that a touch sensing signal is detected through the other of the touch sensing line and the conductive line.

9. The liquid crystal display device of claim 7, wherein the controller is configured to control the touch sensing driving voltage to be applied to the conductive line, and the touch sensing line detects the touch sensing signal.

10. The liquid crystal display device of claim 1, wherein the conductive line includes a second metal layer.

11. The liquid crystal display device of claim 10, further comprising:
an active element that is a thin film transistor including a source electrode electrically connected to the source line, a gate electrode electrically connected to the gate line, and a channel layer comprising a semiconductor,
wherein the second metal layer has a portion that forms a light shielding layer covering the channel layer.

12. The liquid crystal display device of claim 11, wherein the channel layer includes an oxide semiconductor.

13. The liquid crystal display device of claim 1, wherein the array substrate includes a second insulation layer formed under the first insulation layer, and a common electrode formed between the second insulation layer and the pixel electrode, and the common electrode has a portion overlapping with the pixel electrode and a portion protruding from an end of the pixel electrode in the plan view.

14. The liquid crystal display device of claim 1, wherein the display-device substrate has at least one of a red filter, a green filter, and a blue filter formed thereon at a location corresponding to the pixel opening.

15. The liquid crystal display device of claim 5, further comprising:
a black matrix layer formed at a location from a position of the touch sensing line to a position of the transparent electrode in a thickness direction of the display-device substrate such that the black matrix layer defines the pixel opening.

16. The liquid crystal display device of claim 6, wherein the first metal layer is a copper-containing layer, and the touch sensing line has a structure in which the copper-containing layer is sandwiched between conductive metal oxide layers.

17. The liquid crystal display device of claim 10, wherein the second metal layer is a copper-containing layer, and the conductive line has a structure in which the copper-containing layer is sandwiched between conductive metal oxide layers.

18. The liquid crystal display device of claim 16, wherein the conductive metal oxide layers each comprises a composite oxide including zinc oxide, indium oxide, and tin oxide.

19. The liquid crystal display device of claim 17, wherein the conductive metal oxide layers each comprise a composite oxide including zinc oxide, indium oxide, and tin oxide.

20. The liquid crystal display device of claim 1, wherein each of pixels corresponding to the pixel opening includes a first active element and a second active element, the first active element has a source electrode electrically connected to a source line to which an image signal is supplied as a negative voltage, and the second active element has a source electrode electrically connected to a source line to which an image signal is supplied as a positive voltage.

* * * * *